US012403563B2

(12) United States Patent
Nakamura et al.

(10) Patent No.: US 12,403,563 B2
(45) Date of Patent: Sep. 2, 2025

(54) POWER TOOL

(71) Applicant: MAKITA CORPORATION, Anjo (JP)

(72) Inventors: Tatsuya Nakamura, Anjo (JP); Hiroki Kaneko, Anjo (JP); Yunosuke Tanaka, Anjo (JP); Yukiya Matsuoka, Anjo (JP); Takahiro Kawakami, Anjo (JP); Takafumi Kotsuji, Anjo (JP)

(73) Assignee: MAKITA CORPORATION, Anjo (JP)

( * ) Notice: Subject to any disclaimer, the term of this patent is extended or adjusted under 35 U.S.C. 154(b) by 50 days.

(21) Appl. No.: 18/516,436

(22) Filed: Nov. 21, 2023

(65) Prior Publication Data

US 2024/0173821 A1 May 30, 2024

(30) Foreign Application Priority Data

Nov. 24, 2022 (JP) ................................ 2022-187779
Nov. 24, 2022 (JP) ................................ 2022-187780

(51) Int. Cl.
*B24B 55/05* (2006.01)
*B24B 23/02* (2006.01)
*B25F 5/02* (2006.01)

(52) U.S. Cl.
CPC .............. *B24B 55/052* (2013.01); *B25F 5/02* (2013.01); *B24B 23/028* (2013.01)

(58) Field of Classification Search
CPC ........ B24B 55/052; B24B 23/028; B25F 5/02
See application file for complete search history.

(56) References Cited

U.S. PATENT DOCUMENTS 4,924,635 A * 5/1990 Rudolf .................. B24B 55/052 451/344
5,384,985 A * 1/1995 Jacobsson ............. B24B 55/052 451/344
5,386,667 A * 2/1995 Hausslein ............. B24B 55/052 451/344
5,766,062 A * 6/1998 Edling ................... B23Q 11/06 451/454
6,949,017 B2 * 9/2005 Koschel .................. B24B 23/02 451/451

(Continued)

FOREIGN PATENT DOCUMENTS

CN 107520758 A * 12/2017
EP 2189244 A2 * 5/2010 ............ B24B 23/02
EP 2 189 244 B1 11/2014

*Primary Examiner* — Lucas E. A. Palmer
(74) *Attorney, Agent, or Firm* — Oliff PLC

(57) ABSTRACT

A power tool includes a spindle, a housing, a cover body configured to be removably mounted to the housing, a first engagement part provided on or in the cover body, and a second engagement part provided on or in the housing. The cover body includes an upper plate part and an outer peripheral part. The second engagement part is movable between an engagement position and a disengagement position. The first and second engagement parts are configured to restrict rotation of the cover body around the drive axis relative to the housing by engaging with each other. The first engagement part is (i) at a same location as or radially outward of the outer peripheral part of the cover body in a radial direction orthogonal to the drive axis, and (ii) between an upper end and a lower end of the cover body in the up-down direction.

19 Claims, 39 Drawing Sheets

(56) References Cited

U.S. PATENT DOCUMENTS

| | | | | |
|---|---|---|---|---|
| 7,175,513 | B2 * | 2/2007 | Folin | B24B 55/052 451/451 |
| 7,909,680 | B2 * | 3/2011 | Boeck | B24B 55/052 451/454 |
| 8,282,446 | B2 * | 10/2012 | Sulea | B24B 55/052 451/451 |
| 8,939,816 | B2 * | 1/2015 | Chen | B24B 23/028 451/359 |
| 9,079,291 | B2 * | 7/2015 | Ikuta | B24B 23/028 |
| 9,358,664 | B2 * | 6/2016 | Ikuta | B24B 55/052 |
| 2004/0203330 | A1 * | 10/2004 | Kleider | B24B 23/028 451/359 |
| 2005/0215186 | A1 * | 9/2005 | Stierle | B24B 55/052 451/359 |
| 2006/0052041 | A1 * | 3/2006 | Wiker | B24B 55/052 451/451 |
| 2008/0153404 | A1 * | 6/2008 | Schmidberger-Brinek | B24B 55/052 451/359 |
| 2010/0105300 | A1 * | 4/2010 | Esenwein | B24B 55/052 451/452 |
| 2010/0178857 | A1 * | 7/2010 | Esenwein | B24B 55/052 451/451 |
| 2012/0052779 | A1 * | 3/2012 | Timcke | B24B 23/022 451/451 |
| 2012/0270480 | A1 * | 10/2012 | Rohde | B24B 55/052 451/451 |
| 2012/0295524 | A1 * | 11/2012 | Numata | B24B 23/028 451/363 |
| 2013/0000935 | A1 * | 1/2013 | Kelleher | B23Q 11/08 173/46 |
| 2016/0016285 | A1 * | 1/2016 | Cooksey | B24B 23/028 451/359 |
| 2016/0039068 | A1 * | 2/2016 | Morris | B24B 23/02 29/434 |
| 2016/0297052 | A1 * | 10/2016 | Aiken | B24B 23/028 |
| 2017/0320192 | A1 * | 11/2017 | Herchek | B24B 23/028 |
| 2018/0236634 | A1 * | 8/2018 | Chen | B24B 55/052 |
| 2024/0173839 | A1 * | 5/2024 | Kawakami | B25F 5/02 |
| 2024/0198482 | A1 * | 6/2024 | Bowers | B27G 19/04 |

* cited by examiner

POWER TOOL

CROSS-REFERENCE TO RELATED APPLICATION

The present application claims priority to Japanese patent application Nos. 2022-187779 and 2022-187780 filed on Nov. 24, 2022, the contents of which are hereby fully incorporated herein by reference.

TECHNICAL FIELD

The present disclosure relates to a power tool. More specifically, the present disclosure relates to a power tool that includes a cover that partially covers a tool accessory mounted to a spindle.

BACKGROUND

Some power tools (e.g., power tools that rotate or oscillate a tool accessory) are provided with a cover that partially covers a tool accessory mounted to a lower end portion of a spindle in order to suppress scattering of dust and sparks that are generated during a processing operation. In order to facilitate handling of a power tool in a narrow space, it is preferable that the power tool is small in size in an axial direction of the spindle. Accordingly, in order to reduce the size of the spindle in the axial direction, various improvements in a mounting structure of the cover have been proposed. For example, European Patent No. 2189244 discloses a grinder that has a lever that is disposed radially outward of a protection hood (cover) and configured to engage with the protection hood.

SUMMARY

In the above-described grinder, the protection hood has a disc-like part that is placed above a tool accessory and an edge part that is connected to an outer edge of the disc-like part and surrounds an edge of the tool accessory. The lever is disposed radially outward of the protection hood and configured to engage with a recess that is formed in a portion of the edge part of the protection hood that is below the tool accessory. Such a cover mounting structure leaves room for further improvement.

It is accordingly a non-limiting object of the present disclosure to provide an improvement in a structure of mounting a cover for a tool accessory to a power tool.

A non-limiting aspect of the present disclosure herein provides a power tool that includes a spindle, a housing, a cover body, a first engagement part and a second engagement part. The power tool of this aspect may include a rotary tool (e.g., a grinder, a cutter and, a circular saw) that is configured to rotate a tool accessory around a drive axis, and an oscillating tool (a so-called multi-tool) that is configured to oscillate (reciprocally pivot) a tool accessory about a drive axis.

The spindle extends along a drive axis that defines an up-down direction of the power tool. The spindle has a lower end portion that is configured such that a tool accessory is removably mounted thereto. The housing houses the spindle with the lower end portion of the spindle exposed to an outside of the housing. The cover body is configured to be removably mounted to the housing to partially cover the tool accessory mounted to the lower end portion of the spindle. The cover body includes an upper plate part and an outer peripheral part (outer circumferential part). The upper plate part is configured to be arranged above the tool accessory. The outer peripheral part extends along an outer edge of the upper plate part and protrudes downward from the outer edge of the upper plate part. The first engagement part is provided on or in the cover body. The second engagement part is provided on or in the housing. The second engagement part is movable between (a) an engagement position, at which the second engagement part engages with the first engagement part, and (b) a disengagement position, at which the second engagement part is not engageable with the first engagement part. The first engagement part and the second engagement part are configured to restrict rotation of the cover body around the drive axis relative to the housing by engaging with each other. The first engagement part is at a same location as the outer peripheral part of the cover body or radially outward of the outer peripheral part of the cover body in a radial direction that is orthogonal to the drive axis. The first engagement part is between upper end and a lower end of the cover body in the up-down direction. For example, if the first engagement part is a recess or hole formed in the outer peripheral part, the first engagement part may be regarded as being “at the same location as the outer peripheral part in the radial direction”. A position that is at a same level as the upper end and a position that is at a same level as the lower end in the up-down direction can be regarded as being “between the upper end and the lower end of the cover body in the up-down direction”.

The power tool of this aspect is configured such that rotation of the cover body is restricted by the first engagement part provided on/in the cover body and the second engagement part provided on/in the housing that are engaged with each other. Further, the first engagement part is between the upper end and the lower end of the cover body in the up-down direction. Thus, the first engagement part does not protrude upward or downward from the cover body. Therefore, compared with a structure in which the first engagement part protrudes upward or downward from the cover body, the size of the entire power tool with the second engagement part in the up-down direction can be made smaller.

Another non-limiting aspect of the present disclosure herein provides a power tool that includes a spindle, a housing, a cover body, a rail and a lever. An example of the power tool of this aspect is the same as an example of the power tool of the above-described aspect.

The spindle extends along a drive axis that defines an up-down direction of the power tool. The spindle has a lower end portion that is configured such that a tool accessory is removably mounted thereto. The housing houses the spindle with the lower end portion of the spindle exposed to an outside of the housing. The cover body is configured to be removably mounted to the housing and to partially cover the tool accessory mounted to the lower end portion of the spindle. The cover body includes an upper plate part and an outer peripheral part (outer circumferential part). The upper plate part is configured to be arranged above the tool accessory. The outer peripheral part extends along an outer edge of the upper plate part and protrudes downward from the outer edge. The rail has an arcuate shape, and protrudes radially outward from the upper plate part or the outer peripheral part of the cover body. The lever is configured to be externally manipulated by a user. The lever is supported by the housing to be movable between (a) an engagement position, at which the lever engages with the rail, and (b) a disengagement position, at which the lever is not engageable with the rail. The rail and the lever are configured to restrict rotation of the cover body around the drive axis relative to the housing by engaging with each other.

The power tool of this aspect is configured such that rotation of the cover body is restricted by the rail provided on the cover body and the lever provided on the housing. Further, the arcuate rail protrudes radially outward from the upper plate part or the outer peripheral part of the cover body. Therefore, compared with a structure in which the rail protrudes upward or downward from the cover body, the size of the entire power tool with the lever in the up-down direction can be made smaller.

DETAILED DESCRIPTION OF THE EMBODIMENTS

Figure 1:
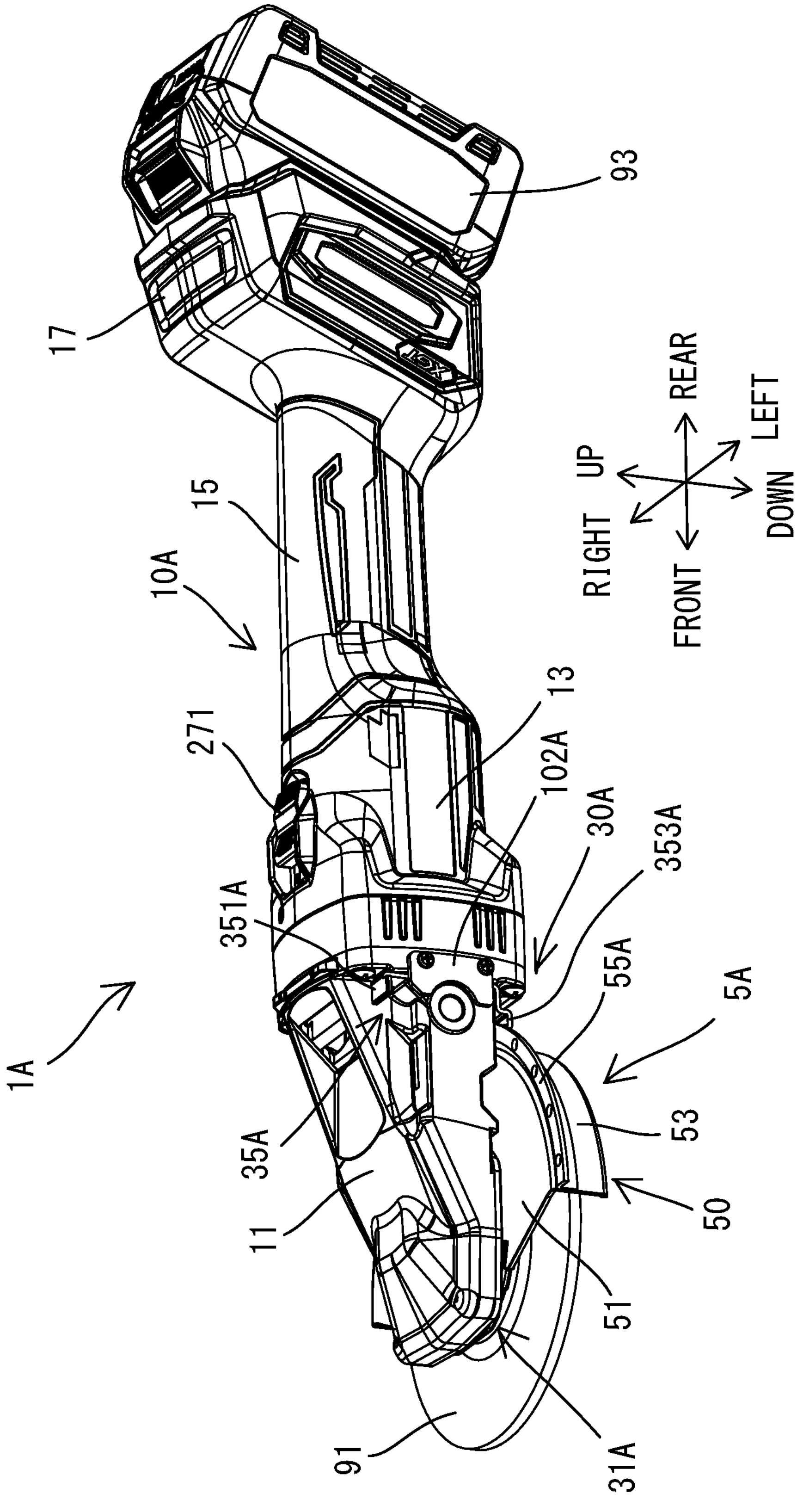
FIG. 1 is a perspective view of a grinder of a first embodiment of the present disclosure.

In a non-limiting embodiment according to the present disclosure, the first engagement part may be configured as a protruding part that protrudes radially outward from the upper plate part or the outer peripheral part of the cover body. According to this embodiment, the freedom of design of the engagement structure of the first and second engagement parts can be enhanced.

In addition or in the alternative to the preceding embodiment, the second engagement part may be a lever that is linearly movable substantially in parallel to the drive axis. According to this embodiment, rotation of the cover body can be effectively restricted by cooperation between the protruding part provided on the cover body and a simple lever provided on the housing.

In addition or in the alternative to the preceding embodiments, the protruding part may have at least one recess or hole that extends in the up-down direction. The second engagement part may have a projection that is configured to engage with the recess or the hole when the second engagement part is at the engagement position. According to this embodiment, rotation of the cover body relative to the housing can be reliably restricted.

In addition or in the alternative to the preceding embodiments, the lever may include (i) a manipulation part that is configured to be externally manipulated by a user above the housing, (ii) the projection, and (iii) a connection part that connects the manipulation part and the projection. According to this embodiment, the user can easily manipulate the lever.

In addition or in the alternative to the preceding embodiments, the connection part may be at least partially within the housing. According to this embodiment, the possibility that the lever is affected by an unintended external force can be reduced.

In addition or in the alternative to the preceding embodiments, the projection may be configured to be engaged with the protruding part of the cover body from below when the lever is at the engagement position. According to this embodiment, a user can move the lever from the engagement position to the disengagement position by pushing the manipulation part downward. The user can thus manipulate the lever more easily, compared with a structure that requires pulling the manipulation part upward.

In addition or in the alternative to the preceding embodiments, the second engagement part may be a rotary lever that is configured to be externally manipulated by a user. According to this embodiment, the lever can be easily manipulated.

In addition or in the alternative to the preceding embodiments, the second engagement part may be movable within or along a plane that is substantially orthogonal to the drive axis. According to this embodiment, the size of the second engagement part in the up-down direction can be reliably reduced.

In addition or in the alternative to the preceding embodiments, the protruding part may have at least one recess that is recessed radially inward from an outer edge of the protruding part. The second engagement part may have a projection that is configured to be engaged with the recess when the second engagement part is at the engagement position. According to this embodiment, rotation of the cover body relative to the housing can be reliably restricted.

In addition or in the alternative to the preceding embodiments, the protruding part may be configured to restrict movement of the cover body relative to the housing in a first direction, which is different from a circumferential direction around the drive axis, by engaging with one or both of the second engagement part and the housing. According to this embodiment, the protruding part provided on the cover body can restrict (i) movement (rotation) of the cover body relative to the housing in the circumferential direction and (ii) movement of the cover body relative to the housing in the first direction that is different from the circumferential direction around the drive axis. Thus, the protruding part can perform two functions of (i) properly positioning the cover body in the circumferential direction and (ii) suppressing looseness or a play in the first direction. Therefore, compared with a case in which these two functions are achieved respectively by two separate (individual, discrete) structures, a space required in the power tool can be reduced and the power tool can be simplified in structure.

In addition or in the alternative to the preceding embodiments, the housing may have a groove. The protruding part may be configured to restrict movement of the cover body relative to the housing in the first direction by being fitted in the groove. According to this embodiment, the cover body can be effectively positioned in the circumferential direction. In addition, the looseness or the play can be reduced by cooperation between the protruding part provided on the cover body and the second engagement part and the groove that are provided in the housing.

In addition or in the alternative to the preceding embodiments, the second engagement part may be configured to restrict (i) rotation of the cover body relative to the housing and (ii) movement of the cover body relative to the housing in the first direction by pressing the protruding part against the housing when the second engagement part is at the engagement position. According to this embodiment, the cover body can be effectively positioned in the circumferential direction and the looseness or the play can be reduced by cooperation between the protruding part, the second engagement part and the housing.

In addition or in the alternative to the preceding embodiments, the power tool may further include a biasing member that is configured to bias the second engagement part toward the engagement position. According to this embodiment, engagement between the first engagement part and the second engagement part can be maintained by the biasing force of the biasing member.

In addition or in the alternative to the preceding embodiments, the first engagement part may be formed separately (discretely, individually) from the cover body and fixed to the cover body. According to this embodiment, the cover body and the first engagement part, which have been formed separately, can be fixed together afterwards. Such a configuration facilitates manufacturing, compared with a case in which the cover body and the first engagement part are integrally formed together from the beginning.

In addition or in the alternative to the preceding embodiments, a lower end of the second engagement part may be at a same location as or above a lower end of the cover body in the up-down direction when the second engagement part is at the engagement position and when the second engagement part is at the disengagement position. According to this embodiment, the second engagement part does not protrude downward from the cover body. Therefore, the size of the entire power tool including the second engagement part can be reduced in the up-down direction. Further, the possibility that the second engagement part is affected by an unintended external force can be reduced.

In addition or in the alternative to the preceding embodiments, the second engagement part may be between an upper end and the lower end of the cover body in the up-down direction both in the engagement position and in the disengagement position. According to this embodiment, the second engagement part does not protrude upward and downward from the cover body. Therefore, the possibility that the second engagement part is affected by an unintended external force can be further reduced.

In addition or in the alternative to the preceding embodiments, the protruding part may be an arcuate rail. The rail may be configured to restrict movement of the cover body relative to the housing in a first direction that is different from a circumferential direction around the drive axis by being engaged with one or both of the lever and the housing. According to this embodiment, the cover body can be effectively positioned in the circumferential direction and the looseness or the play can be reduced by cooperation between the rail and one or both of the lever and the housing.

Representative, non-limiting embodiments of the present disclosure are now specifically described with reference to the drawings. In the following embodiments, a hand-held electric disc grinder (hereinafter simply referred to as a grinder) is described as a representative example of a power tool of the present disclosure. The grinder is also a representative example of a rotary tool that is configured to rotationally drive the tool accessory.

First Embodiment

A grinder 1A according to a first embodiment is now described with reference to FIGS. 1 to 10.

Figure 2:
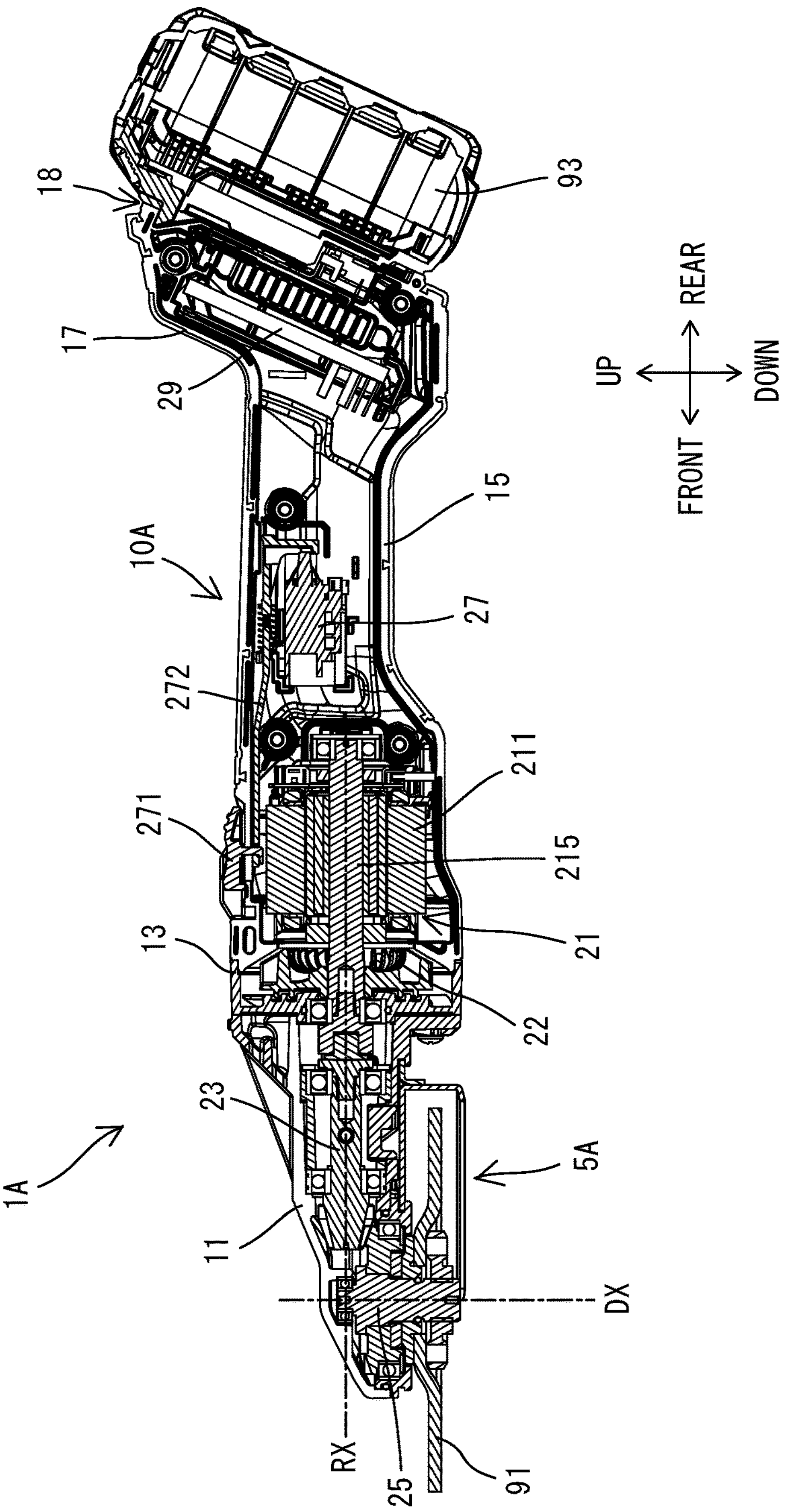
FIG. 2 is a sectional view of the grinder.

The general structure of the grinder 1A is now described. As shown in FIGS. 1 and 2, the grinder 1A includes a motor 21, a spindle 25 that is operably coupled to the motor 21, and a housing 10A that houses the motor 21 and the spindle 25. The housing 10A has an elongate hollow body and forms an outer shell of the grinder 1A. The motor 21 is arranged such that a rotational axis RX of an output shaft 215 of the motor 21 extends substantially in parallel to a longitudinal axis of the housing 10A. The spindle 25 is disposed within one end portion of the housing 10A in its longitudinal direction. The spindle 25 is supported within the housing 10A so as to be rotatable around a drive axis DX. The drive axis DX crosses the rotational axis RX of the output shaft 215. More specifically, the drive axis DX intersects the rotational axis RX at a substantially right angle.

One axial end portion of the spindle 25 is exposed to the outside from the housing 10A. A tool accessory 91 is removably mounted to this end portion of the spindle 25. A portion of the tool accessory 91 is covered by a cover 5A that is mounted (coupled) to the housing 10A.

When the spindle 25 is rotationally driven around the drive axis DX by the motor 21, the tool accessory 91 is rotated, and a processing operation is performed on a workpiece. The tool accessory 91 that can be mounted to the grinder 1A includes a grinding wheel, a cutting wheel, a blade, a rubber pad and a brush. The grinding wheel, the cutting wheel and the blade are non-limiting examples of the tool accessory 91 having a disc-like shape. A user selects the tool accessory 91 that is suitable for a desired operation and mounts it to the grinder 1A. The grinder 1A is capable of performing grinding, polishing, cutting or other similar operation on a workpiece, depending on the kind of the selected tool accessory 91.

The structure of the grinder 1A is now described in detail. In the following description, for the sake of convenience, the extending direction of the drive axis DX is defined as an up-down direction of the grinder 1A. In the up-down direction, the side on which the tool accessory 91 is located is defined as a lower side of the grinder 1A, and the opposite side is defined as an upper side of the grinder 1A. The extending direction of the rotational axis RX of the output shaft 215 is defined as a front-rear direction of the grinder 1A. In the front-rear direction, the side on which the spindle 25 is located is defined as a front side of the grinder 1A, and the opposite side is defined as a rear side of the grinder 1A. A direction that is orthogonal to the up-down direction and the front-rear direction is defined as a left-right direction of the grinder 1A. Further, any direction that is orthogonal to the drive axis DX is defined as a radial direction. In the radial direction, a direction away from the drive axis DX is defined as a radially outward direction, and a direction toward the drive axis DX is defined as a radially inward direction.

First, the structure of the housing 10A is described.

As shown in FIGS. 1 and 2, the housing 10A includes a driving-mechanism housing part 11, a motor housing part 13, a handle part 15 and a controller housing part 17, which are arranged in this order from the front to the rear. The driving-mechanism housing part 11 houses the spindle 25 and an intermediate shaft 23. The driving-mechanism housing part 11 may also be referred to as a gear housing. The driving-mechanism housing part 11 forms a front end portion of the housing 10A. The motor housing part 17 houses the motor 21 and a fan 22. The handle part 15 is configured to be held by a user. The handle part 15 may also be referred to as a grip part. The controller housing part 17 houses a controller 29. The controller housing part 17 forms a rear end portion of the housing 10A.

Elements (mechanisms) disposed within the housing 10A are now described.

The output shaft 215 of the motor 21 is supported within the motor housing part 13 so as to be rotatable around the rotational axis RX. The fan 22 is fixed to a portion of the output shaft 215 that protrudes forward from a stator 211. The fan 22 integrally rotates with the output shaft 215.

Figure 3:
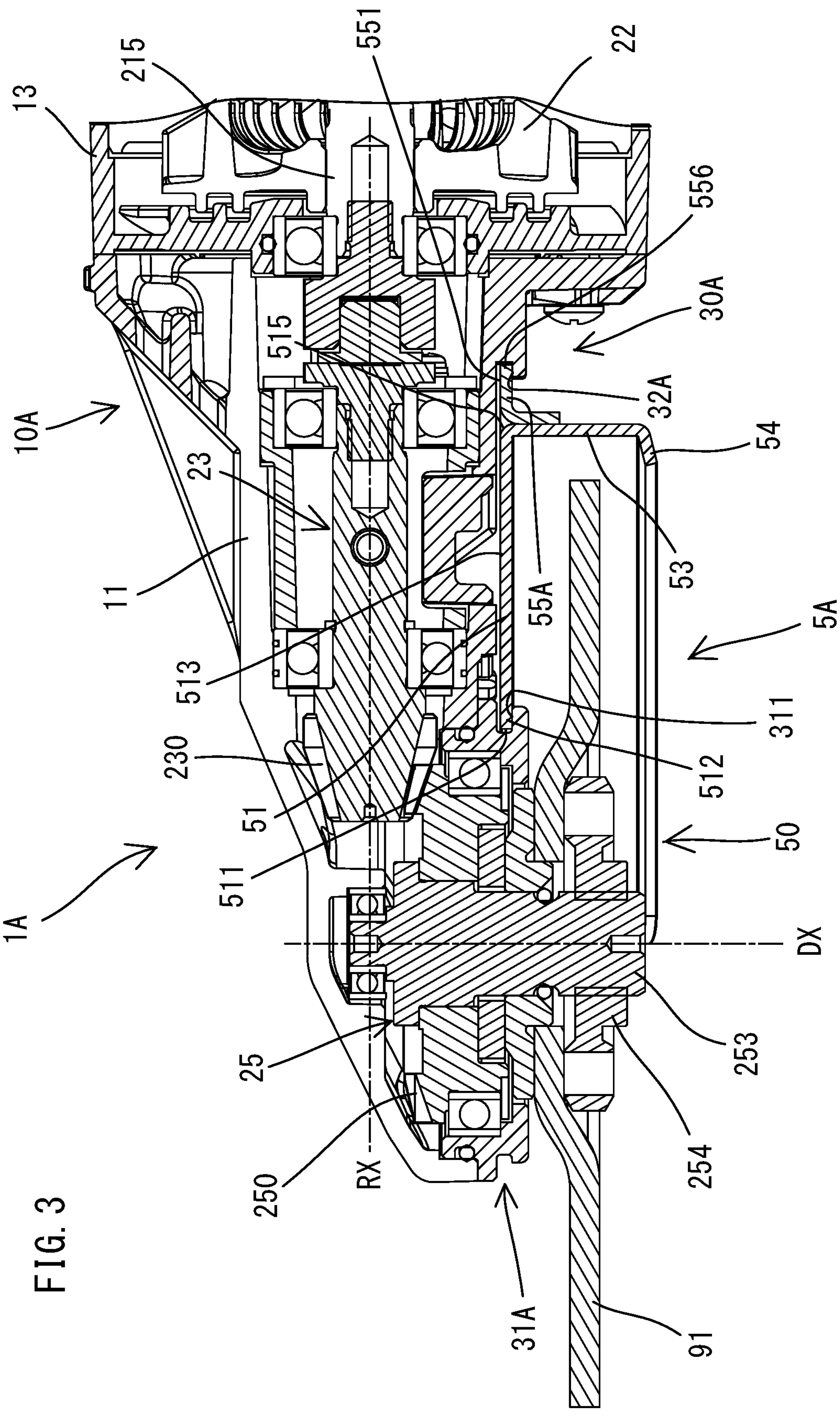
FIG. 3 is a partial, enlarged view of FIG. 2.

As shown in FIG. 3, the spindle 25 is supported within the driving-mechanism housing part 11 so as to be rotatable around the drive axis DX. A driven gear 250 is fixed onto an upper portion of the spindle 25. A lower end portion of the spindle 25 protrudes downward from the housing 10A. The lower end portion of the spindle 25 is configured as a tool mounting part 253 to which the tool accessory 91 is removably mounted (coupled). In this embodiment, an outer peripheral surface of the tool mounting part 253 is threaded and the tool accessory 91 can be fixed to the tool mounting part 253 by a lock nut 254. The method of mounting the tool accessory 91 to the spindle 25 is not limited to this, but any known method may be employed.

The grinder 1A is provided with the cover 5A for protecting a user from dust and sparks that are generated during a processing operation performed by the tool accessory 91 on a workpiece. The cover 5A is configured to be removably mounted (coupled) to the housing 10A such that the cover 5A partially covers the tool accessory 91 mounted to the tool mounting part 253 of the spindle 25. The cover 5A may also be referred to as a wheel cover, a wheel guard, a disc cover, a protection cover or a protection hood. The cover 5A is described below in further detail.

As shown in FIG. 3, the intermediate shaft 23 is operably connected to the motor 21 and the spindle 25 and transmits rotational driving force of the motor 21 to the spindle 25. Specifically, the intermediate shaft 23 is coaxial with the output shaft 215 of the motor 21 and supported within the driving-mechanism housing part 11 so as to be rotatable around the rotational axis RX. A rear end portion of the intermediate shaft 23 is engaged with a front end portion of the output shaft 215 via a connecting member, so that the intermediate shaft 23 integrally rotates with the output shaft 215. A drive gear 230 is provided on a front end portion of the intermediate shaft 23. The drive gear 230 is engaged with the driven gear 250. Bevel gears are employed as the drive gear 230 and the driven gear 250.

With the above-described structure, when the motor 21 is driven, the spindle 25 is rotated around the drive axis DX via the intermediate shaft 23, and the tool accessory 91 fixed to the tool mounting part 253 is integrally rotated with the spindle 25. The rotational driving force of the motor 21 may however be transmitted to the spindle 25 via any mechanism other than the intermediate shaft 23.

As shown in FIG. 2, a switch 27 is housed within the handle part 15. The switch 27 is for starting the motor 21. In this embodiment, the motor 21 is energized and driven while the switch 27 is ON. A switch knob 271, which is configured to turn On and OFF the switch 27 is provided on the housing 10A. More specifically, the switch knob 271 is supported on an upper portion of the motor housing part 13 so as to be externally manipulated by the user and to be movable between an ON position and an OFF position. The switch knob 271 is normally held in the OFF position. The switch knob 271 is connected to the switch 27 via a connecting member 272. The switch 27 is switched from OFF to ON when the user moves the switch knob 271 from the OFF position to the ON position.

The controller 29, which is configured to control operation of the grinder 1A, is housed within the controller housing part 17. The controller 29 includes a control circuit and is electrically connected to the motor 21 and the switch 27. In this embodiment, the controller 29 is configured to control driving of the motor 21 (energization to the motor 21) according to ON/OFF of the switch 27.

A battery mounting part 18 is provided in the controller housing part 17. A rechargeable battery 93 is removably mounted to the battery mounting part 18. The battery mounting part 18 includes a structure for physical engagement with the battery 93 and terminals for electrical connection with the battery 93. The grinder 1A of this embodiment operates by power supplied from the battery 93. The grinder 1A may however be configured to operate by power supplied from an external AC power source via a power cord.

The cover 5A is now described. The cover 5A is removable from the housing 10A, but in the following description, the directions of the cover 5A are referred to based on the directions of the grinder 1A with the cover 5A mounted to the housing 10A.

Figure 4:
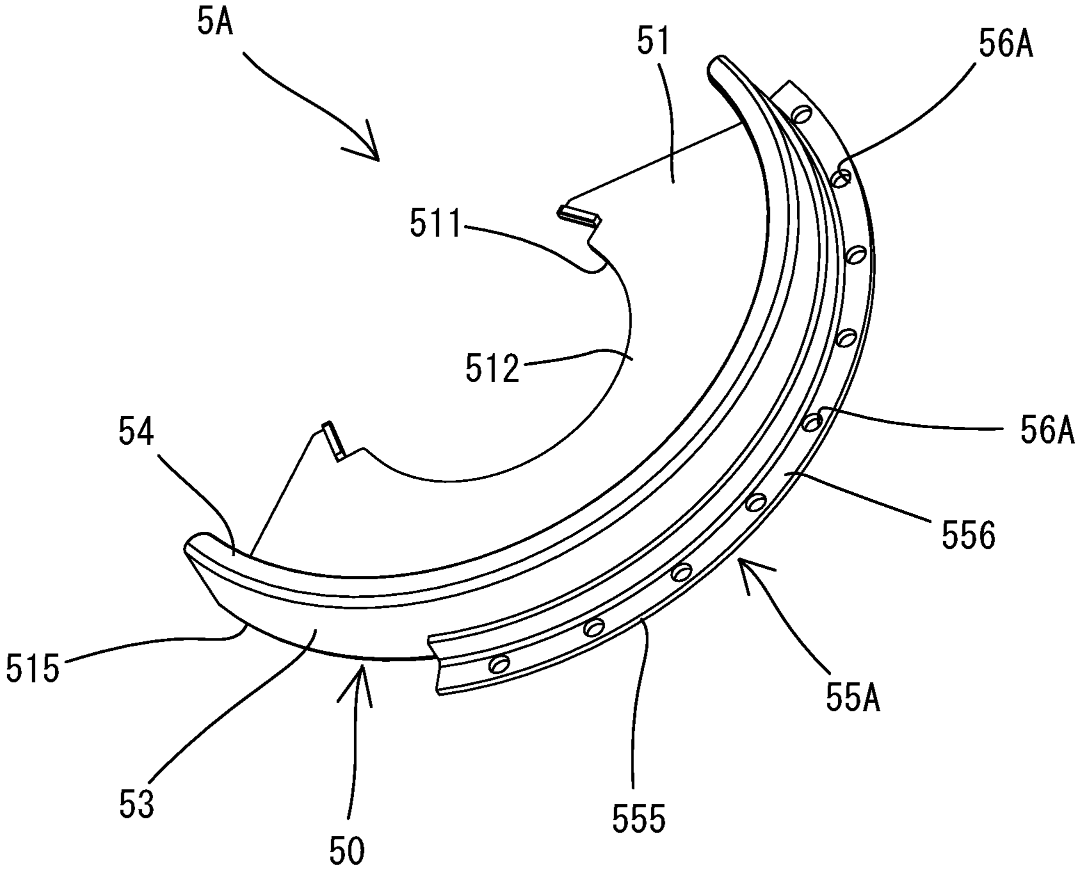
FIG. 4 is a perspective view of a cover.

As shown in FIGS. 1, 3 and 4, the cover 5A includes a cover body 50 and a rail 55A. The cover body 80 is a single (seamless) metal member. The rail 55A is a metal member that is originally (initially) formed separately (discretely, individually) from the cover body 50 and thereafter fixed to the cover body 50. Owing to this structure, manufacture of the cover 5A can be facilitated, because the cover body 50 and the rail 55A are joined together after being formed separately. The cover body 50 and the rail 55A may however be integrally formed as a single member from the beginning.

The cover body 50A is configured to partially cover the tool accessory 91. The cover body 50A of this embodiment includes an upper plate part 51, an outer peripheral (circumferential) part 53 and a lip part 54.

The upper plate part 51 is a thin plate-like part that is to be arranged above the tool accessory 91 in the up-down direction. The upper plate part 51 is arranged substantially in parallel to a plane that is orthogonal to the drive axis DX (i.e., substantially in parallel to a plane of the disc-like tool accessory 91 such as a grinding wheel, a cutting wheel and a blade). The upper plate part 51 has a fan-like (arcuate) shape as viewed from above or below, and has an arcuate inner edge (radially inner edge) 511 and an arcuate outer edge (radially outer edge) 515. The upper plate part 51 is configured to cover a portion of the disc-like tool accessory 91 by the center angle of 180 degrees or more.

The outer peripheral part 53 is formed along the outer edge 515 of the upper plate part 51 and protrudes downward from the upper plate part 51. The outer peripheral part 53 has an arcuately curved thin plate-like shape. The outer peripheral part 53 is to be arranged radially outward of the outer edge of the disc-like tool accessory 91. The outer peripheral part 53 is configured such that its lower end is located at least below a lower surface of the disc-like tool accessory 91 in the up-down direction.

The lip part 54 protrudes radially inward from a lower end of the outer peripheral part 53. An inner edge of the lip part 54 is located radially outward of the outer edge of the disc-like tool accessory 91. The width of the lip part 54 in the radial direction may be changed form the example of this embodiment, or the lip part 54 may be omitted.

The rail 55A is a thin plate-like part that protrudes radially outward from the cover body 50. More specifically, the rail 55A protrudes radially outward from an upper end of the outer peripheral part 53. The rail 55A is positioned such that an upper surface 551 of the rail 55A is substantially flush with (substantially at the same location in the up-down direction as) an upper surface 513 of the upper plate part 51. The width (radial length) of the rail 55A is substantially constant and is much smaller than the radial length of the upper plate part 51. The thickness of the rail 55A in the up-down direction is substantially constant. With such a structure, the rail 55A may also be said as an arcuate protruding part that protrudes radially outward of the upper plate part 51 or the outer peripheral part 53.

The rail 55A has multiple engagement holes 56A that are spaced apart from each other. In this embodiment, all the engagement holes 56A are at equal intervals, but the engagement holes 56A may be arranged at different intervals. Each of the engagement holes 56A is formed through the rail 55A in the up-down direction (i.e., in the thickness direction of the rail 55A). The engagement hole 56A may however be a recess (bottomed hole) that is open downward, or a recess (notch) recessed radially inward from an outer edge of the rail 55A. The engagement hole 56A of this embodiment has a circular section.

A structure that is provided on/in the housing 10A for mounting the cover 5A to the housing 10A is now described.

As shown in FIGS. 1, 3, 5 and 6, the housing 10A is provided with a body engagement part 31A that is configured to engage with the cover body 50 (specifically, the upper plate part 51) of the cover 5A, and a rail engagement part 30A that is configured to engage with the rail 55A.

Figure 5:
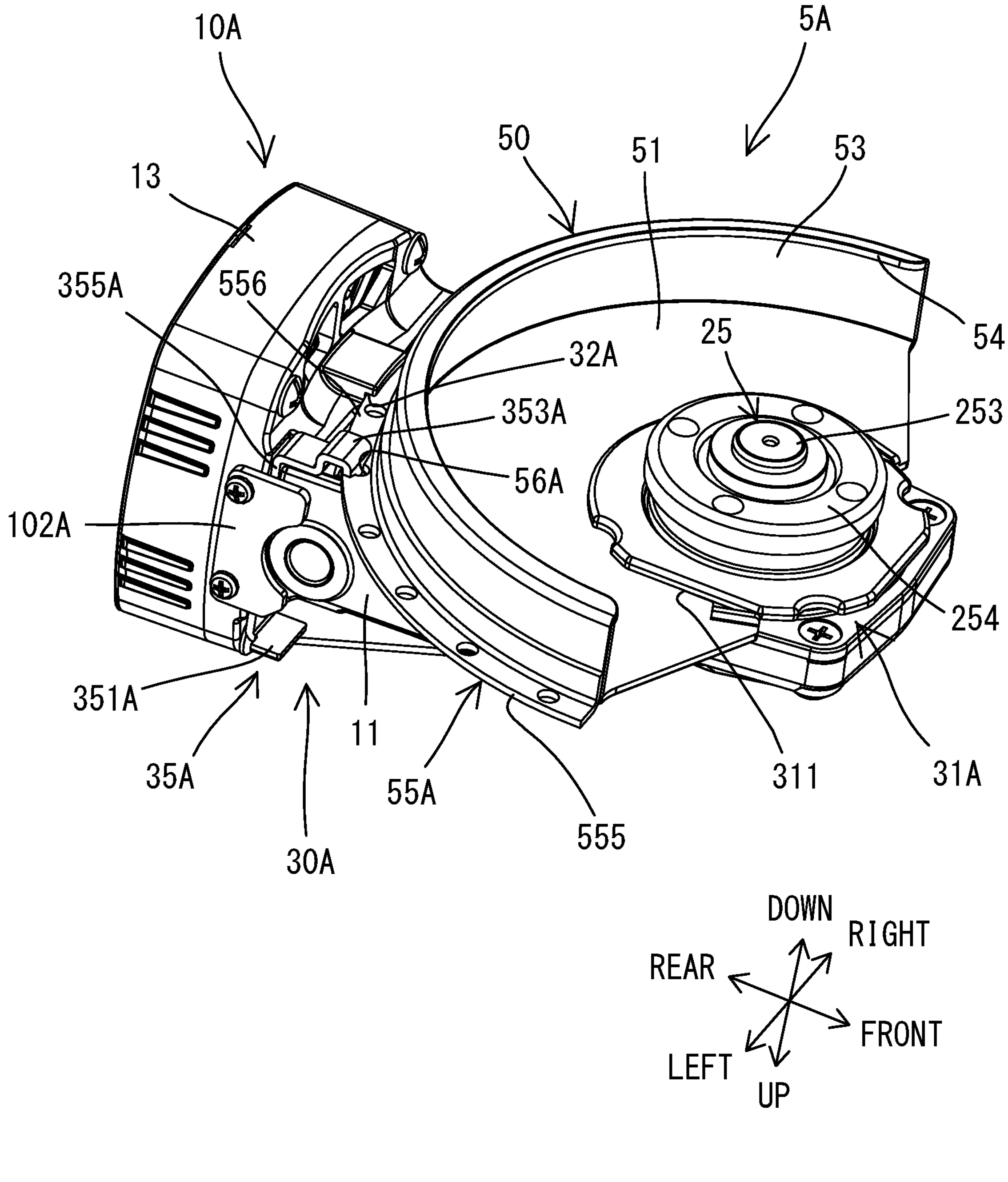
FIG. 5 is a perspective view of a front end portion of the grinder.
Figure 6:
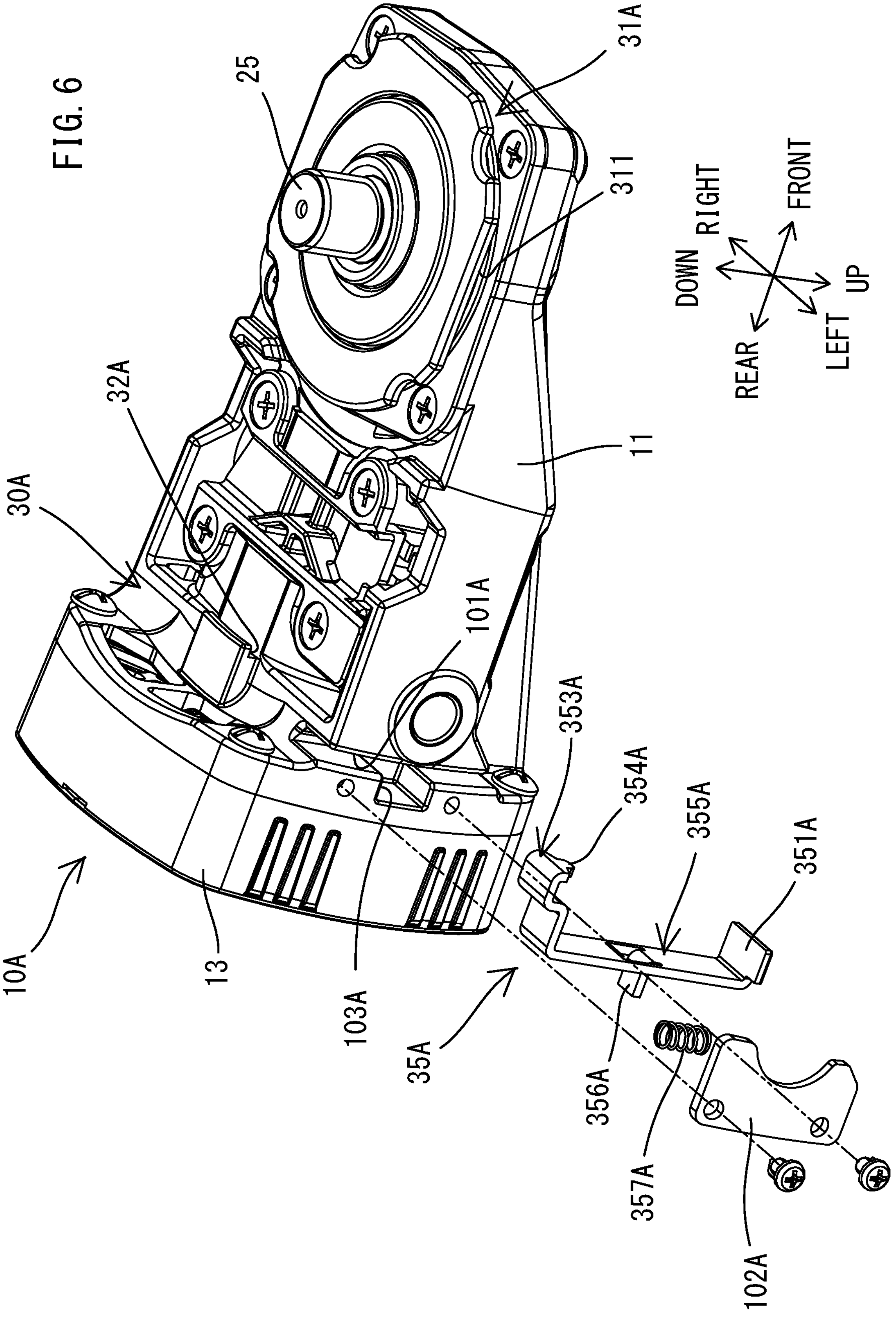
FIG. 6 is a partial, exploded perspective view of the grinder with a tool accessory and the cover removed therefrom.

As shown in FIGS. 3, 5 and 6, the body engagement part 31A includes a body engagement groove 311. The body engagement groove 311 is an annular groove formed in the housing 10A such that the body engagement groove 311 surrounds (encircles) the drive axis DX (the spindle 25). The body engagement groove 311 is configured to receive at least a portion of an inner edge part 512 (an arcuate part along the inner edge 511) of the upper plate part 51 of the cover body 50. More specifically, the body engagement groove 311 and the inner edge part 512 are configured to have generally complementary sectional shapes. When the user mounts the cover 5A to the housing 10A, the user first places the cover 5A such that the upper plate part 51 is substantially orthogonal to the drive axis DX and the inner edge part 512 faces the body engagement groove 311 from the front of the housing 10A. Then the user moves the cover 5A rearward relative to the housing 10A and fits the inner edge part 512 into the body engagement groove 311. Further, the user can turn the cover 5A around the drive axis DX relative to the housing 10A with the inner edge part 512 of the upper plate part 51 fitted in the body engagement groove 311.

The rail engagement part 30A includes a rail engagement groove 32A and a lever 35A.

As shown in FIGS. 3, 5 and 6, the rail engagement groove 32A is radially outward of the cover 5A in the housing 10A. In this embodiment, the rail engagement groove 32A is formed substantially in the center of the housing 10A in the left-right direction behind the body engagement groove 311. The rail engagement groove 32A is open forward and is recessed rearward, and extends arcuately. The rail engagement groove 32A is configured to receive a portion of an outer edge part 556 (an arcuate part extending along the outer edge 555) of the rail 55A. The rail engagement groove 32A and the outer edge part 556 are configured to have generally complementary sectional shapes. As described above, the upper surface 551 of the rail 55A is substantially flush with the upper surface 513 of the upper plate part 51 of the cover body 50, so that upper ends of the body engagement groove 311 and the rail engagement groove 32A are located substantially at the same location in the up-down direction.

The rail engagement groove 32A faces a portion of the body engagement groove 311 that is located behind the spindle 25 in the front-rear direction. The rail engagement groove 32A is configured such that the distance between a bottom surface (depth end surface) of the body engagement groove 311 and a bottom surface of the rail engagement groove 32A is slightly longer than the distance between the inner edge 511 of the upper plate part 51 and the outer edge 555 of the rail 55A in the radial direction. Owing to this structure, when the user turns the cover 5A with the inner edge part 512 of the upper plate part 51 fitted in the body engagement groove 311 as described above, the outer edge 555 of the rail 55A is fitted into the rail engagement groove 32A. In this state, the user can turn the cover 5A to a desired position. The cover 5A is rotated while the inner edge part 512 of the upper plate part 51 and the outer edge part 556 of the rail 55A slide in the body engagement groove 311 and the rail engagement groove 32A, respectively.

As shown in FIGS. 1, 5 and 6, the lever 35A is provided on/in the housing 10A and located radially outward of the cover 5A. In this embodiment, the lever 35A is disposed on a left rear end portion of the driving-mechanism housing part 11. The lever 35A is supported to be linearly movable. The lever 35A is partially exposed to the outside of the housing 10A and partially disposed within the housing 10A.

More specifically, as shown in FIGS. 1 and 5 to 7, the lever 35A includes a manipulation part 351A that is configured to be manipulated by the user, an engagement part 353A that is configured to engage with the rail 55A, and a connection part 355A that connects the manipulation part 351A and the engagement part 353A. In this embodiment, the manipulation part 351A, the connection part 355A and the engagement part 353A are formed as a single (seamless) metal member. The lever 35A may, however, be formed by fixedly connecting originally separate members together.

The connection part 355A is a plate-like part that linearly extends in the up-down direction. The manipulation part 351A protrudes from one end (upper end) of the connection part 355A in its longitudinal direction, and extends in a direction (forward) that intersects the connection part 355A. The engagement part 353A protrudes from the other end (lower end) of the connection part 355A in the longitudinal direction, and extends in the direction (forward) crossing the connection part 355A. An engagement projection 354A protrudes from a tip end (distal end, leading end) of the engagement part 353A toward the manipulation part 351A (upward). The engagement projection 354A is configured to engage with any one of the engagement holes 56A of the rail 55A of the cover 5A. The width of the tip end of the engagement projection 354A in the left-right direction is set slightly smaller than the diameter of the engagement hole 56A.

The lever 35A is supported such that the manipulation part 351A is exposed upward from the housing 10A, the connection part 355A is at least partially within the housing 10A, the engagement part 353A is exposed downward from the housing 10A, and the engagement projection 354A protrudes upward.

Figure 7:
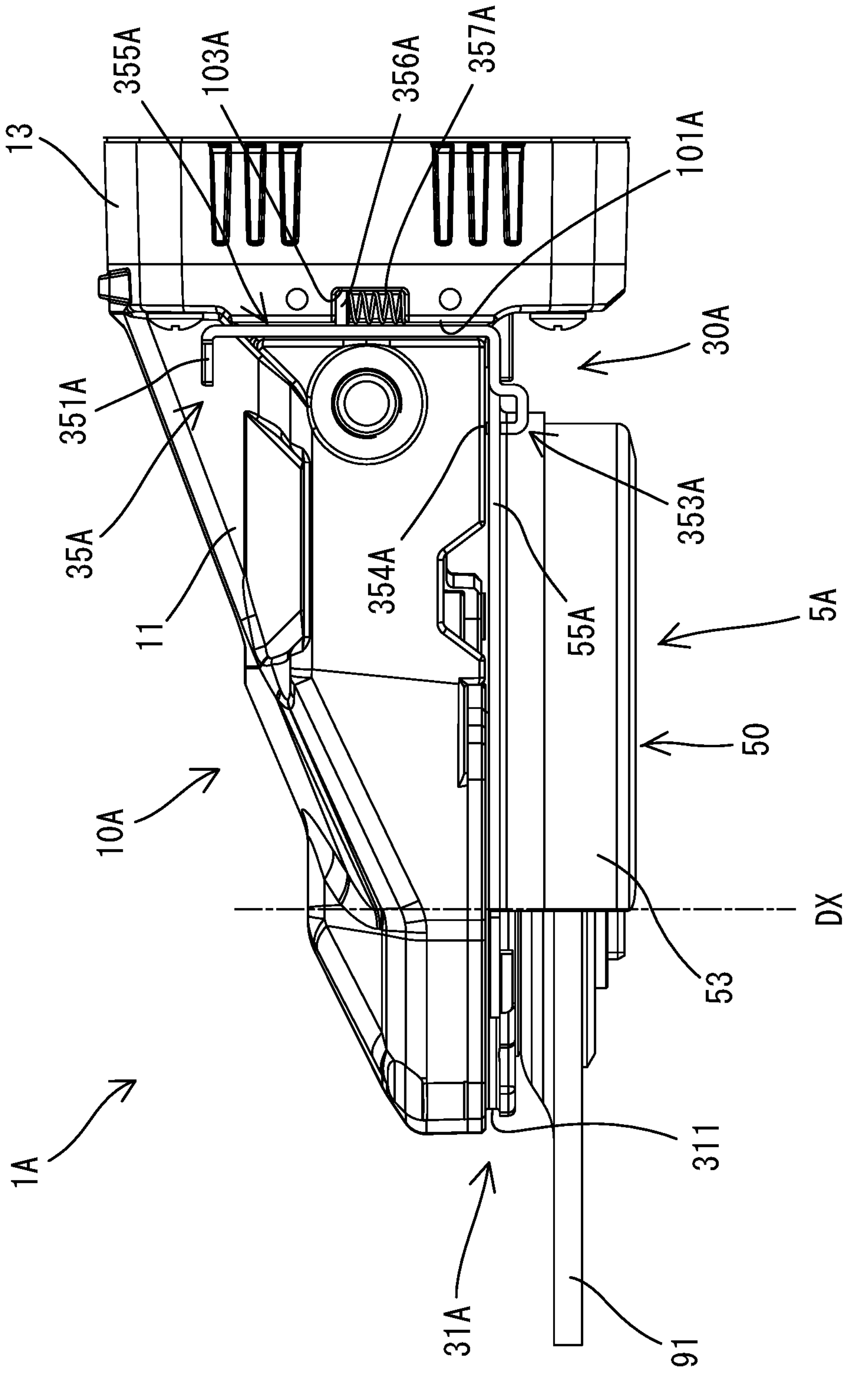
FIG. 7 is a partial, left side view of the grinder with a lever placed in an engagement position and with the cover removed therefrom.

More specifically, as shown in FIGS. 6 and 7, a portion of the connection part 355A is disposed within a holding groove 101A that is formed in a rear end portion of the driving-mechanism housing part 11. The portion of the connection part 355A is slidable substantially in parallel to the drive axis DX (i.e., substantially in the up-down direction). The holding groove 101A is recessed to the right from a left side surface of the housing 10A (the driving-mechanism housing part 11) and has open upper and lower ends. Upper and lower ends of the connection part 355A protrude upward and downward from the holding groove 101A, respectively. The manipulation part 351A protrudes forward from the connection part 355A above the holding groove 101A. The engagement part 353A protrudes forward from the connection part 355A below the holding groove 101A. The holding groove 101A is covered by a cover part 102A from the left. In this manner, the holding groove 101A and the cover part 102A are utilized to house a portion (the connection part 355A) of the lever 35A within the housing 10A. This configuration facilitate assembling. Further, this configuration can reduce a possibility that the lever 35A is affected by an unintended (unexpected) external force.

In this embodiment, the lever 35A is biased upward by a biasing member 357A. More specifically, a spring receiving projection 356A protrudes rearward from the connection part 355A of the lever 35A. A spring receiving recess 103A is formed on the rear side of the holding groove 101A of the housing 10A and communicates with the holding groove 101A. The spring receiving projection 356A is arranged within the spring receiving recess 103A. The biasing member 357A is a compression coil spring. The biasing spring 357A is below the spring receiving projection 356A within the spring receiving recess 103A. Therefore, in an initial state in which an external force is not applied against the biasing force of the biasing member 357A, the lever 35A is held in an uppermost position where the spring receiving projection 356A abuts a surface that defines an upper end of the spring receiving recess 103A.

Figure 8:
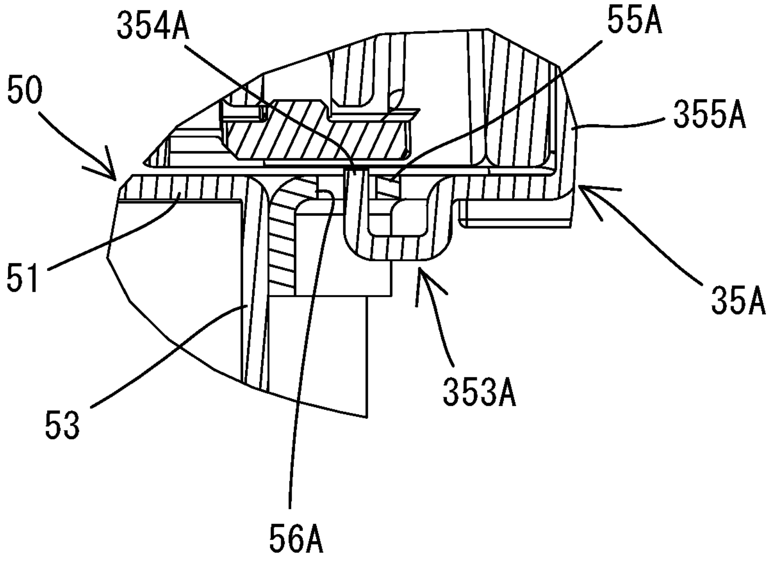
FIG. 8 is a sectional view showing a rail and the lever placed in the engagement position.

When the lever 35A is at the uppermost position, the manipulation part 351A of the lever 35A is spaced apart upward from an upper end of the holding groove 101A. The engagement projection 354A of the engagement part 353A is at a position where the engagement projection 354A is engageable with the engagement hole 56A of the rail 55A of the cover 5A. More specifically, when the engagement projection 354A is at a position corresponding to any one of the engagement holes 56A of the rail 55A in the circumferential direction around the drive axis DX, and the lever 35A is at the uppermost position, as shown in FIG. 8, the engagement projection 354A protrudes into the engagement hole 56A from below and engages with the engagement hole 56A. Further, engagement between the engagement projection 354A and the engagement hole 56A is stably maintained by the biasing force of the biasing member 357A. The position of the lever 35A at which the lever 35A is engageable with the rail 55A (specifically, the position at which the engagement projection 354A is engageable with any one of the engagement holes 56A) is hereinafter also referred to as an engagement position of the lever 35A.

When the lever 35A is at the engagement position and the engagement projection 354A is engaged with one of the engagement holes 56A, the engagement projection 354A and the engagement hole 56A can reliably restrict rotation of the cover 5A relative to the housing 10A. Further, engagement between the rail 55A (the outer edge part 556) and the rail engagement groove 32A can restrict movement of the cover body 50 in the up-down direction relative to the housing 10A. Similarly, since the upper plate part 51 (the inner edge part 512) of the cover body 50 of the cover 5A is also engaged with the body engagement groove 311, movement of the cover 5A in the up-down direction can be restricted at two locations that are spaced apart from each other in the front-rear direction. Thus, movement of the cover body 50 in the up-down direction relative to the housing 10A can be effectively restricted. Further, movement of the cover body 50 in the front-rear direction relative to the housing 10A can also be effectively restricted.

Figure 9:
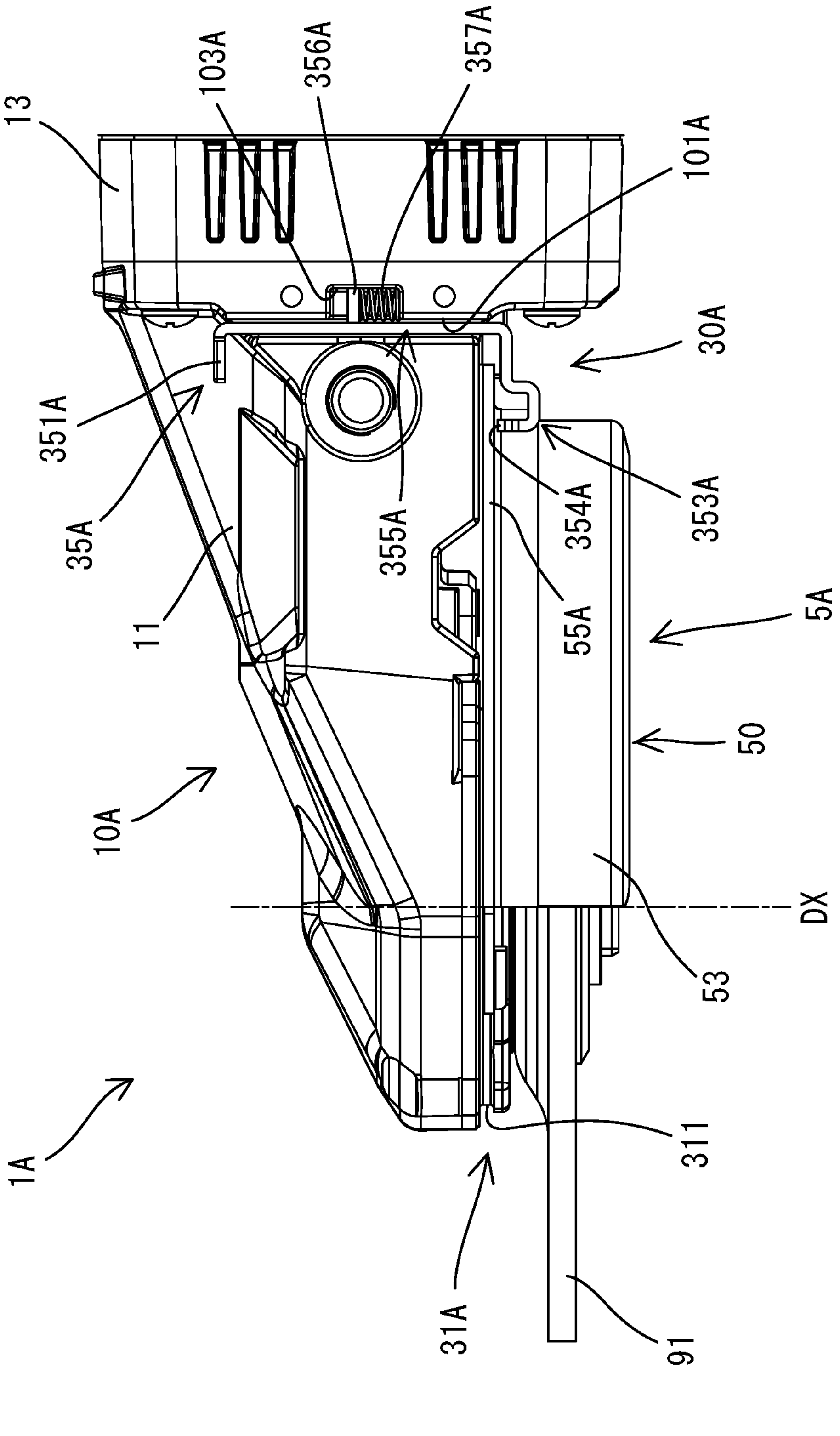
FIG. 9 is a partial, left side view of the grinder with the lever placed in a disengagement position and with the cover removed therefrom.
Figure 10:
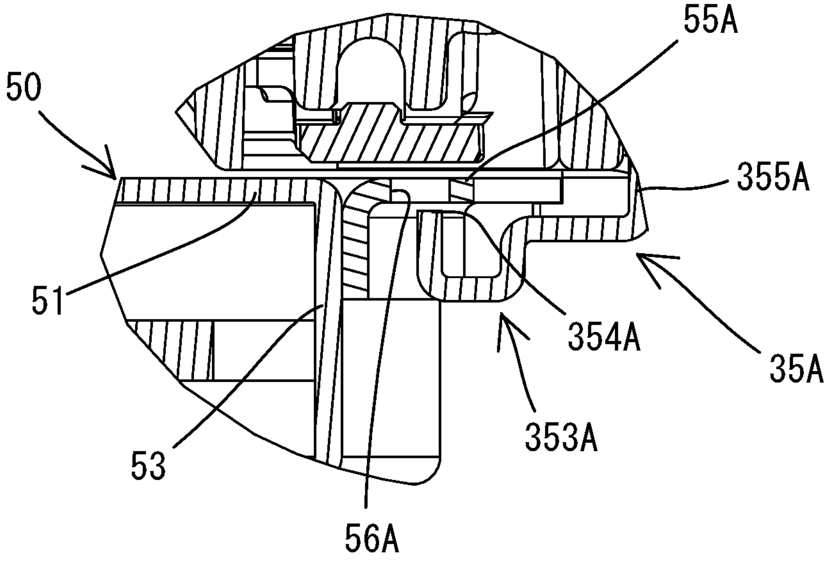
FIG. 10 is a sectional view showing the rail and the lever placed in the disengagement position.

The lever 35A can be moved downward from the engagement position in response to user's manipulation. Specifically, when the user pushes the manipulation part 351A downward, as shown in FIGS. 9 and 10, the lever 35A is moved downward against the biasing force of the biasing member 357A and the engagement projection 354A of the engagement part 353A is disengaged from the engagement hole 56A of the rail 55A. Thus, the engagement between the engagement projection 354A and the engagement hole 56A is released. The position of the lever 35A at which the lever 35A is not engageable with the rail 55A (specifically, the position at which the engagement projection 354A cannot engage with the engagement hole 56A) is hereinafter also referred to as a disengagement position of the lever 35A. When the lever 35A is at the disengagement position, the user can turn the cover 5A relative to the housing 10A around the drive axis DX to a desired position, or remove the cover 5A from the housing 10A In this embodiment, the manipulation part 351A of the lever 35A is exposed upward from the housing 10A. Therefore, the user can easily move the lever 35A from the engagement position to the disengagement position. Further, the lever 35A is configured to be linearly moved when the user pushes the manipulation part 351A downward. Therefore, the user can manipulate the manipulation part 351A more easily, compared with a structure that requires the user to pull the manipulation part 351A upward.

As described above, in the grinder 1A of this embodiment, the rail 55A provided on the cover body 50 can restrict (i) movement of the cover body 50 in the circumferential direction (i.e., rotation around the drive axis DX) relative to the housing 10A, and (ii) movement of the cover body 50 in other directions (specifically, the up-down direction and the front-rear direction)relative to the housing 10A, in cooperation with the rail engagement part 30A (the rail engagement groove 32A and the lever 35A) provided on/in the housing 10A. Thus, the rail 55A performs two functions of (i) properly positioning the cover body 50 in the circumferential direction relative to the housing 10A, and (ii) suppressing looseness or play in the other directions. Therefore, compared with a case in which two separate (discrete, individual) structures respectively perform these two functions, a space required in the power tool can be smaller and the power tool can be simplified in structure. In this embodiment, the upper surface 551 of the rail 55A is flush with the upper surface 513 of the upper plate part 51, so that the upper surfaces 551, 513 can be integrally utilized to restrict upward movement of the cover body 50 (i.e., to suppress looseness in the up-down direction).

Further, the rail 55A is a protruding part protruding radially outward from the cover body 50 and not protruding upward or downward from the cover body 50. In addition, the rail engagement groove 32A of the rail engagement part 30A is above the lower end of the cover body 50, and the lower end of the lever 35A is above the lower end of the cover body 50 both when the lever 35A is at the engagement position and at the disengagement position. This configuration can suppress size increase of the entire grinder 1A (particularly, a front end portion of the grinder 1A) in the up-down direction. Further, the rail 55A and the rail engagement part 30A do not interfere with (get in the way of) the processing operation. Thus, this embodiment provides the grinder 1A that is easy to operate even in a relatively narrow space.

Second Embodiment

A grinder 1B of a second embodiment is now described with reference to FIG. 11. The grinder 1B of the second embodiment has substantially the same structure (including a slight difference in shape) as that of the grinder 1A of the first embodiment except for a housing 10B. Most of the housing 10B has substantially the same structure as that of the grinder 1A of the first embodiment. Therefore, components of the housing 10B that are substantially identical to those of the grinder 1A are given the same numerals and their description is omitted or simplified, and different structures are mainly described. The same applies to subsequent embodiments.

Figure 11:
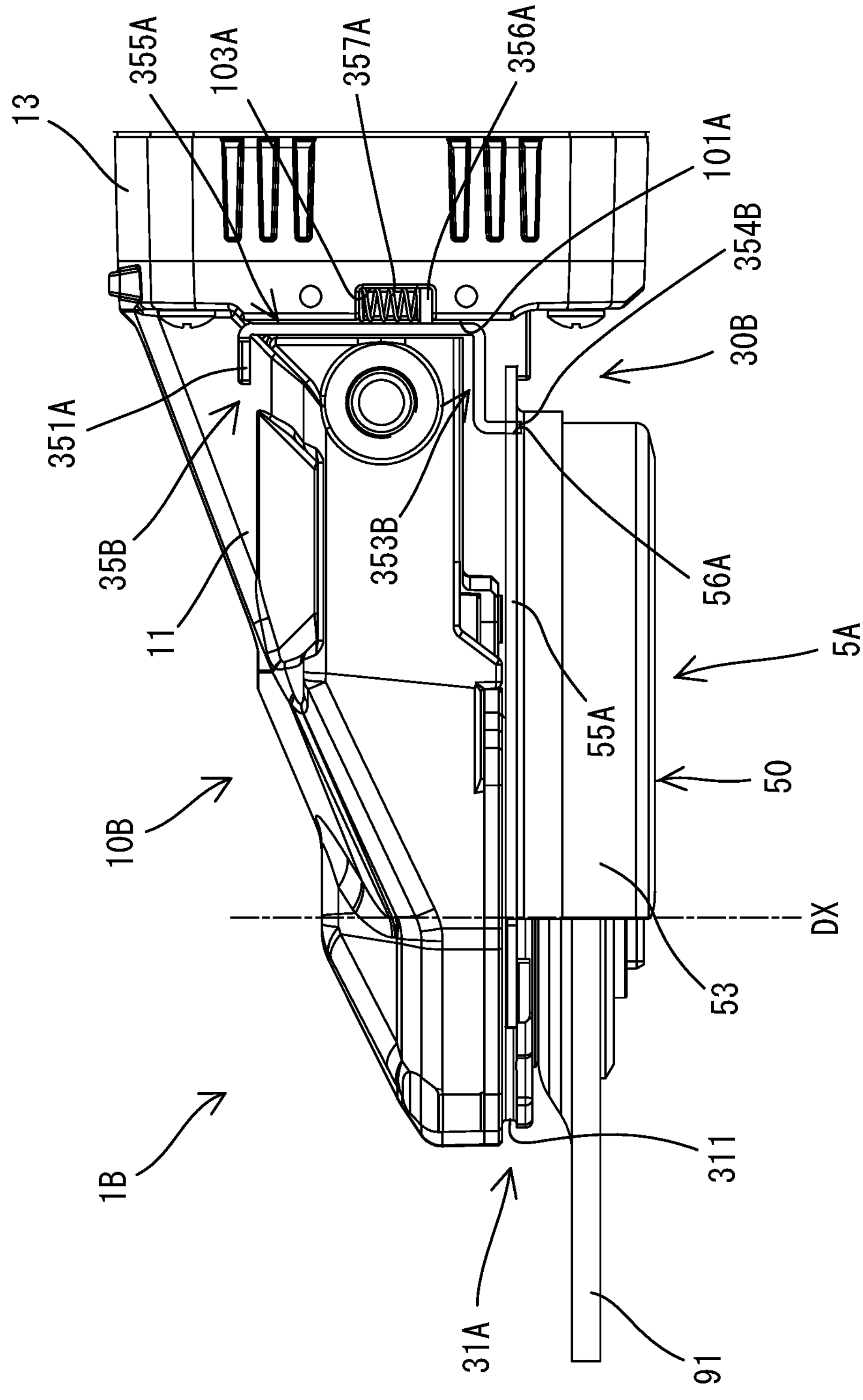
FIG. 11 is a partial, left side view showing a grinder of a second embodiment, with a lever placed in the engagement position and with a cover removed therefrom.

As shown in FIG. 11, the housing 10B of the second embodiment has the same body engagement part 31A as that of the first embodiment and a rail engagement part 30B that is different from the rail engagement part 30A of the first embodiment. In the other points, the housing 10 has substantially the same structure as the housing 10A of the first embodiment. The rail engagement part 30B includes the same rail engagement groove 32A (see FIG. 3) as that of the first embodiment and a lever 35B that is different from the lever 35A (see FIG. 7) of the first embodiment.

The lever 35B is configured such that the operating direction is reverse to that of the lever 35A. More specifically, the lever 35B includes the manipulation part 351A that is configured to be manipulated by a user, an engagement part 353B that is configured to engage with any one of the engagement holes 56A of the rail 55A, and the connection part 355A that connects the manipulation part 351A and the engagement part 353B. Like in the first embodiment, a portion of the connection part 355A is held to be slidable in the up-down direction within the holding groove 101A. The manipulation part 351A protrudes forward from the upper end of the connection part 355A above the holding groove 101A. The engagement part 353B protrudes forward from the lower end of the connection part 355A. An engagement projection 354B protrudes downward from a tip end (distal end) of the engagement part 353B. Thus, the engagement projection 354B protrudes in the opposite direction to the direction in which the engagement projection 354A of the first embodiment protrudes. The width of the tip end of the engagement projection 354B in the left-right direction is set slightly smaller than the diameter of the engagement hole 56A.

In this embodiment, the biasing member 357A is disposed on the upper side of the spring receiving projection 356A within the spring receiving recess 103A. Thus, the lever 35B is biased downward by the biasing member 357A. In an initial state, the lever 35B is held in a lowermost position where the spring receiving projection 356A abuts a surface that defines a lower end of the spring receiving recess 103A. When the lever 35B is at the lowermost position, the engagement projection 354B is engageable with one of the engagement holes 56A of the rail 55A. Thus, in this embodiment, the lowermost position of the lever 35B corresponds to the engagement position of the lever 35B, and the disengagement position of the lever 35B is defined above the engagement position. Although not shown, the user can move the lever 35B upward to the disengagement position by pulling up the manipulation part 351A against the biasing force of the biasing member 357A.

In this embodiment, the rail 55A and the rail engagement part 30B also perform two functions of (i) properly positioning the cover body 50 in the circumferential direction relative to the housing 10B and (ii) suppressing looseness in other directions, in cooperation with each other. Therefore, compared with a case in which separate structures respectively perform these two functions, a space required in the power tool can be reduced and the power tool can be simplified in structure.

Further, the rail 55A is a protruding part protruding radially outward from the cover body 50 and not protruding upward or downward from the cover body 50. The lever 35B is above the lower end of the cover body 50 both in the engagement position and in the disengagement position. Therefore, in this embodiment, size increase of the entire grinder 1B (particularly, a front end portion of the grinder 1B) can also be suppressed in the up-down direction. Thus, this embodiment provides the grinder 1B that is easy to operate even in a relatively narrow space.

Third Embodiment

A grinder 1C of a third embodiment is now described with reference to FIGS. 12 to 16. The grinder 1C includes a cover 5C and a housing 10C that are partially different in structure from the cover 5A and the housing 10A of the first embodiment.

Figure 12:
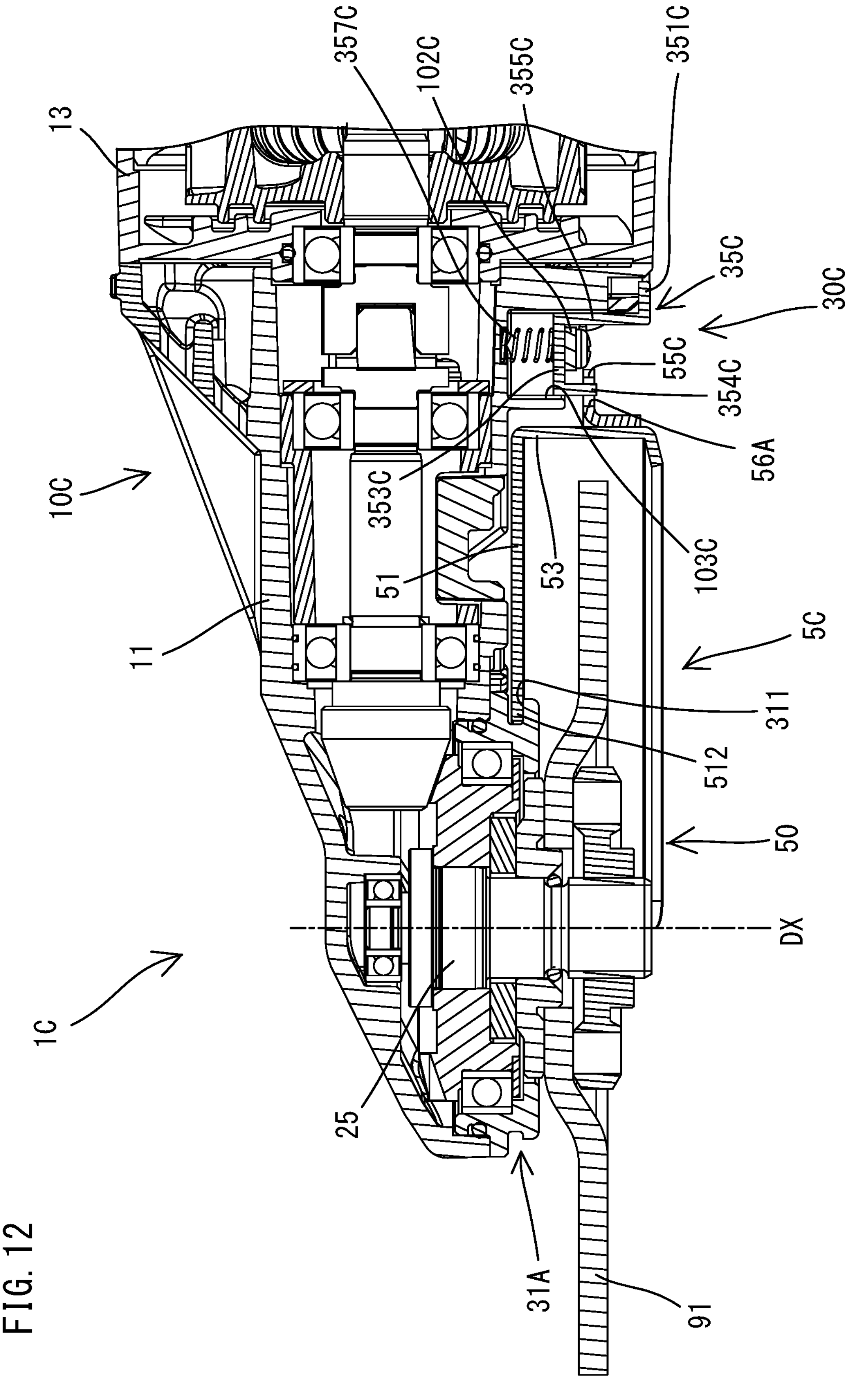
FIG. 12 is a partial, sectional view showing a grinder of a third embodiment, with a lever placed in the engagement position.
Figure 13:
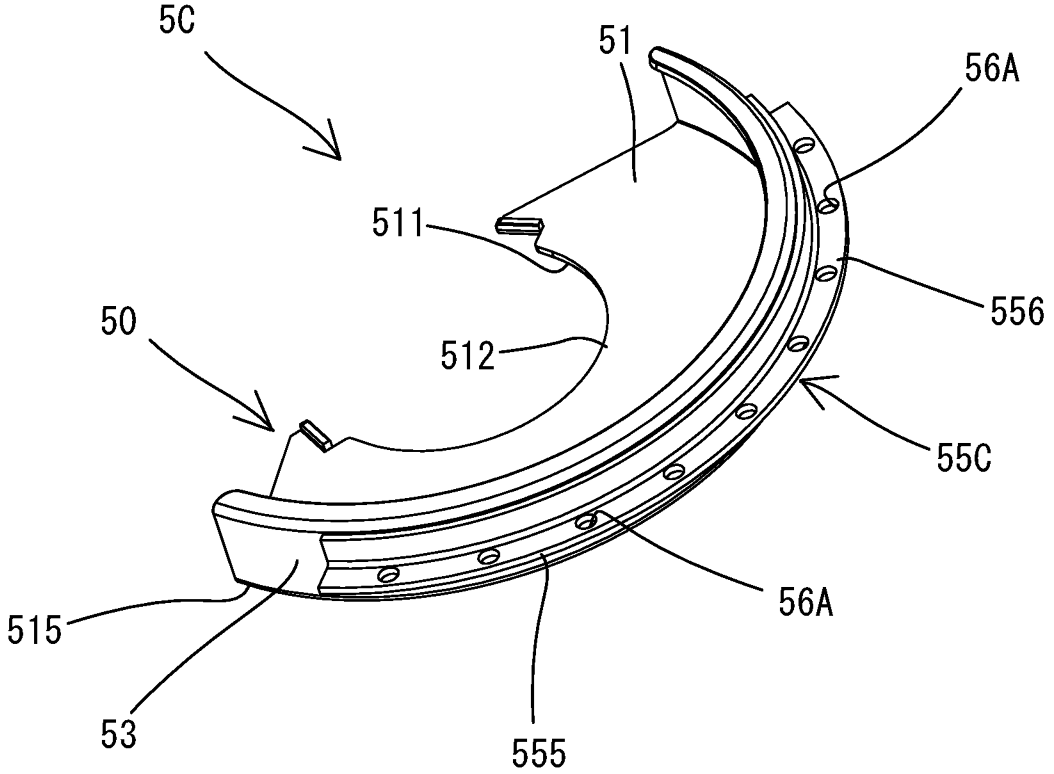
FIG. 13 is a perspective view of a cover.

As shown in FIGS. 12 and 13, the cover 5C includes the cover body 50 and a rail 55C. The rail 55C has substantially the same structure as the rail 55A (see FIG. 4) of the first embodiment. The rail 55C is an arcuate protruding part protruding radially outward from the cover body 50 and has the engagement holes 56A. Unlike in the first embodiment, however, the rail 55C protrudes substantially from the center of the outer peripheral part 53 in the up-down direction.

Figure 14:
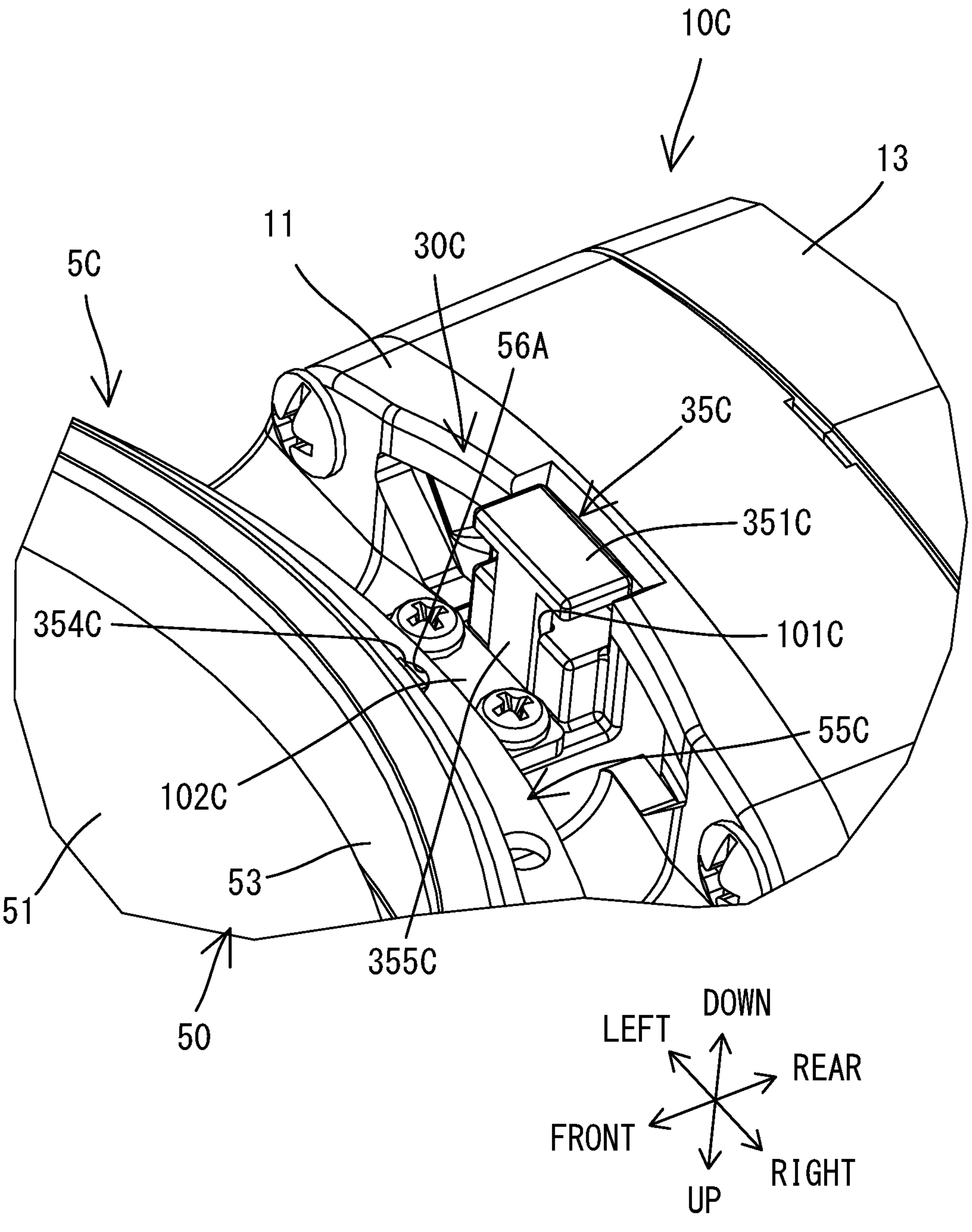
FIG. 14 is an enlarged perspective view showing a rail engagement part and its vicinity.
Figure 15:
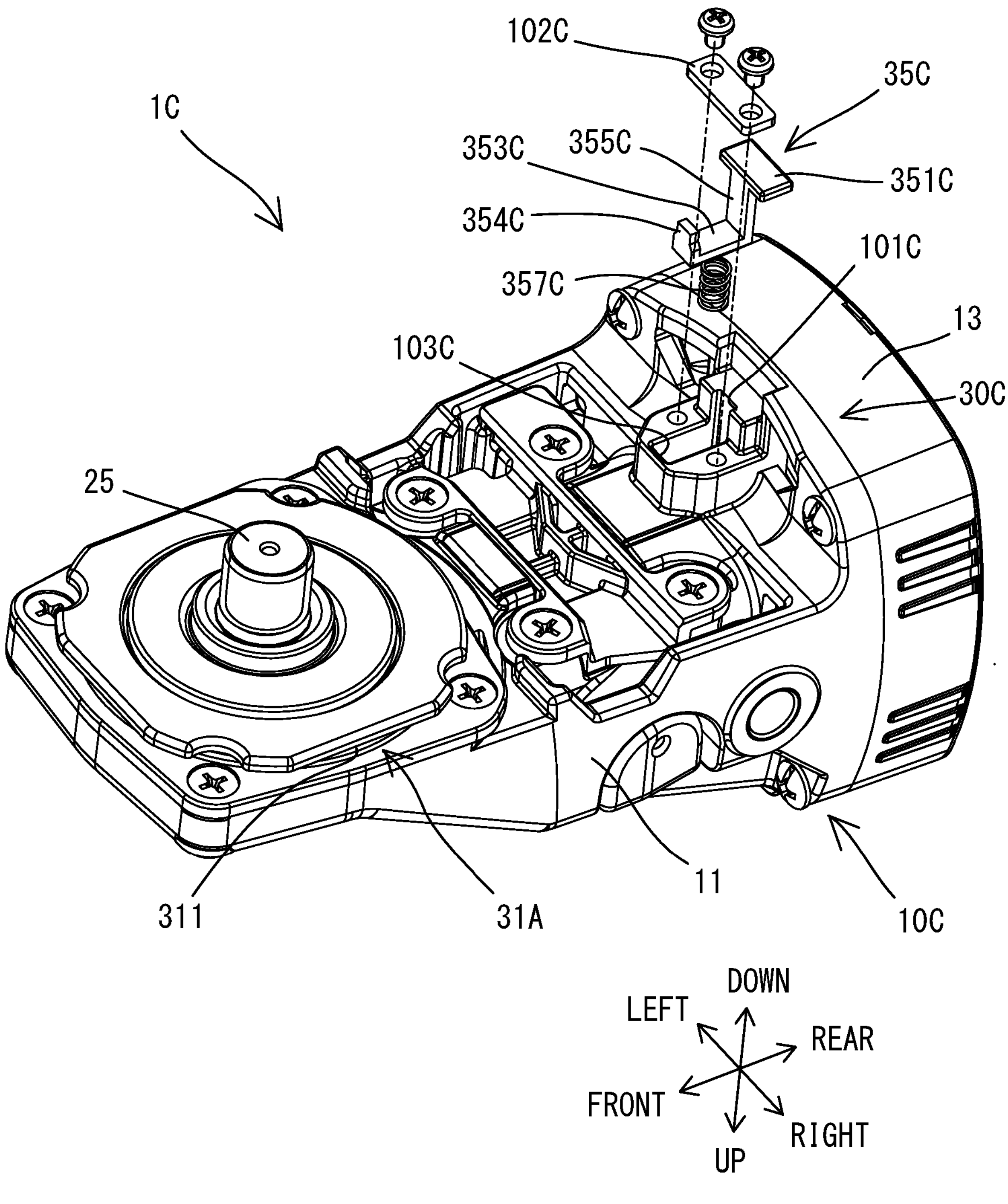
FIG. 15 is a partial, exploded perspective view of the grinder with the tool accessory and the cover removed therefrom.

As shown in FIGS. 12, 14 and 15, the housing 10C has the same body engagement part 31A (the body engagement groove 311) as that of the first embodiment and a rail engagement part 30C that is different from the rail engagement part 30A of the first embodiment. In the other points, the housing 10C has substantially the same structure as the housing 10A of the first embodiment.

The rail engagement part 30C is provided behind the cover 5C and includes a lever 35C that is different from the lever 35A of the first embodiment. The lever 35C is partially housed in a lower portion of the housing 10C. The lever 35C is configured to be manipulated from below the housing 10C by a user. More specifically, the lever 35C includes a manipulation part 351C that is configured to be manipulated by the user, an engagement part 353C that is configured to engage with any one of the engagement holes 56A of the rail 55C, and a connection part 355C that connects the manipulation part 351C and the engagement part 353C.

The connection part 355C is a plate-like part that extends linearly. The connection part 355C is arranged to be slidable in the up-down direction within a holding groove 101C that is formed in a lower end portion of the housing 10C. The holding groove 101C is substantially in the center of the housing 10C in the left-right direction. The manipulation part 351C is connected to a lower end of the connection part 355C below the holding groove 101C so as to form a T-shape together with the connection part 355C. The engagement part 353C protrudes from an upper end of the connection part 355C forward of the holding groove 101C. An engagement projection 354C is formed on a tip end of the engagement part 353C and protrudes downward. The width of the tip end of the engagement projection 354C in the left-right direction is set slightly smaller than the diameter of the engagement hole 56A.

The lever 35C is biased downward by a biasing member 357C. The biasing member 357C is within a spring receiving recess 103C formed in the housing 10C. The spring receiving recess 103C is configured to communicate with the holding groove 101C on the front side of the holding groove 101C and to be recessed upward. The engagement part 353C of the lever 35C is within the spring receiving recess 103C. The spring receiving recess 103C is covered by a cover part 102C from below. In this manner, the spring receiving recess 103C and the cover part 102C are utilized to arrange a portion of the lever 35C within the housing 10C. This configuration facilitates assembling. Further, this configuration can reduce the possibility that the lever 35C is affected by an unintended external force.

Figure 16:
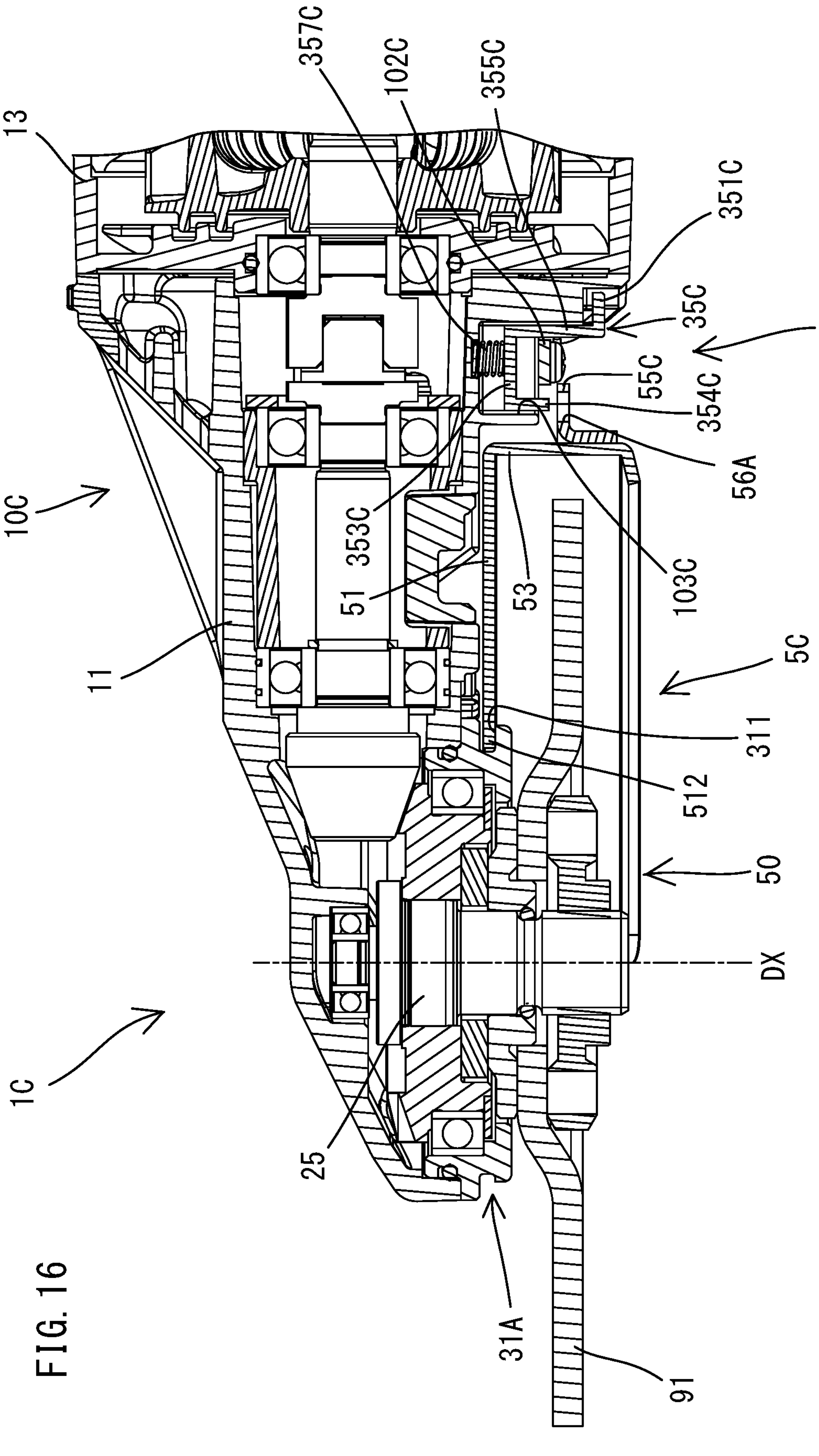
FIG. 16 is a partial, sectional view of the grinder, with the lever placed in the disengagement position.

The biasing member 357C is a compression coil spring and is disposed above the engagement part 353C within the spring receiving recess 103C. Therefore, as shown in FIG. 12, in the initial state, the lever 35C is held in a lowermost position where the engagement part 353C abuts (is in contact with) an upper surface of the cover part 102C. When the lever 35C is at the lowermost position, the engagement projection 354C is engageable with any one of the engagement holes 56A of the rail 55C. Thus, in this embodiment, the lowermost position of the lever 35C corresponds to the engagement position of the lever 35C, and the disengagement position of the lever 35C is defined above the engagement position. As shown in FIG. 16, the user can move the lever 35C upward to the disengagement position by pushing the manipulation part 351C upward against the biasing force of the biasing member 357C.

As described above, in the grinder 1C of this embodiment, engagement between the rail 55C provided on the cover body 50 and the lever 35C provided on/in the housing 10C can restrict rotation of the cover body 50 relative to the housing 10C. In this embodiment, engagement between the engagement projection 354C of the lever 35C and the engagement hole 56A of the rail 55C can also reliably restrict rotation of the cover body 50 relative to the housing 10C.

The rail 55C is a protruding part protruding radially outward from the cover body 50 and not protruding upward or downward from the cover body 50. In this embodiment, an entirety of the lever 35C is between the upper end and the lower end of the cover body 50 both in the engagement position and in the disengagement position. This configuration can also suppress size increase of the entire grinder 1C (particularly, a front end portion of the grinder 1C) in the up-down direction. Further, the rail 55C and the lever 35C do not interfere with the processing operation. Thus, this embodiment provides the grinder 1C that is easy to operate even in a relatively narrow space.

Fourth Embodiment

A grinder 1D of a fourth embodiment is now described with reference to FIGS. 17 to 21. The grinder 1D includes a cover 5D and a housing 10D that are partially different in structure from the cover 5A and the housing 10A of the first embodiment.

Figure 17:
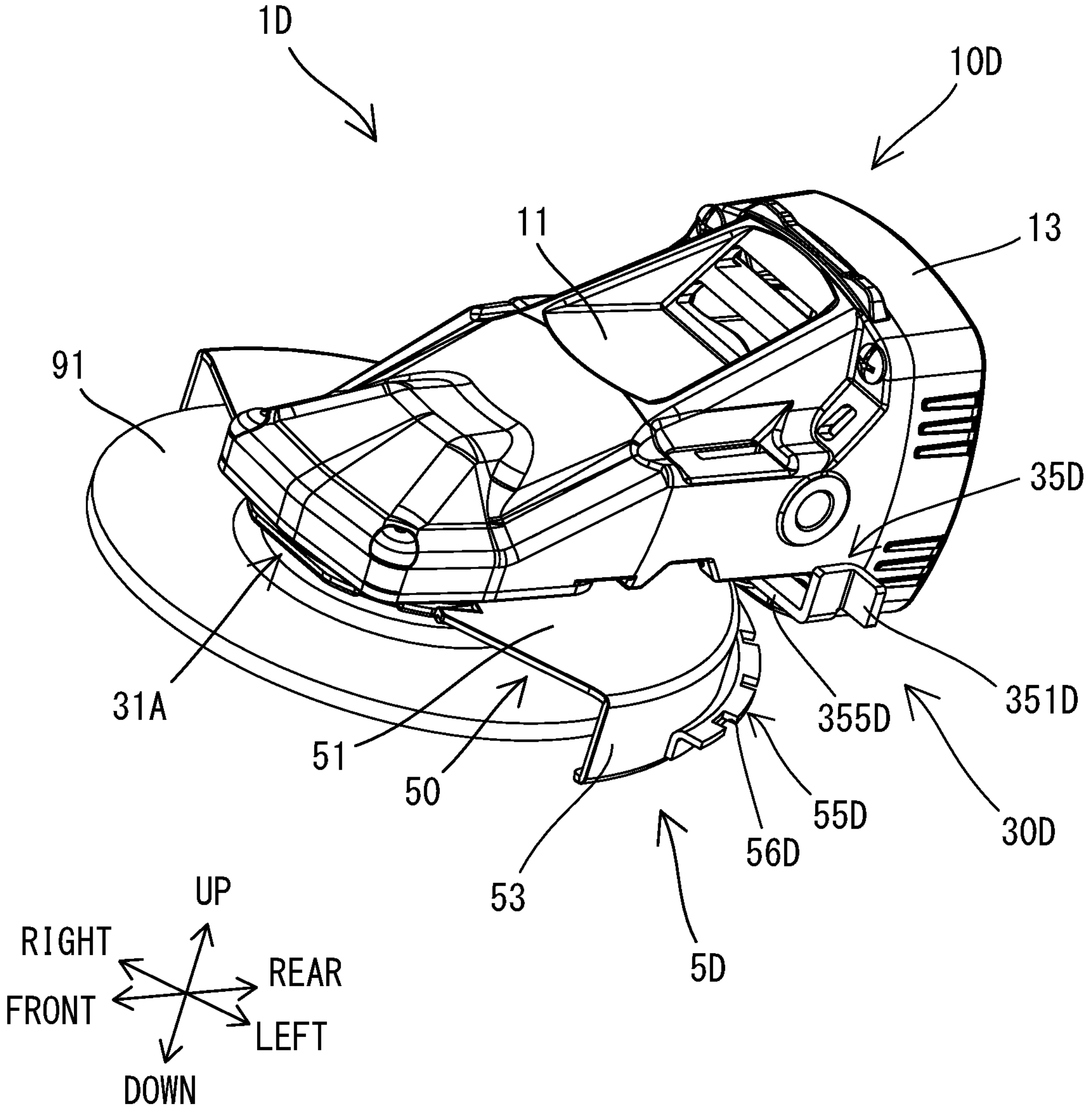
FIG. 17 is a partial, perspective view showing a grinder of a fourth embodiment.
Figure 18:
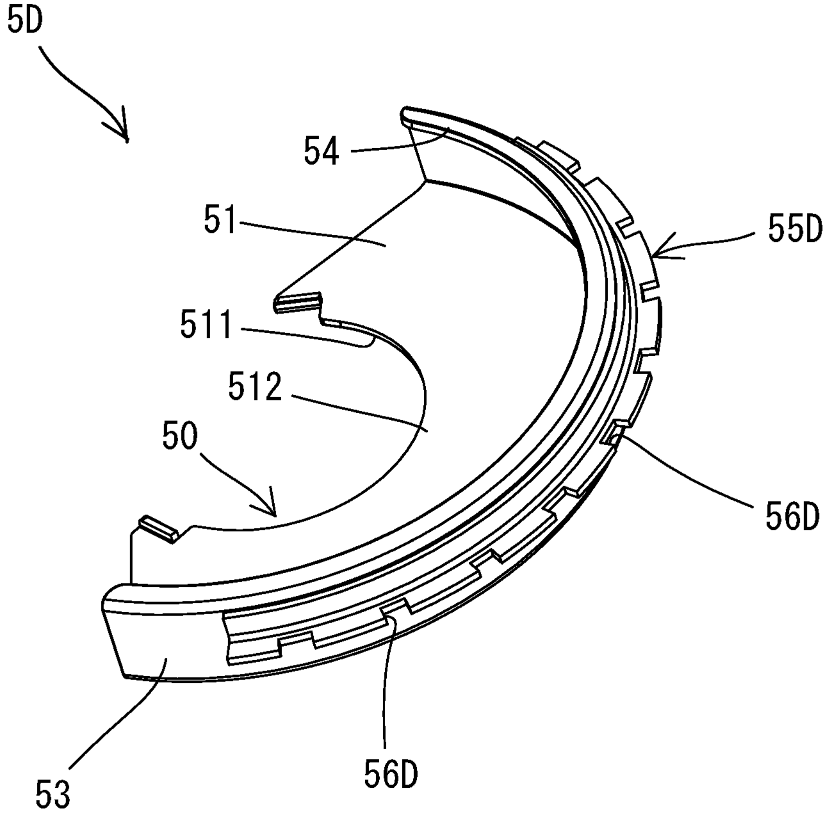
FIG. 18 is a perspective view of a cover.

As shown in FIGS. 17 and 18, the cover 5D includes the cover body 50 and a rail 55D. Like the rail 55A (see FIG. 4) of the first embodiment, the rail 55D is configured as an arcuate protruding part protruding radially outward. Unlike the rail 55A, however, the rail 55D protrudes substantially from the center of the outer peripheral part 53 in the up-down direction. The rail 55D has engagement recesses 56D formed in the outer edge. Each of the engagement recesses 56D is a rectangular recess (notch) recessed radially inward from the outer edge of the rail 55D. In this embodiment, all the engagement recesses 56D are at equal intervals. Instead, the engagement recesses 56D may be at different intervals.

Figure 19:
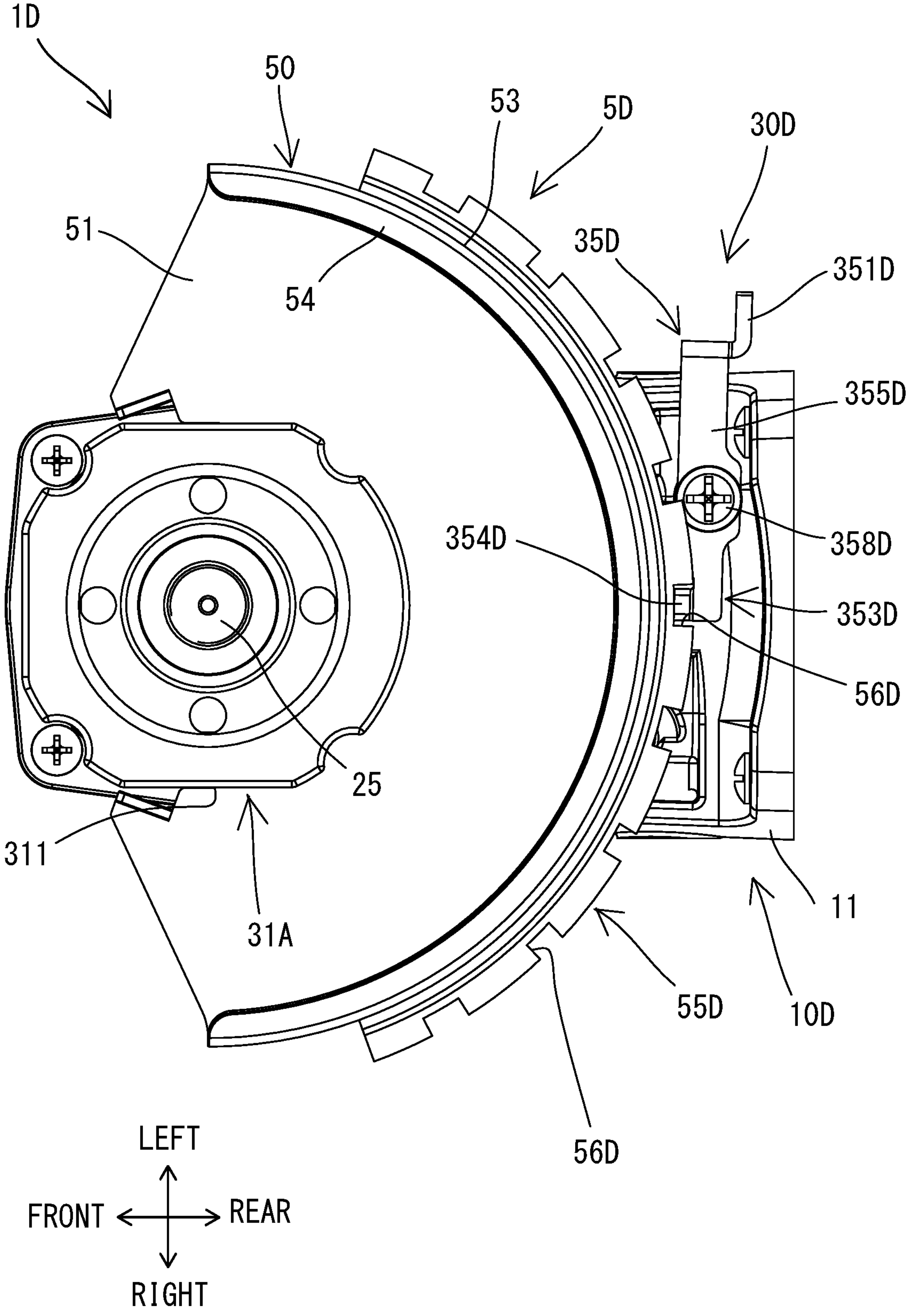
FIG. 19 is a bottom view of the grinder, with a lever placed in the engagement position.
Figure 20:
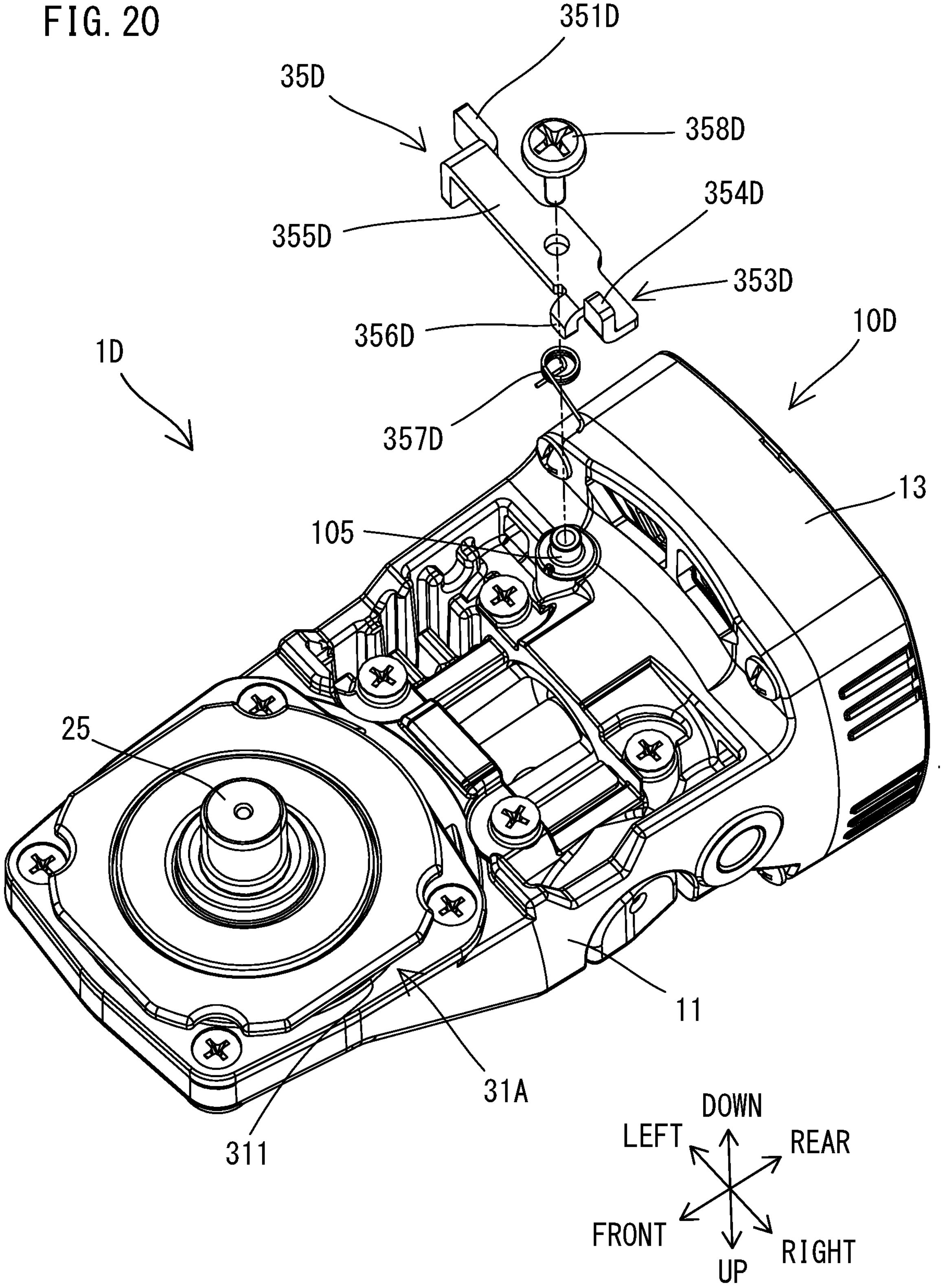
FIG. 20 is a partial, exploded perspective view of the grinder with the tool accessory and the cover removed therefrom.

As shown in FIGS. 17, 19 and 20, the housing 10D has the same body engagement part 31A (the body engagement groove 311) as that of the first embodiment and a rail engagement part 30D that is different from the rail engagement part 30A of the first embodiment. In the other points, the housing 10D has substantially the same structure as the housing 10A of the first embodiment.

The rail engagement part 30D is behind the cover 5D and includes a lever 35D that is different from the lever 35A of the first embodiment. The lever 35D is a rotary lever. The lever 35 is supported behind the cover 5D on/in a lower end portion of the housing 10D. The lever 35D is configured to be manipulated on a lateral side of the housing 10D by a user. More specifically, the lever 35D includes a manipulation part 351D that is configured to be manipulated by the user, an engagement part 353D that is configured to engage with any one of the engagement recesses 56D of the rail 55D, and a connection part 355D that connects the manipulation part 351D and the engagement part 353D.

The connection part 355D is a plate-like part that extends linearly. The connection part 355D is pivotably (rotatably) mounted via a screw 358D to a cylindrical part 105 provided in the lower end portion of the housing 10D. The connection part 355D linearly extends substantially in the left-right direction. The manipulation part 351D is connected to a left end of the connection part 355D and located leftward of the housing 10D. The manipulation part 351D is L-shaped and includes a tab, which protrudes leftward. The engagement part 353D includes an engagement projection 354D that protrudes downward from a right end of the connection part 355D. The engagement projection 354D is substantially in the center of the housing 10D in the left-right direction. The width of the tip end of the engagement projection 354D in the left-right direction is set slightly smaller than the width of the engagement recess 56D in the circumferential direction.

In this embodiment, the lever 35D is pivotally biased by a biasing member 357D to be pivoted (turned, rotated) in such a direction that the engagement projection 354D is moved forward (i.e., toward the cover 5D). More specifically, the biasing member 357D is a torsion coil spring. A coil part of the biasing member 357D is fitted around the cylindrical part 105, into which the screw 358D is threadedly engaged. A spring receiving projection 356D protrudes upward between the screw 358D and the engagement projection 354D in the connection part 355D of the lever 35D. One end of the biasing member 357D is locked to the housing 10D, and the other end of the biasing member 357D is locked to the spring receiving projection 356D. Thus, the lever 35D is pivotally biased around an axis extending in the up-down direction such that the engagement projection 354D is moved forward.

Figure 21:
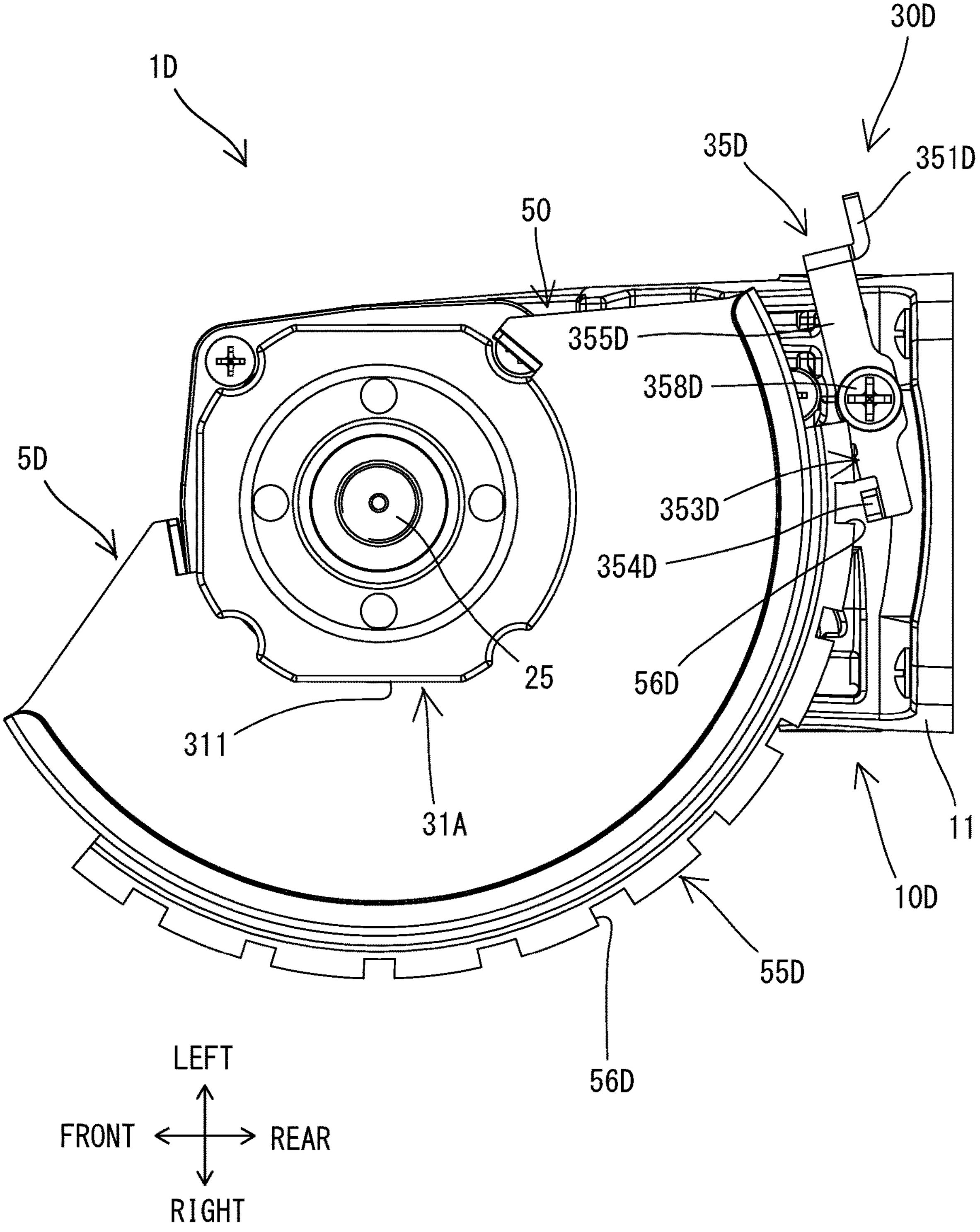
FIG. 21 is a bottom view of the grinder, with the lever placed in the disengagement position.

When the engagement projection 354D is at a position corresponding to any one of the engagement recesses 56D in the circumferential direction, and the lever 35D is at the frontmost position, as shown in FIG. 19, the engagement projection 354D is inserted into the engagement recess 56D from radially outside. In this embodiment, the position of the lever 35D in which the engagement projection 354D is in the frontmost position corresponds to the engagement position of the lever 35D. As shown in FIG. 21, when the user pushes the manipulation part 351D (tab) forward, the lever 35D is pivoted (turned, rotated) around the axis extending in the up-down direction against the biasing force of the biasing member 357D in such a direction that the engagement projection 354D is moved rearward (i.e., away from the cover 5D). Thus, the lever 35D is moved to the disengagement position at which the engagement projection 354D is disengaged from the engagement recess 56D of the rail 55D.

As described above, in the grinder 1D of this embodiment, engagement between the rail 55D provided on the cover body 50 and the lever 35D provided on/in the housing 10D can restrict rotation of the cover body 50 relative to the housing 10D. In this embodiment, engagement between the engagement projection 354D of the lever 35D and the engagement recess (notch) 56D of the rail 55D can also reliably restrict rotation of the cover body 50 relative to the housing 10D.

The rail 55D is a protruding part protruding radially outward from the cover body 50 and not protruding upward or downward from the cover body 50. In this embodiment, the lever 35D is a rotary (pivotable) lever that is movable within (along) a plane that is substantially orthogonal to the drive axis DX. An entirety of the lever 35D is located between the upper end and the lower end of the cover body 50 both in the engagement position and in the disengagement position. This configuration can also suppress size increase of the entire grinder 1D (particularly, a front end portion of the grinder 1D) in the up-down direction. Further, the rail 55D and the lever 35D do not interfere with the processing operation. Thus, this embodiment provides the grinder 1D that is easy to operate even in a relatively narrow space.

Fifth Embodiment

A grinder 1E of a fifth embodiment is now described with reference to FIGS. 22 to 28. The grinder 1E includes a cover 5E and a housing 10E that are partially different in structure from the cover 5A and the housing 10A of the first embodiment.

Figure 22:
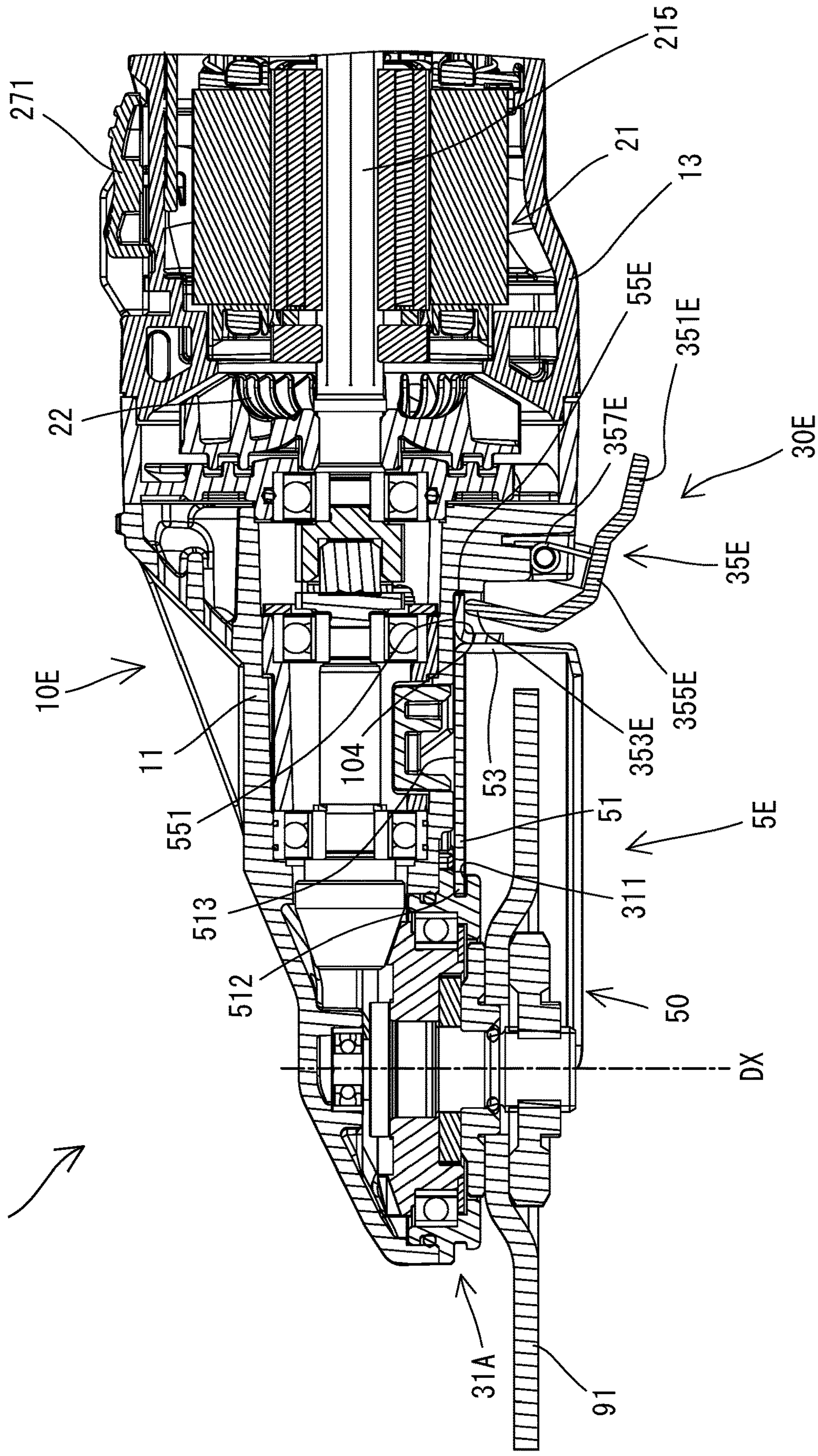
FIG. 22 is a partial, sectional view showing a grinder of a fifth embodiment, with a lever placed in the engagement position.
Figure 23:
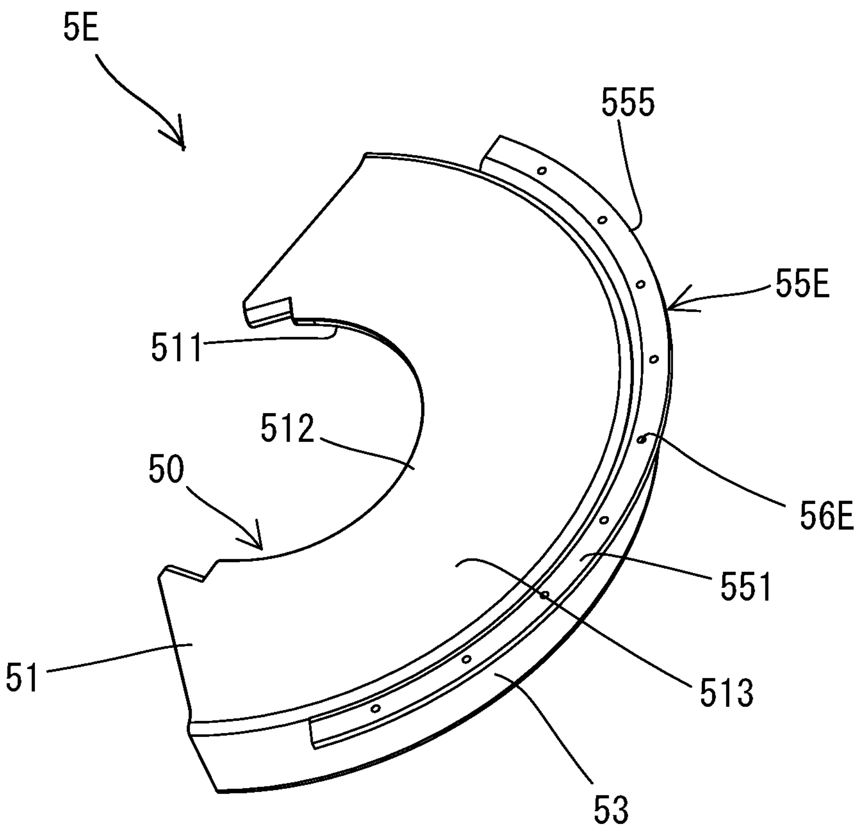
FIG. 23 is a perspective view of a cover.

As shown in FIGS. 22 and 23, the cover 5E includes the cover body 50 and a rail 55E. Like the rail 55A of the first embodiment, the rail 55E is configured as an arcuate protruding part protruding radially outward. The upper surface 551 of the rail 55E is substantially flush with the upper surface 513 of the upper plate part 51. Unlike in the first embodiment, however, the rail 55E has engagement recesses 56E formed in the upper surface 551. Each of the engagement recesses 56E is a hemispherical recess recessed downward from the upper surface 551. In this embodiment, all the engagement recesses 56E are at equal intervals. Instead, the engagement recesses 56E may be at different intervals.

As shown in FIGS. 22 and 24 to 26, the housing 10E has the same body engagement part 31A (the body engagement groove 311) as that of the first embodiment and a rail engagement part 30E that is different from the rail engagement part 30A of the first embodiment. In the other points, the housing 10E has substantially the same structure as the housing 10A of the first embodiment.

The rail engagement part 30E is behind the cover 5E. The rail engagement part 30E includes an engagement projection 32E (see FIGS. 24 and 26), a restriction wall 33 and a lever 35E.

The engagement projection 32E is directly above the rail 55E of the cover 5E. The engagement projection 32E protrudes downward from a portion of a lower surface 104 that is in a central portion of the housing 10E in the left-right direction. The engagement projection 32E has a shape that is generally complementary to the shape of the engagement recess 56E of the rail 55E. Thus, the engagement projection 32E has a hemispherical shape.

The restriction wall 33 is a wall part extending in the up-down direction behind the engagement projection 32E. A front surface of the restriction wall 33 is gently curved, corresponding to the outer edge 555 of the rail 55E. The restriction wall 33 is configured such that the distance between the bottom surface (depth end surface) of the body engagement groove 311 and a front surface of the restriction wall 33 is slightly longer than the distance between the inner edge 511 of the upper plate part 51 and the outer edge 555 of the rail 55E in the radial direction.

The lever 35E is a rotary (pivotable) lever and is supported on a lower end portion of the housing 10E behind the cover 5E. The lever 35E is configured to be manipulated under the housing 10E by a user. More specifically, the lever 35E is generally L-shaped as viewed from the side (from the left or the right). The lever 35E includes a manipulation part 351E that is configured to be manipulated by the user, an engagement part 353E that is configured to engage with (abut) the rail 55E, and a connection part 355E that connects the manipulation part 351E and the engagement part 353E.

A pair of left and right arm parts 356E protrude from the connection part 355E. The connection part 355E is pivotably (rotatably) mounted to a lower end portion of the housing 10E via a support pin 358E. The support pin 358E is inserted through the arm parts 356E and supported by a pair of left and right support parts 107 of the housing 10E. The support pin 358E extends in the left-right direction. Thus, the lever 35E is pivotable (turnable, rotatable) around an axis extending in the left-right direction. The manipulation part 351E extends substantially rearward from one end of the connection part 355E under the housing 10E. The engagement part 353E extends substantially upward from the other end of the connection part 355E. The engagement part 353E of this embodiment is configured to engage with (abut) the rail 55E and press the rail 55E against the housing 10E (the lower surface 104).

In this embodiment, the lever 35E is pivotally biased by a biasing member 357E to be pivoted (turned, rotated) in such a direction that the engagement part 353E is moved substantially upward (i.e. toward the rail 55E from below). More specifically, the biasing member 357E is a torsion coil spring. A coil part of the biasing member 357E is fitted around the support pin 358E. One end of the biasing member 357E is locked to the housing 10E, and the other end of the biasing member 357E is locked to the connection part 355E. Thus, the lever 35E is biased to be pivoted (turned) around an axis extending in the left-right direction such that the engagement part 353E is moved substantially upward.

Figure 24:
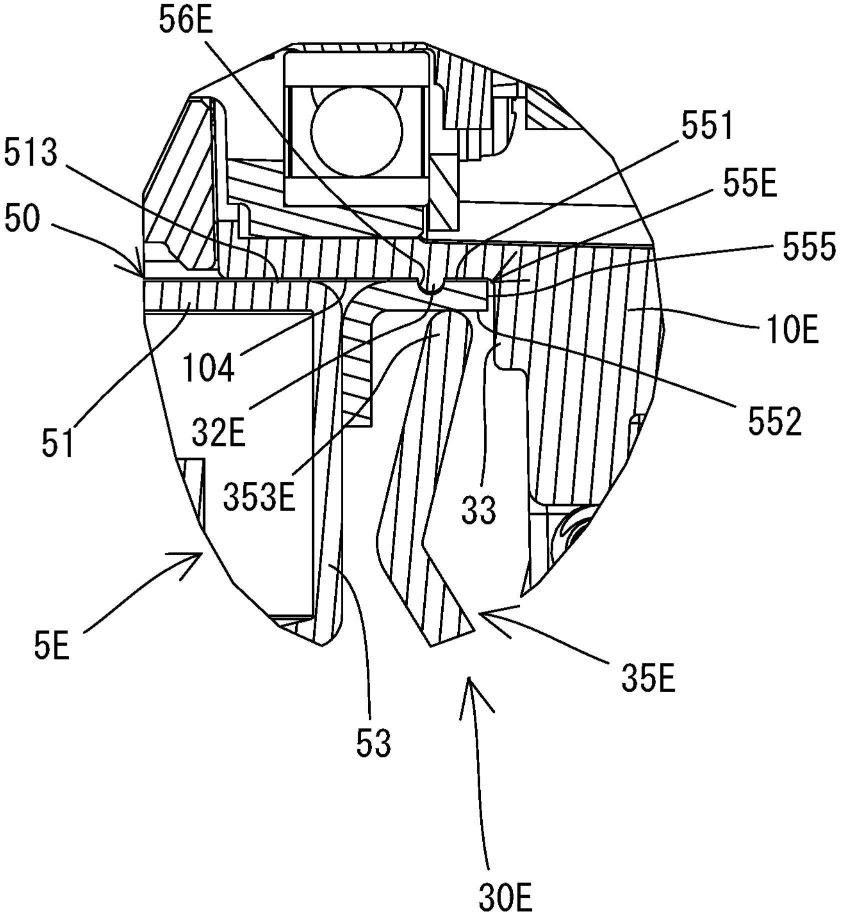
FIG. 24 is a sectional view showing a rail and the lever placed in the engagement position.
Figure 25:
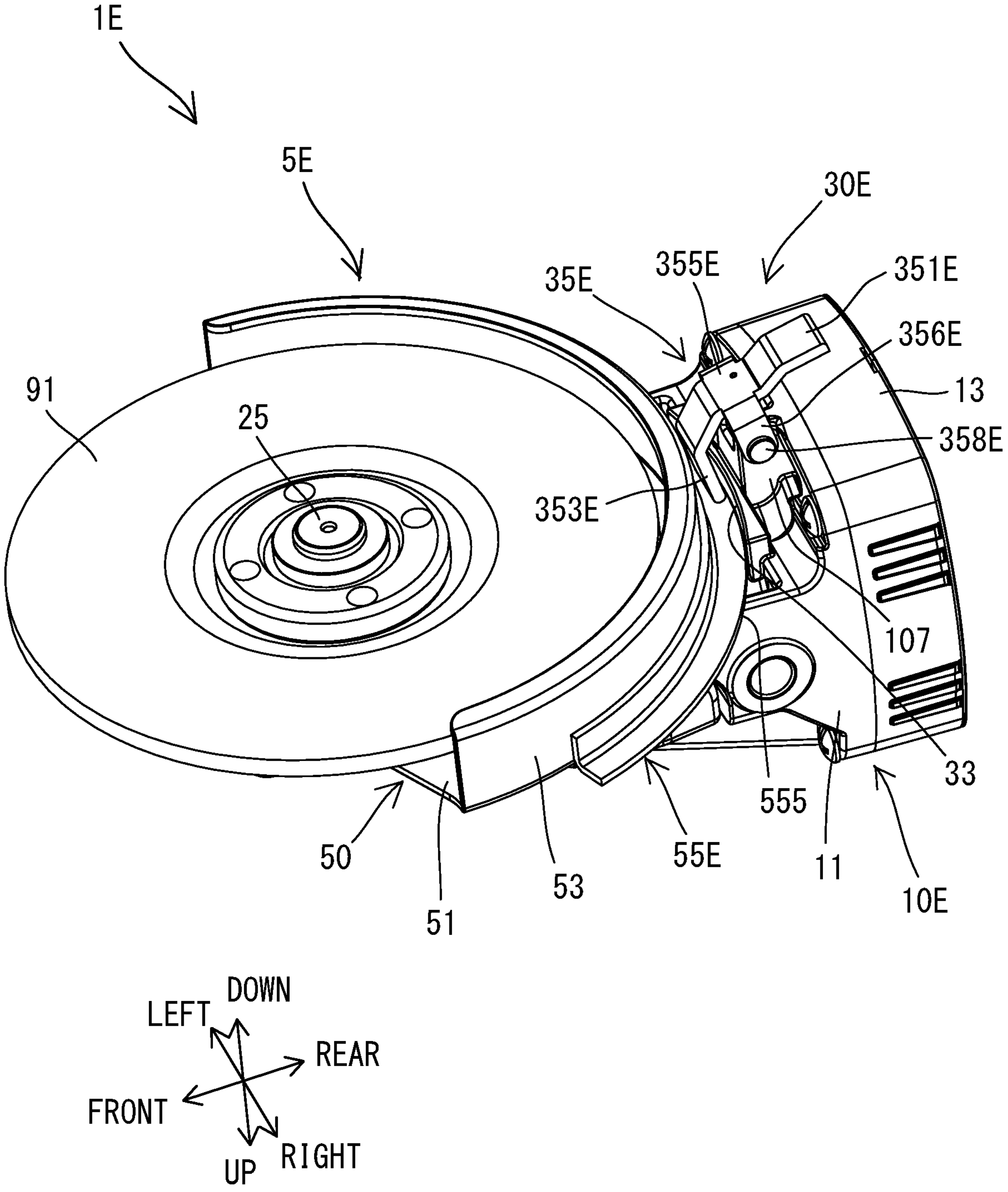
FIG. 25 is a partial, perspective view of the grinder.
Figure 26:
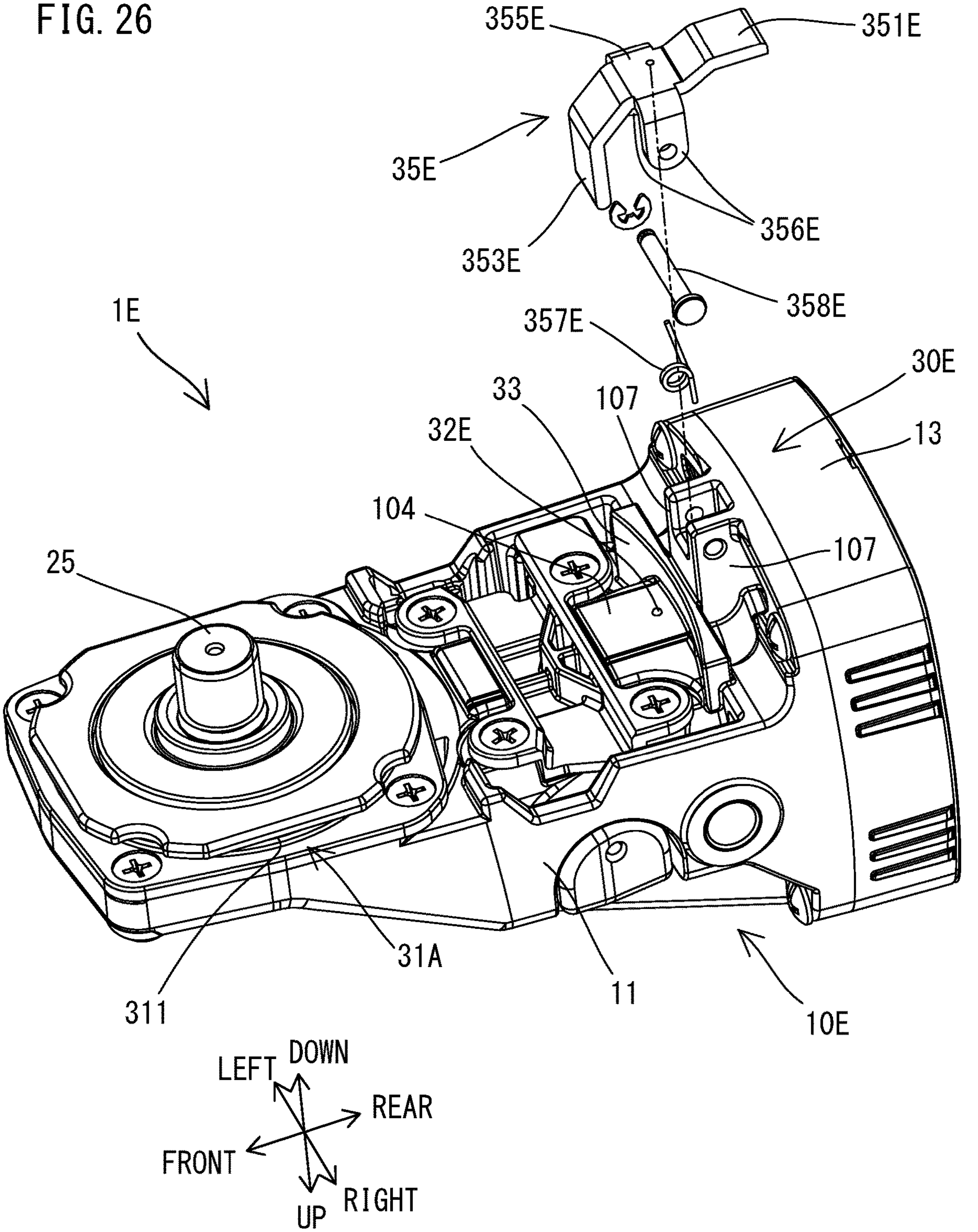
FIG. 26 is a partial, exploded perspective view of the grinder with the tool accessory and the cover removed therefrom.

As shown in FIG. 22, when the engagement part 353E is at its uppermost position, a tip end of the engagement part 353E abuts (is held in contact with) a lower surface 552 of the rail 55E of the cover 5E and presses the rail 55E against the lower surface 104 of the housing 10E. When the engagement projection 32E on the lower surface of the housing 10E is at a position corresponding to any one of the engagement recesses 56E of the cover 5E in the circumferential direction, as shown in FIG. 24, the engagement projection 32E engages with the engagement recess 56E. The position of the lever 35E at which the engagement part 353E engages with (abuts) the rail 55E to press the rail 55E against the housing 10E to thereby cause the engagement projection 32E and the engagement recess 56E to be engaged with each other is hereinafter also referred to as an engagement position of the lever 35E. When the lever 35E is at the engagement position, the manipulation part 351E extends obliquely rearward and downward.

Figure 27:
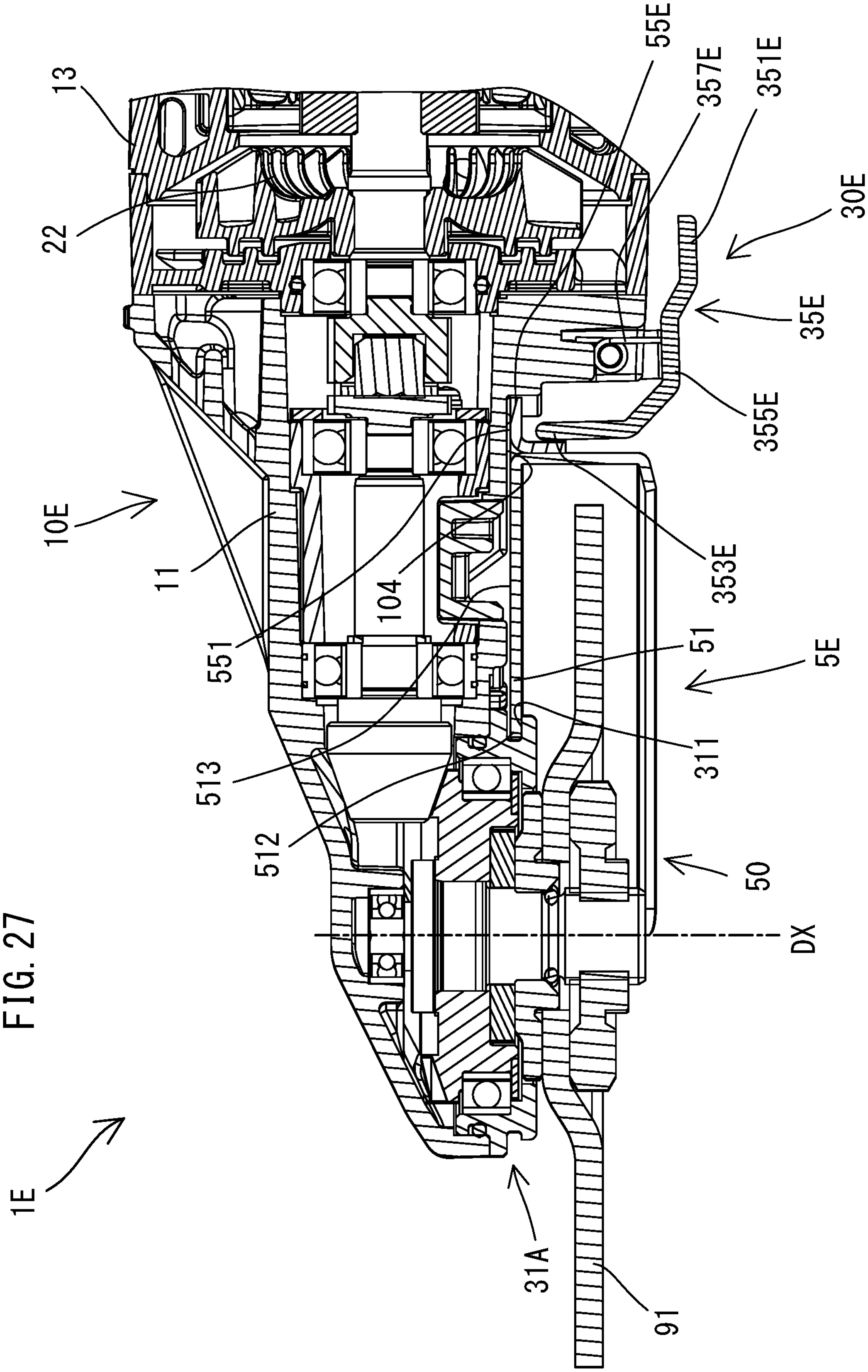
FIG. 27 is a partial, sectional view of the grinder with the lever placed in the disengagement position.
Figure 28:
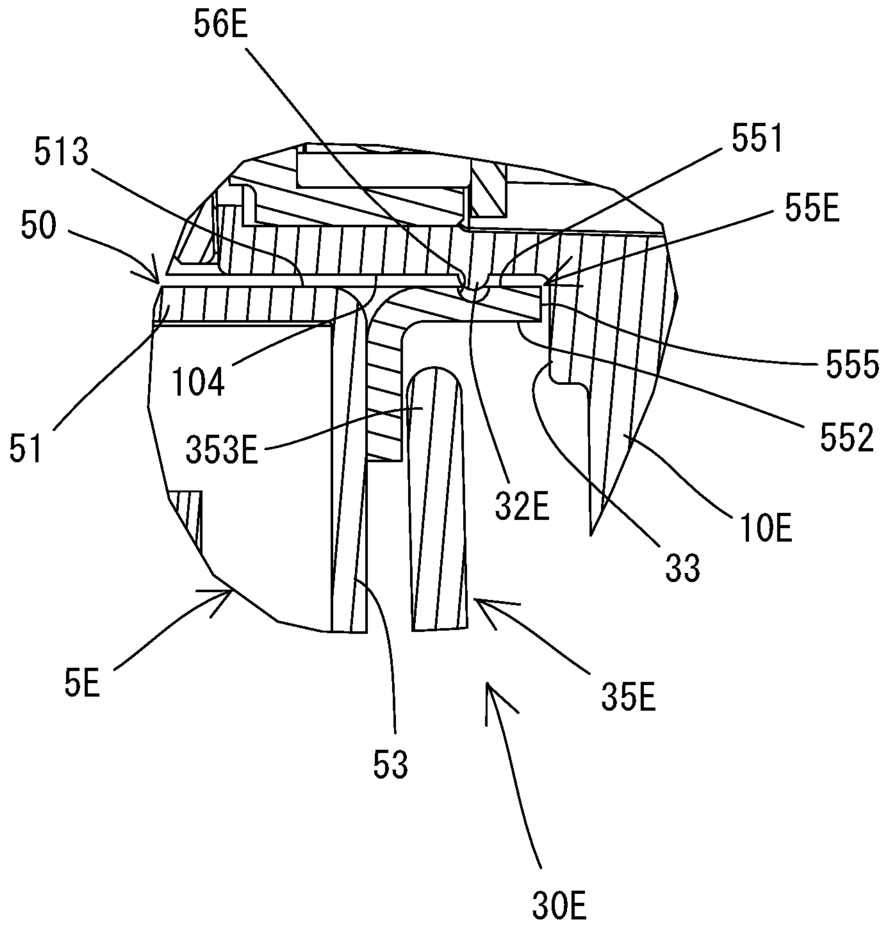
FIG. 28 is a sectional view showing the rail and the lever placed in the disengagement position.

As shown in FIGS. 27 and 28, when a user pushes the manipulation part 351E upward toward the housing 10E, the lever 35E is pivoted (turned, rotated) against the biasing force of the biasing member 357E such that the engagement part 353E is moved downward (i.e., away from the rail 5E). Thus, the engagement projection 32E is disengaged from the engagement recess 56E. The position of the lever 35E in which the engagement projection 32E is not engageable with the engagement recess 56E is hereinafter also referred to as a disengagement position of the lever 35E. When the lever 35E is at the disengagement position, the user can turn the cover 5E to a desired position around the drive axis DX relative to the housing 10E, or remove the cover 5E from the housing 10E.

In this embodiment, as shown in FIGS. 22 and 27, when the lever 35E is both in the engagement position and in the disengagement position, a rear end of the manipulation part 351E (a tip end of the lever 35E) is arranged at least forward of the handle part 15 (see FIG. 2) in the front-rear direction. In this embodiment, the rear end of the manipulation part 351E is forward of the switch knob 271 supported on the motor housing part 13. More specifically, the rear end of the manipulation part 351E is located directly below a front end portion of the motor housing part 13 (more specifically, directly below the fan 22). With such arrangement, when the user holds the handle part 15 and operates the switch knob 271, the lever 35E does not easily interfere with this operation.

As described above, in the grinder 1E of this embodiment, the rail 55E and the rail engagement part 30E cooperate with each other to perform two functions of (i) properly positioning the cover body 50 in the circumferential direction relative to the housing 10E and (ii) suppressing looseness in the other directions. Therefore, compared with a case in which two separate structures respectively perform these two functions, a space required in the power tool can be reduced and the power tool can be simplified in structure.

Specifically, the lever 35E, which is biased by the biasing member 357E, can effectively restrict movement of the rail 55E relative to the housing 10E in the up-down direction by pressing the rail 55E against the lower surface 104 of the housing 10E. In this embodiment, the upper surface 551 of the rail 55E is flush with the upper surface 513 of the upper plate part 51, so that the upper surfaces 551, 513 are integrally pressed against the lower surface 104 of the housing 10E, and movement of the cover 5E in the up-down direction can be more reliably restricted.

Further, in this embodiment, the lever 35E presses the rail 55E against the lower surface 104 of the housing 10E with the hemispherical engagement projection 32E of the housing 10E being engaged with the hemispherical engagement recess 56E of the rail 55E. This configuration can effectively suppress movement of the cover 5E in all directions (e.g., the circumferential direction, the front-rear direction and the up-down direction) relative to the housing 10E. It is noted, however, that the engagement projection 32E may be omitted. Even in such a modification, movement of the cover 5E relative to the housing 10E can be restrained not only in the up-down direction but also in other directions (e.g., the circumferential direction and the front-rear direction) by the lever 35E pressing the rail 55E against the lower surface 104 of the housing 10E. Further, the restriction wall 33 can effectively restrict movement of the cover 5E in the front-rear direction.

Sixth Embodiment

A grinder 1F of a sixth embodiment is now described with reference to FIGS. 29 to 34. The grinder 1F includes a cover 5F and a housing 10F that are partially different in structure from the cover 5A and the housing 10A of the first embodiment.

Figure 29:
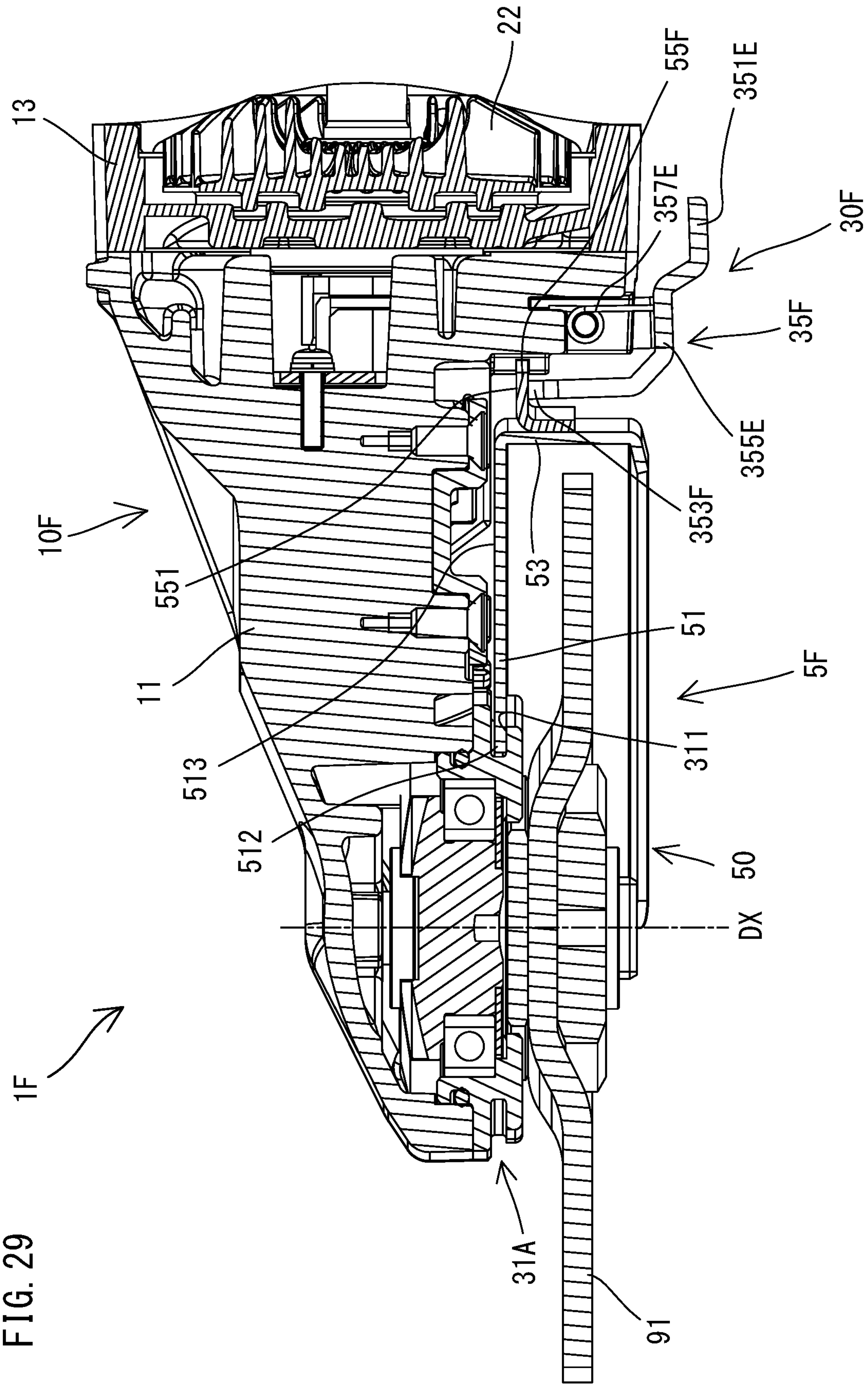
FIG. 29 is a partial, sectional view showing a grinder of a sixth embodiment, with a lever placed in the engagement position.
Figure 30:
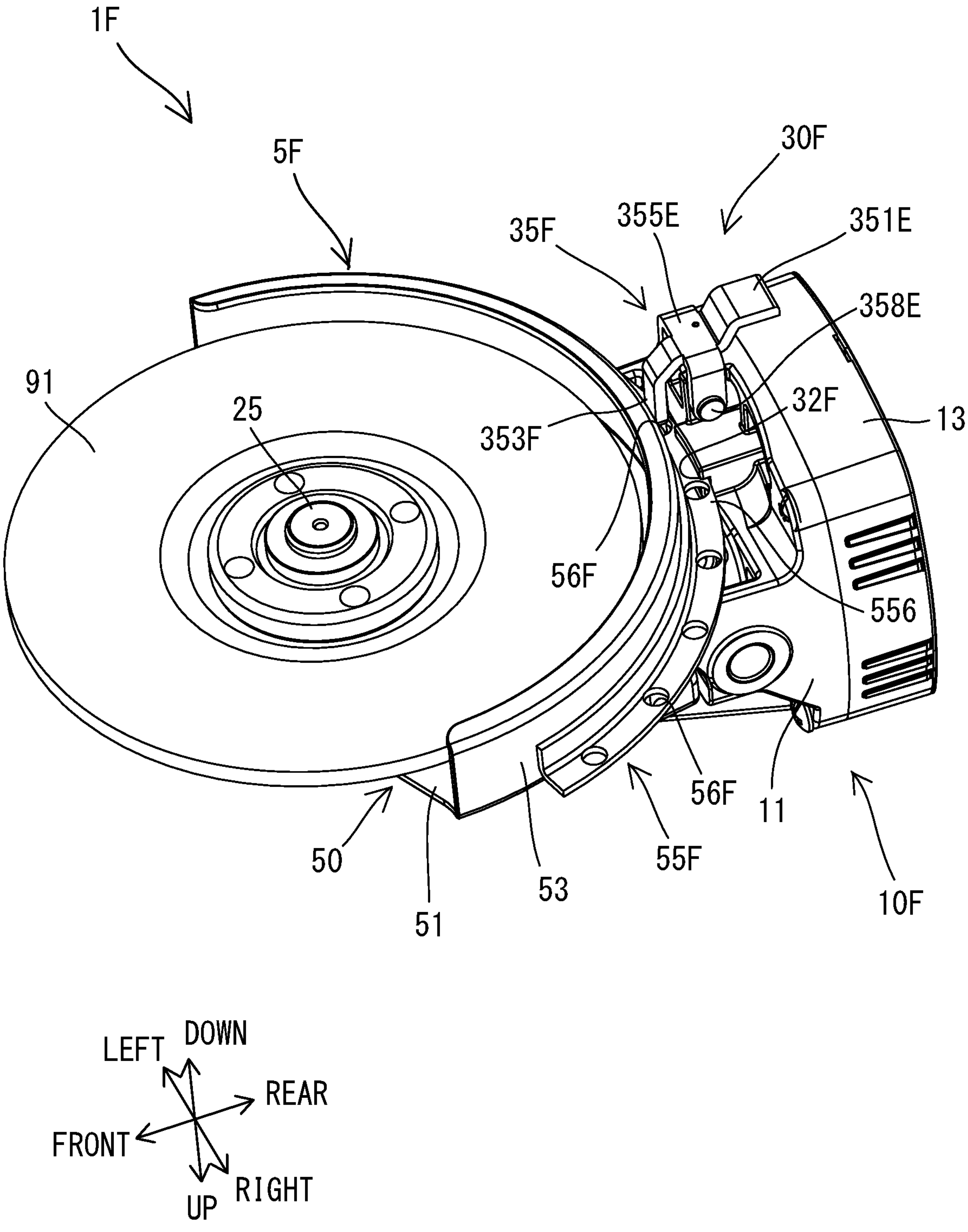
FIG. 30 is a partial, perspective view of the grinder.
Figure 31:
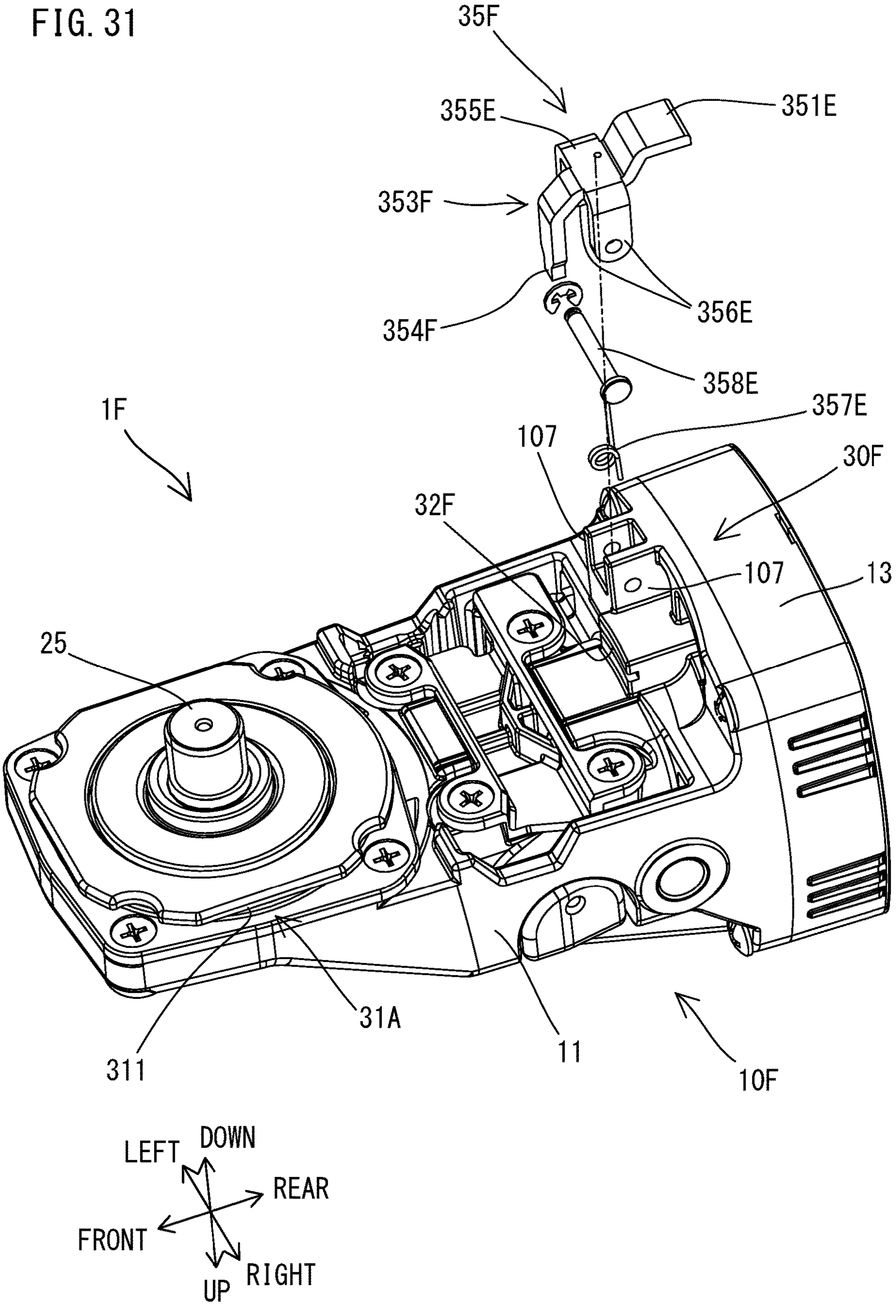
FIG. 31 is a partial, exploded perspective view of the grinder with the tool accessory and a cover removed therefrom.

As shown in FIGS. 29 and 30, the cover 5F includes the cover body 50 and a rail 55F. Like the rail 55A (see FIG. 4) of the first embodiment, the rail 55F is configured as an arcuate protruding part protruding radially outward. Unlike in the first embodiment, however, the upper surface 551 of the rail 55F is below the upper surface 513 of the upper plate part 51 of the cover body 50 in the up-down direction. The rail 55F has engagement recesses 56F that are similar to the engagement recesses 56A of the first embodiment. In this embodiment, all the engagement recesses 56F are at equal intervals. Instead, the engagement recesses 56F may be at different intervals.

As shown in FIGS. 29 to 32, the housing 10F has the same body engagement part 31A (the body engagement groove 311) as that of the first embodiment and a rail engagement part 30F. In the other points, the housing 10E has substantially the same structure as the housing 10A of the first embodiment.

The rail engagement part 30F is behind the cover 5F and includes a rail engagement groove 32F and a lever 35F.

The rail engagement groove 32F is formed substantially in the center of the housing 10A in the left-right direction behind the body engagement groove 311. The rail engagement groove 32F is located below the body engagement groove 311, corresponding to the rail 55F that is arranged below the upper plate part 51. The rail engagement groove 32F has substantially the same structure as the rail engagement groove 32A (see FIG. 3) of the first embodiment. Specifically, the rail engagement groove 32F is open forward and is recessed rearward and extends arcuately, and is configured to receive a portion of the outer edge part 556 of the rail 55F. The rail engagement groove 32F and the outer edge part 556 are configured to have respective sectional shapes that are substantially complementary to each other.

The lever 35F is different from the lever 35E (see FIG. 26) of the fifth embodiment in that the lever 35F has an engagement part 353F in place of the engagement part 353E of the lever 35E. In the other points, the lever 35F has substantially the same structure as the lever 35E. The lever 35F is generally L-shaped as viewed from the side and includes the manipulation part 351E, an engagement part 353F and the connection part 355E that connects the manipulation part 351E and the engagement part 353F.

Like the lever 35E, the lever 35F is behind the cover 5F. The lever 35F is supported via the support pin 358E on/in a lower end portion of the housing 10F to be pivotable around an axis that extends in the left-right direction. In this embodiment, the lever 35F is disposed leftward of the rail engagement groove 32F. The engagement part 353F has an engagement projection 354F on its tip end. The engagement projection 354F is configured to engage with any one of the engagement holes 56F of the rail 55F. The width of the tip end of the engagement projection 354F in the left-right direction is set slightly smaller than the diameter of the engagement hole 56F. Like in the fifth embodiment, the lever 35F is biased by the biasing member 357E to be pivoted in such a direction that the engagement projection 354F of the engagement part 353F is moved substantially upward (i.e., toward the rail 55F from below).

Figure 32:
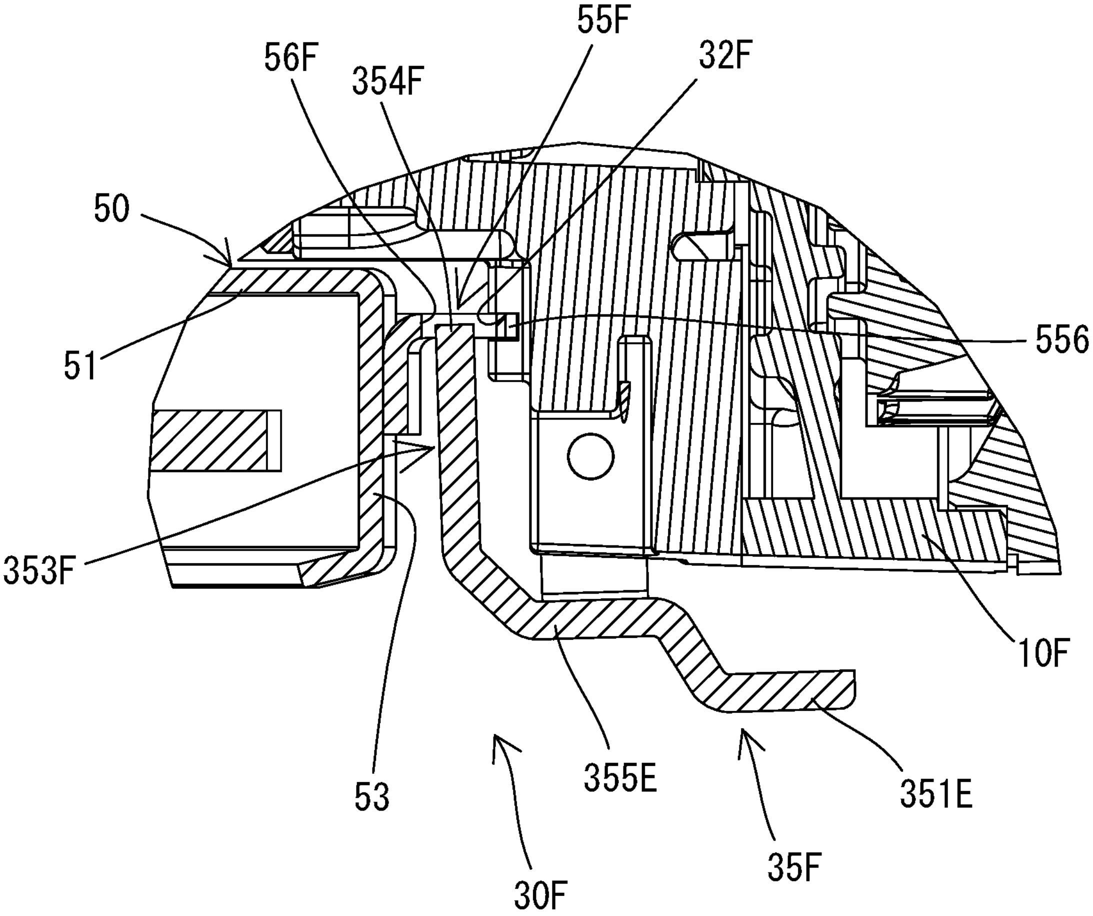
FIG. 32 is a sectional view showing a rail and the lever placed in the engagement position.

As shown in FIGS. 30 and 32, when the engagement projection 354F is at a position corresponding to any one of the engagement recesses 56F in the circumferential direction, and the engagement projection 354F is placed in the uppermost position, the engagement projection 354F is inserted into the engagement recess 56F from below and engages with the engagement hole 56F. In this embodiment, the position of the lever 35F in which the engagement projection 354F is in the uppermost position corresponds to the engagement position of the lever 35F.

Figure 33:
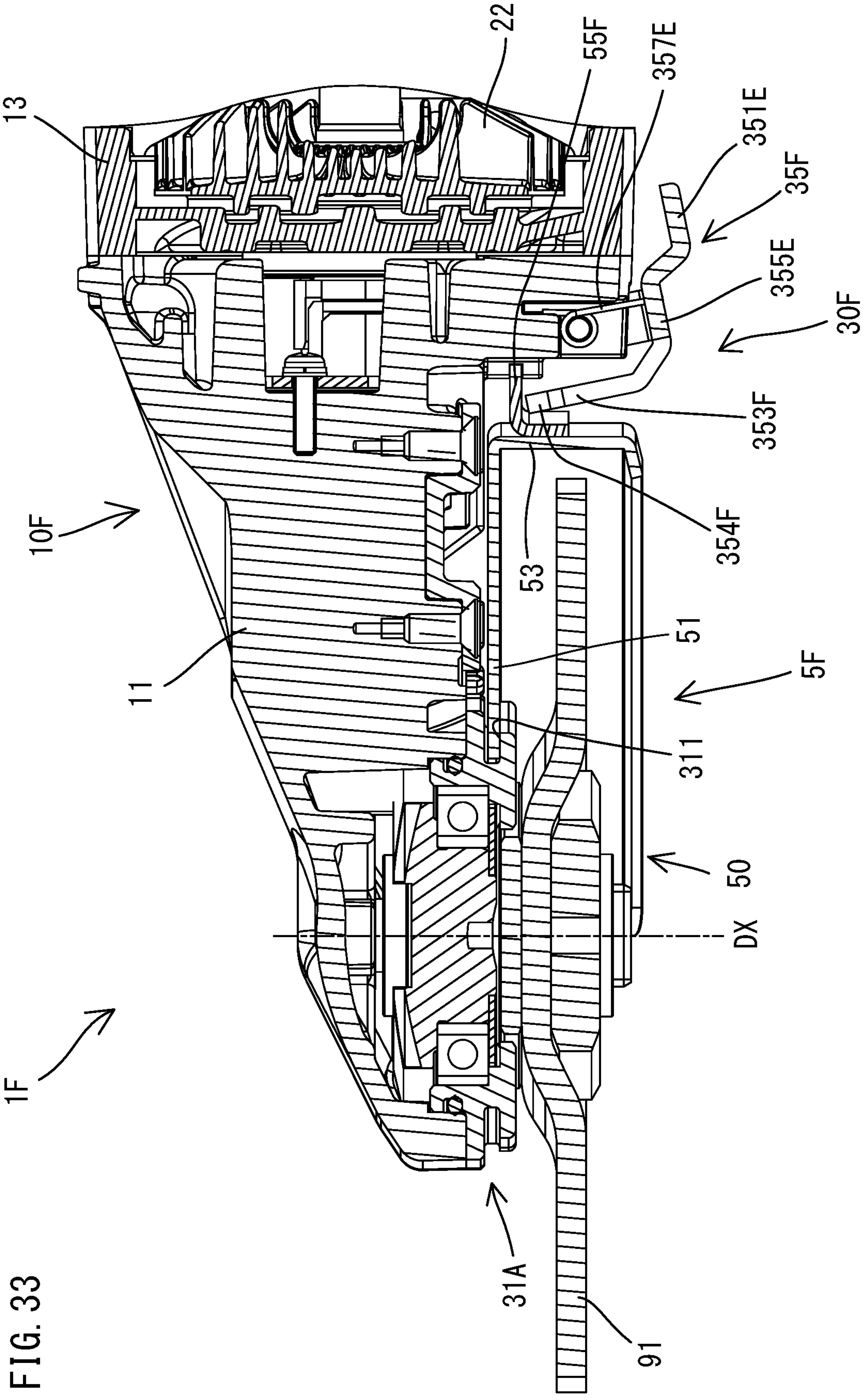
FIG. 33 is a partial, sectional view of the grinder with the lever placed in the disengagement position.
Figure 34:
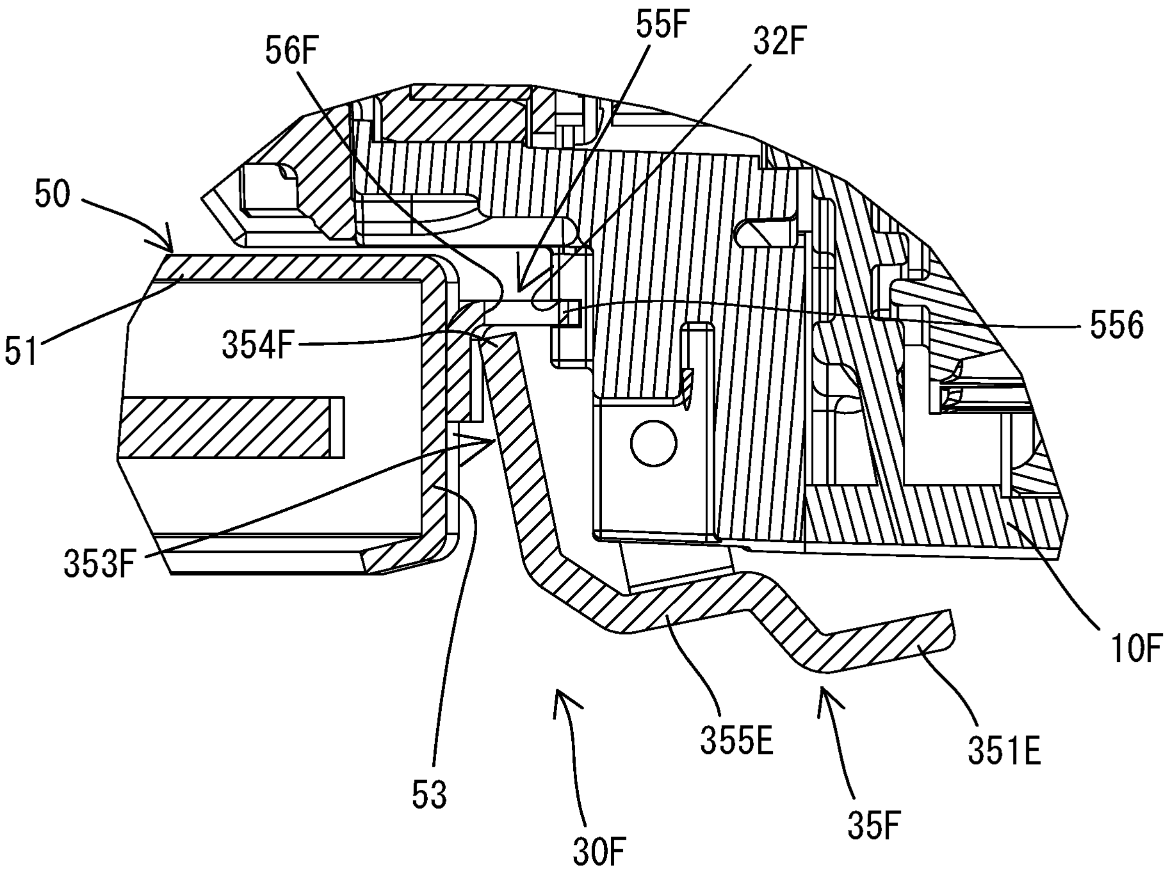
FIG. 34 is a sectional view showing the rail and the lever placed in the disengagement position.

As shown in FIGS. 33 and 34, when a user pushes the manipulation part 351E upward toward the housing 10F, the lever 35F is pivoted around an axis extending in the left-right direction against the biasing force of the biasing member 357E such that the engagement projection 354F is moved downward. Thus, the lever 35F is placed in the disengagement position. In this embodiment, the engagement projection 354F is moved along an arc within the engagement hole 56F when the lever 35F is pivoted. Therefore, the diameter of the engagement hole 56F is set larger than the diameter of the engagement hole 56A of the first embodiment.

Like in the first embodiment, in the grinder 1F of this embodiment, the rail 55F and the rail engagement part 30F (the rail engagement groove 32F and the lever 35F) cooperate with each other to perform two functions of (i) properly positioning the cover body 50 in the circumferential direction relative to the housing 10F and (ii) suppressing looseness in the other directions. Therefore, compared with a case in which separate structures respectively perform these two functions, a space required in the power tool can be reduced and the power tool can be simplified in structure.

Seventh Embodiment

Figure 35:
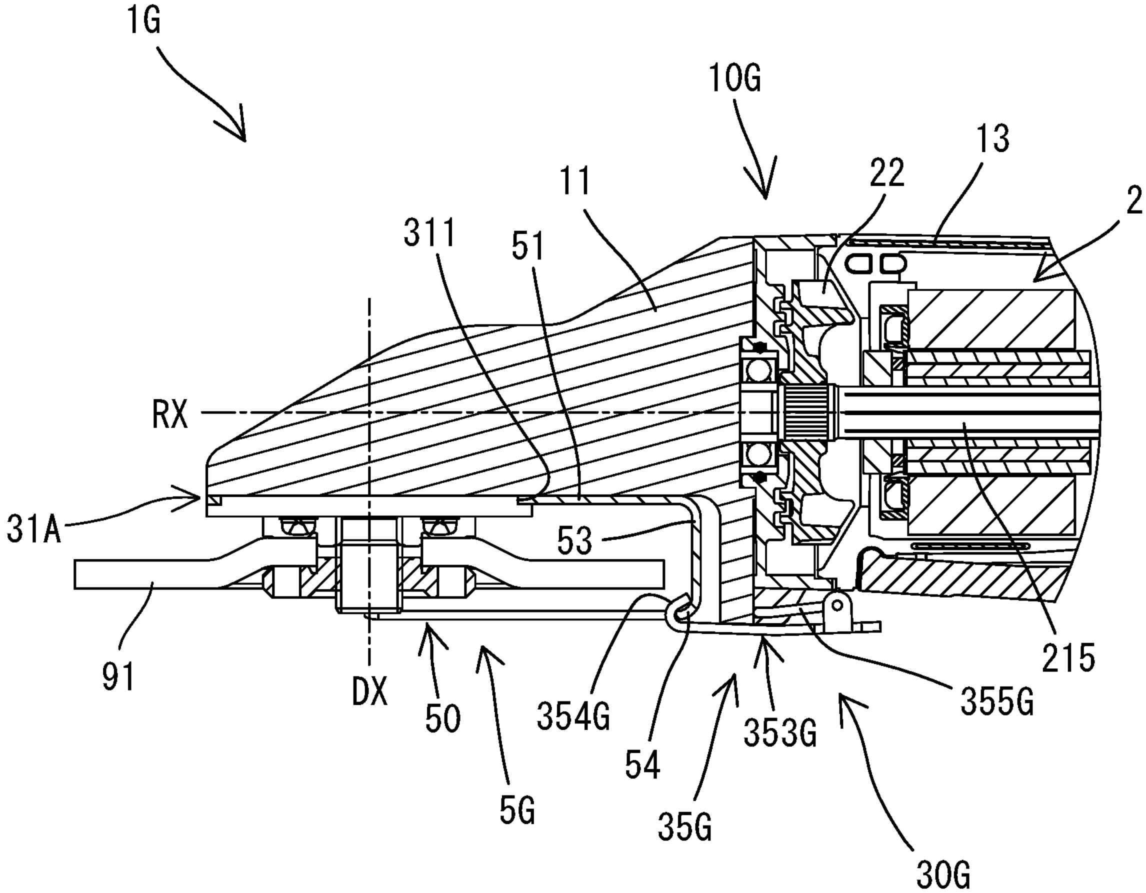
FIG. 35 is a partial, sectional view showing a grinder of a seventh embodiment, with a latch placed in the engagement position.

A grinder 1G of a seventh embodiment is now described with reference to FIGS. 35 to 37. The grinder 1G includes a cover 5G and a housing 10G that are partially different in structure from the cover 5A and the housing 10A of the first embodiment. The cover 5G includes only the cover body 50 and does not include a rail. The housing 10G has the same body engagement part 31A (the body engagement groove 311) as that of the first embodiment and an outer peripheral engagement part 30G that is not provided in the first embodiment. In FIG. 35, for the sake of convenience, some portions of the housing 10G of the grinder 10G and mechanisms or elements disposed within the housing 10G are simply shown or not shown, but the grinder 10G has substantially the same structure as the grinder 1A (see FIG. 3) of the first embodiment, except for the outer peripheral engagement part 30G.

Figure 36:
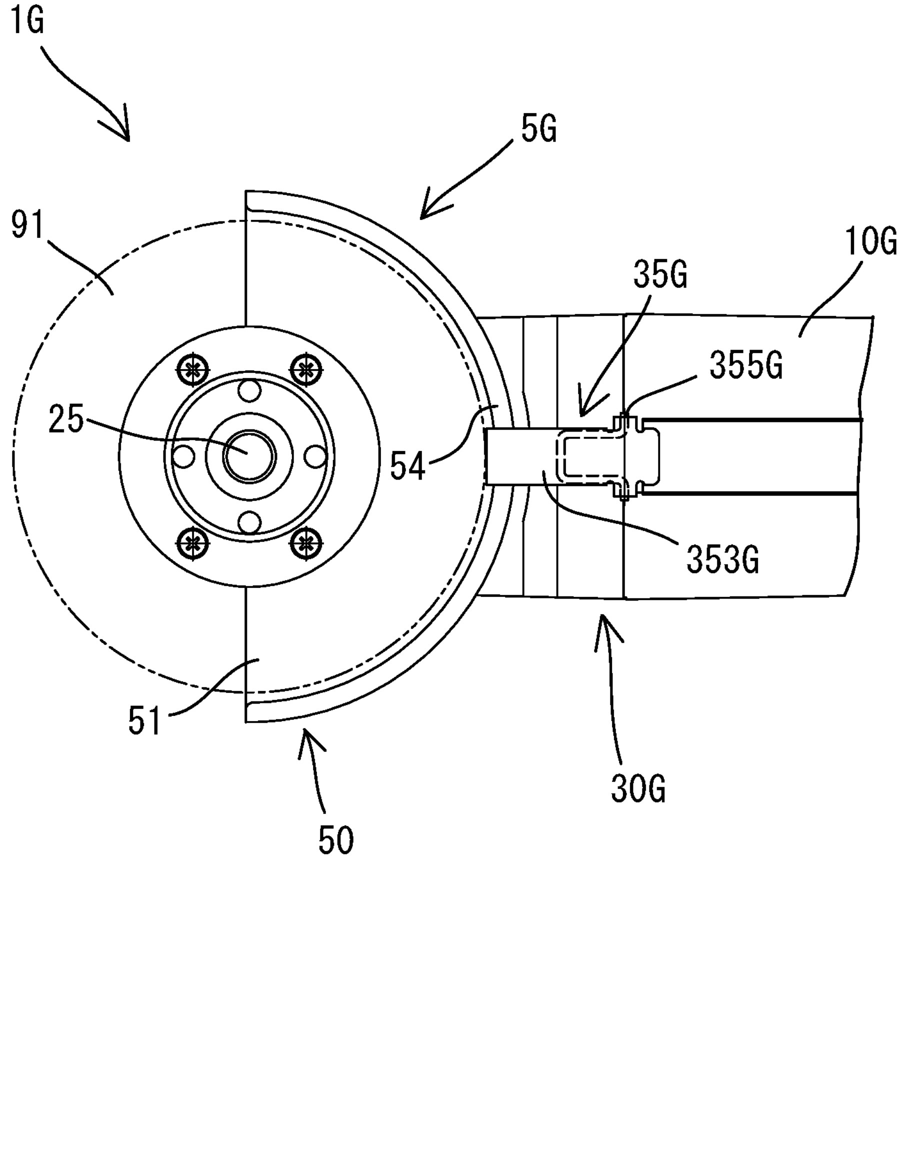
FIG. 36 is a bottom view of the grinder, with the latch placed in the engagement position.
Figure 37:
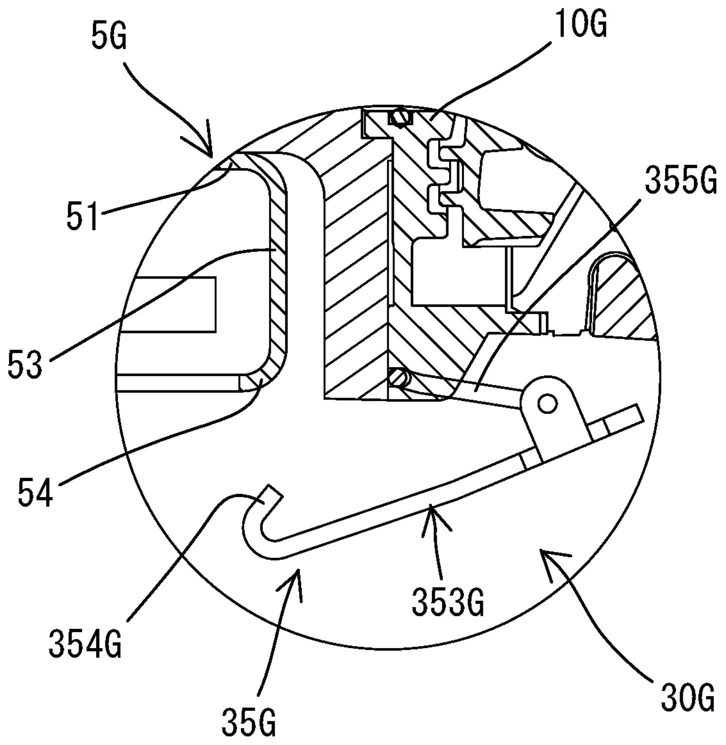
FIG. 37 is a sectional view showing a cover and the latch placed in the disengagement position.

As shown in FIGS. 35 to 37, the outer peripheral engagement part 30G includes a latch 35G disposed below the housing 10G. The latch 35G is a fastener that utilizes a tensile force. The latch 35G may also be referred to as a draw latch or a toggle latch. The latch 35G includes a rectangular plate-like metal engagement part 353G and a U-shaped metal arm 355G. One end portion of the engagement part 353G in its longitudinal direction is bent and forms a hook 354G. two opposite ends of the arm 355G are pivotably (rotatably) connected to opposite sides of the other end portion of the engagement part 353G in its longitudinal direction. A central portion of the arm 355G is supported on a lower end portion of the housing 10G so as to be pivotable around an axis extending in the left-right direction.

Owing to the above-described structure, the latch 35G is movable between an engagement position at which the hook 354 engages with the lip part 54 as shown in FIGS. 35 and 36, and a disengagement position at which the hook 354 is not engageable with the lip part 54 as shown in FIG. 37. When the latch 35G is in the engagement position, the tensile force is applied to the cover 5G via the engagement part 353G, so that movement (rotation around the drive axis DX) of the cover 5G in the circumferential direction relative to the housing 10G is restricted. The size of the latch 35G in the up-down direction can be minimized in the engagement position, so that the size of the grinder 1G in the up-down direction (the extending direction of the drive axis DX) can be reduced.

Two other examples of covers that are suitable and effective for use with the latch 35G are now described with reference to FIGS. 38 and 39.

Figure 38:
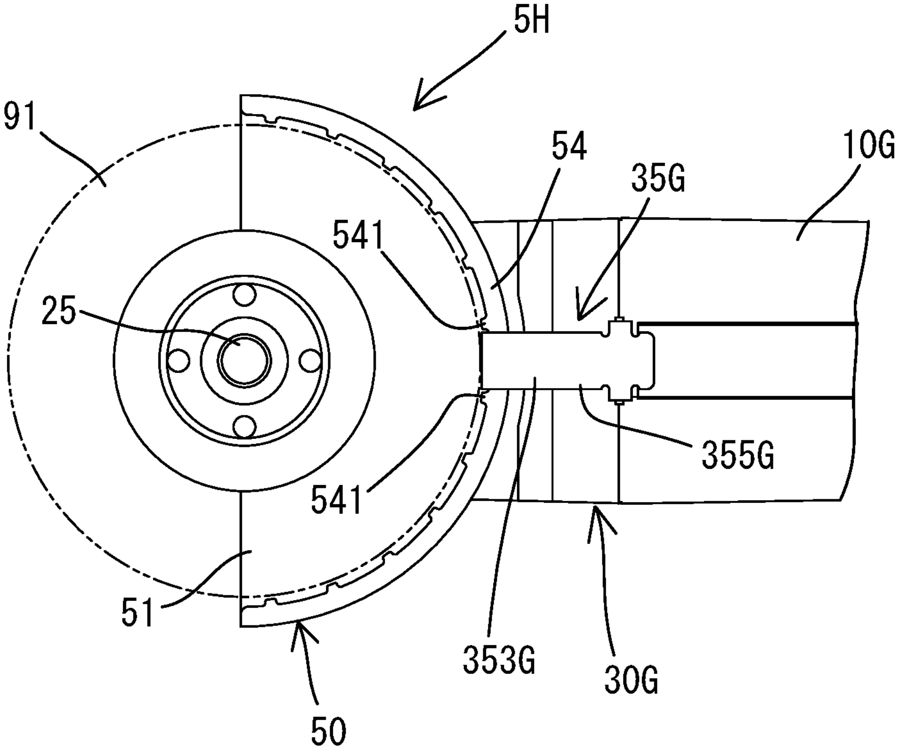
FIG. 38 is a bottom view of the grinder with another cover mounted thereto.

A cover 5H shown in FIG. 38 has projections 541 protruding radially inward from the lip part 54. The projections 541 are at equal intervals in the circumferential direction. The interval (distance) between the adjacent projections 541 is set slightly larger than the width of the engagement part 353G of the latch 35G in the left-right direction. Owing to such a structure, when the latch 35G is at the engagement position, the hook 354G (see FIG. 35) is engaged with the lip part 54 between the projections 541, so that rotation of the cover 5H relative to the housing 10G can be more reliably restricted.

Figure 39:
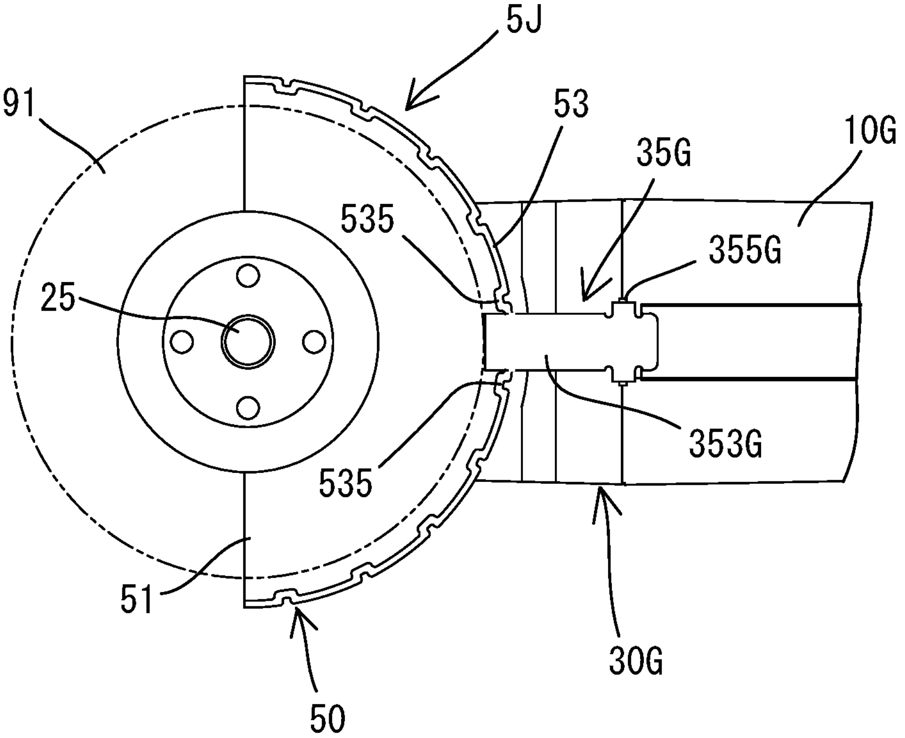
FIG. 39 is a bottom view of the grinder with yet another cover mounted thereto.

A cover 5J shown in FIG. 39 does not include the lip part 54 on the outer peripheral part 53. Instead, the cover 5J has projections 535 that protrude radially inward from the outer peripheral part 53 (peripheral wall part). The projections 535 are at equal intervals in the circumferential direction. The interval (distance) between the adjacent projections 535 is set slightly larger than the width of the engagement part 353G of the latch 35G in the left-right direction. Owing to such a structure, like in the example shown in FIG. 38, when the latch 35G is at the engagement position, the hook 354G engages with a lower edge of the outer peripheral part 53 between the projections 535, so that rotation of the cover 5J relative to the housing 10G can be more reliably restricted.

Correspondences between the features of the above-described embodiments and the features of the present disclosure or invention are as follows. However, the features of the above-described embodiments are merely exemplary and do not limit the features of the present disclosure or invention.

The grinders 1A, 1B, 1C, 1D, 1E, 1F are examples of a "power tool". The spindle 25 is an example of a "spindle". The housings 10A, 10B, 10C, 10D, 10E, 10F are examples of a "housing". The cover body 50 is an example of a "cover body". The upper plate part 51 is an example of an "upper plate part". The outer peripheral part 53 is an example of an "outer peripheral part". The rails 55A, 55C, 55D, 55E, 55F are examples of a "first engagement part" and also a "protruding part". The levers 35A, 35B, 35C, 35D, 35E, 35F are examples of a "second engagement part".

The levers 35A, 35B, 35C are examples of a "lever that is linearly movable". The engagement holes 56A, 56F are examples of a "hole of the protruding part". The lever 35D is an example of a "rotary lever" that is movable within a plane substantially orthogonal to the drive axis. The engagement recess 56D is an example of a "recess of the protruding part". The engagement projections 354A, 354B, 354C, 354D, 354F are examples of a "projection of the second engagement part". The biasing members 357A, 357C, 357D, 357E are examples of a "biasing member".

The above-described embodiments are merely exemplary, and the power tool according to the present disclosure is not limited to the grinders 1A, 1B, 1C, 1D, 1E, 1F of the above-described embodiments. For example, the following modifications may be made. At least one of these modifications can be employed in combination with at least one of the features of the grinders 1A, 1B, 1C, 1D, 1E, 1F of the above-described embodiments and the claimed features.

For example, the present disclosure may be applied to other kinds of power tools (e.g., a cutter, a circular saw and a multi-tool) configured such that a cover that is configured to partially covers a tool accessory mounted to a spindle is removably mounted thereto. The structure of the housing, and elements (mechanisms) disposed within the housing and their arrangement can be appropriately changed according to the kind of the power tool.

The cover body according to this disclosure is not limited to the cover body 50 of the above-described embodiments. For example, the shape of the cover body 50 (e.g., the length of the upper plate part 51 in the circumferential direction and/or the radial direction) can be appropriately changed.

The first engagement part according to this disclosure is not limited to the rails 55A, 55C, 55D, 55E, 55F of the above-described embodiments. For example, the shapes (e.g., the length in the circumferential direction, the width in the radial direction, and/or the thickness in the up-down direction) of the rails 55A, 55C, 55D, 55E, 55F and/or the positions of the rails 55A, 55C, 55D, 55E, 55F relative to the cover body 50 can be appropriately changed. The sectional shapes, sizes and/or arrangement of the engagement holes 56A, 56F and the engagement recesses 56E can be appropriately changed. Further, the first engagement part according to this disclosure need not be an arcuate rail, insofar as it is engageable with the second engagement part (e.g., a lever) that is provided in/on the housing so as to be movable between the engagement position and disengagement position. For example, the first engagement part may be configured as a projection, a recess or a hole formed on/in the outer peripheral part of the cover body. The first engagement part according to this disclosure may protrude, not from the outer peripheral part, but from the upper plate part.

The second engagement part according to this disclosure is not limited to the levers 35A, 35B, 35C, 35D, 35E, 35F of the above-described embodiments. For example, the configurations (e.g., the shapes, arrangement, and/or supporting manners) of the levers 35A, 35B, 35C, 35D, 35E, 35F can be appropriately changed in relation to the configurations of the first engagement part (e.g., the recesses or holes of the rails 55A, 55C, 55D, 55E, 55F). For example, the second engagement part may be a lever that is linearly movable between the engagement position and the disengagement position within a plane that is orthogonal to the drive axis DX. Further, the second engagement part is preferably configured to be biased toward the engagement position by a biasing member, but, for example, it may be configured to be locked to the housing in the engagement position and in the disengagement position. Springs that are employed as the biasing members 357A, 357C, 357D, 357E in the above-described embodiments are mere examples, and each of them may be changed to another kind of springs, or an elastic element other than a spring.

Further, for example, the sectional shapes and/or arrangement of the rail engagement grooves 32A, 32F can be appropriately changed corresponding to the change of the first engagement part (e.g., the rail). The rail engagement grooves 32A, 32F may be omitted. Alternatively, the housing may have a structure that restricts movement of the cover body relative to the housing in a direction that is different from the circumferential direction, by engaging with the cover body itself, instead of engaging with the first engagement part (e.g., the rail).

In view of the nature of the present disclosure and the above-described embodiments, the following Aspects A1 to A8 are provided. At least one of the following Aspects A1 to A8 can be employed in combination with at least one of the features of the above-described embodiments, its modifications and the claimed features.

(Aspect A1)

The first engagement part is an arcuate rail.

(Aspect A2)

The housing has a rail engagement groove in which an outer edge part of the rail can be fitted.

(Aspect A3)

The second engagement part is at least partially within the housing.

(Aspect A4)

The lever includes:

a manipulation part that is configured to be externally manipulated by a user, an engagement part that is configured to engage with the first engagement part when the lever is at the engagement position and not to be engageable with the first engagement part when the lever is at the disengagement position, and a connection part that connects the manipulation part and the engagement part.

(Aspect A5)

The manipulation part is configured to be externally manipulated above the housing.

(Aspect A6)

The manipulation part is configured to be externally manipulated on a lateral side of the housing.

(Aspect A7)

The upper plate part has a fan-like shape or an arcuate shape, and the outer peripheral part has an arcuately curved plate-like shape.

(Aspect A8)

The housing has a body engagement groove in which an inner edge part of the upper plate part of the cover body can be fitted.

Further, the present disclosure also provides the following Aspects B1 to B25, in order to achieve another non-limiting object to provide improvement relating to a structure for restricting movement of a cover of a tool accessory. Any one of Aspects B1 to B25 can be employed alone or two or more of them can be employed in combination. Alternatively, at least one of Aspects B1 to B25 can be employed in combination with at least one of the features of the grinders 1A, 1B, 1C, 1D, 1E, 1F, 1G of the above-described embodiments, the above-described modifications, Aspects A1 to A8 and the claimed features.

(Aspect B1)

A power tool, comprising:

a spindle that (i) extends along a drive axis that defines an up-down direction of the power tool, and (ii) has a lower end portion that is configured such that a tool accessory is removably mounted thereto;

a housing that houses the spindle with the lower end portion exposed to an outside of the housing;

a cover body that is configured to be removably mounted to the housing to partially cover the tool accessory mounted to the lower end portion of the spindle; and a movement restricting part that is provided on or in the cover body, wherein:

the movement restricting part is configured to restrict (i) movement of the cover body in a circumferential direction around the drive axis relative to the housing and (ii) movement of the cover body in another direction that is different from the circumferential direction relative to the housing.

In the power tool according to this aspect, the movement restricting part provided on/in the cover body can restrict the movement of the cover body relative to the housing (i) in the circumferential direction (i.e., rotation of the cover body) and (ii) in the other direction that is different from the circumferential direction. Thus, the movement restricting part can perform two functions of (i) properly positioning the cover body in the circumferential direction and (ii) suppressing looseness or play in the other direction. Therefore, compared with a case in which separate structures respectively perform these two functions, a space required in the power tool can be reduced and the power tool can be simplified in structure.

(Aspect B2)

The power tool as defined in Aspect B1, wherein:

the cover body includes (i) an upper plate part that is configured to be arranged above the tool accessory mounted to the lower end portion of the spindle and (ii) an outer peripheral part that extends along an outer edge of the upper plate part and protrudes downward from the outer edge, and the movement restricting part is configured as a protruding part that protrudes radially outward relative to the drive axis from the upper plate part or the outer peripheral part.

According to this aspect, the movement restricting part does not need to protrude downward from the cover body, and thus size increase of the power tool in the up-down direction can be avoided.

(Aspect B3)

The power tool as defined in Aspect B2, wherein:

the housing has (i) a groove and (ii) a movable member that is movable between (a) an engagement position at which the movable member engages with the protruding part and (b) a disengagement position at which the movable member is not engageable with the protruding part, and the protruding part is configured to:

restrict movement of the cover body in the other direction relative to the housing by being engaged with the groove, and restrict movement of the cover body in the circumferential direction relative to the housing by being engaged with the movable member when the movable member is at the engagement position.

According to this aspect, restriction of the looseness in the other direction and positioning of the cover body in the circumferential direction can be effectively achieved by cooperation between the protruding part on the cover body, and the groove and the movable member that are provided on or in the housing.

(Aspect B4)

The power tool as defined in Aspect B2 or B3, further comprising:

a movable member that is provided on or in the housing to be movable between an engagement position and a disengagement position, wherein:

the movable member includes:

a manipulation part that is configured to be externally manipulated above the housing by a user, an engagement part that is configured to engage with the protruding part of the cover body when the movable member is at the engagement position, and not to be engageable with the protruding part of the cover body when the movable member is at the disengagement position, and a connection part that connects the manipulation part and the engagement part.

According to this aspect, the movable member is provided that is easy for a user to operate.

(Aspect B5)

The power tool as defined in Aspect B4, wherein the movable member is a lever that is linearly movable substantially in parallel to the drive axis.

According to this aspect, the cover body can be positioned in the circumferential direction by cooperation between the protruding part protruding from the cover body and the movable member (lever) having a simple structure.

(Aspect B6)

The power tool as defined in Aspect B5, wherein the connection part is at least partially within the housing.

According to this aspect, a possibility that the movable member is affected by an unintended external force can be reduced.

(Aspect B7)

The power tool as defined in Aspect B5 or B6, wherein the engagement part is configured to engage with the protruding part of the cover body from below when the movable member is at the engagement position.

According to this aspect, a user can move the lever from the engagement position to the disengagement position by pushing the manipulation part downward, so that the manipulation is easier compared with a structure that requires pulling the manipulation part upward.

(Aspect B8)

The power tool as defined in Aspect B2 or B3, further comprising:

a lever that (i) includes a manipulation part that is configured to be externally manipulated by a user, and (ii) is provided on or in the housing to be pivotable between an engagement position at which the lever engages with the protruding part and a disengagement position at which the lever is not engageable with the protruding part.

According to this aspect, restriction of the looseness in the other direction and positioning of the cover body in the circumferential direction can be effectively achieved by cooperation between the protruding part of the cover body and the easy-to-operate rotary (pivotable) lever.

(Aspect B9)

The power tool as defined in Aspect B8, wherein:

the housing extends in a front-rear direction that is orthogonal to the drive axis, and the lever is configured such that the manipulation part extends in the front-rear direction when the lever is at the engagement position.

According to this aspect, the manipulation part extends along the housing when the lever is at the engagement position, so that the lever does not easily interfere with user's operation.

(Aspect B10)

The power tool as defined in Aspect B8 or B9, wherein the lever is configured to be pivoted from the engagement position to the disengagement position when the manipulation part is pushed toward the housing.

This aspect provides the lever that is easy to operate.

(Aspect B11)

The power tool as defined in Aspect B9 or B10, further comprising:

a motor that is housed within the housing and configured to drive the spindle;

a switch that is provided to start the motor and housed within the housing; and a switch manipulation member that is operably coupled to the switch and held by the housing so as to be externally manipulated by a user, wherein:

the lever is configured such that a rear end of the manipulation part is located forward of the switch manipulation member when the lever is at the engagement position.

According to this aspect, the lever does not easily interfere with user's operation of the switch manipulation member.

(Aspect B12)

The power tool as defined in any one of Aspect B2 to B11, wherein an upper surface of the protruding part is substantially flush with an upper surface of the upper plate part.

According to this aspect, the upper surface of the protruding part and the upper surface of the upper plate part can be integrally utilized to restrict upward movement of the cover body (to suppress looseness in the up-down direction).

(Aspect B13)

The power tool as defined in any one of Aspect B2 to B12, further comprising:

a movable member that is provided on or in the housing to be movable between an engagement position and a disengagement position, wherein:

the protruding part is a rail having at least one recess or hole, and the movable member is configured to engage with the recess or the hole in the engagement position and not to be engageable with the recess or the hole in the disengagement position.

According to this aspect, rotation of the cover body relative to the housing can be reliably restricted.

(Aspect B14)

The housing has an annular groove formed around the drive axis, the upper plate part of the cover body has a fan-like shape having an arcuate inner edge and an arcuate outer edge, and the upper plate part has an inner edge part that extends along the inner edge and is configured to be fitted in the annular groove.

The inner edge 511, the outer edge 515 and the inner edge part 512 of the upper plate part 51 are examples of an "inner edge", an "outer edge" and an "inner edge part" of this aspect, respectively. The body engagement groove 311 is an example of an "annular groove" of this aspect.

(Aspect B15)

In Aspect B14, the protruding part is an arcuate rail, and the rail has an outer edge part that extends along an outer edge and is configured to be fitted in the groove of the housing.

The outer edge part 556 is an example of an "outer edge part" of this aspect.

According to this aspect, the upper plate part and the movement restricting part (protruding part) are fitted in the annular groove and the groove, respectively, so that movement of the cover body in the radial direction relative to the housing can be effectively suppressed.

(Aspect B16)

The power tool further includes a biasing member that is configured to bias the movable member toward the engagement position.

According to this aspect, engagement between the movable member and the protruding part can be maintained by the biasing force of the biasing member.

The biasing members 357A, 357E are examples of a "biasing member" of this aspect.

(Aspect B17)

The protruding part has at least one recess or hole, and the engagement part of the movable member (i) has a projection protruding upward and configured to engage with the recess or the hole, and (ii) is configured to be moved downward from the engagement position to the disengagement position relative to the protruding part of the cover body.

(Aspect B18)

The movable member is configured to restrict movement of the cover body in the circumferential direction and/or movement of the cover body in the other direction relative to the housing by pressing the protruding part against the housing when the movable member is in the engagement position.

(Aspect B19)

In Aspect B18, the protruding part has at least one recess or projection, and the housing has a projection or recess that is configured to engage with the recess or the projection of the protruding part when the protruding part is pressed against the housing by the movable member.

The engagement recess 56E is an example of a "recess of the protruding part" of this aspect. The engagement projection 32E is an example of a "projection of the housing" of this aspect.

(Aspect B20)

The power tool further includes a fan that is configured to be rotated integrally with an output shaft of the motor, and a rear end of the manipulation part is located forward of the fan when the lever is in the engagement position.

(Aspect B21)

The housing includes a handle part that is configured to be held by a user, and a rear end of the manipulation part is located forward of the handle part when the lever is in the engagement position.

(Aspect B22)

The cover body is pivotable around the drive axis relative to the housing when the movable member is in the disengagement position, the protruding part has a plurality of recesses or holes, and the movable member is configured to be selectively engaged with one of the recesses or the holes when the movable member is in the engagement position.

(Aspect B23)

The upper plate part has a fan-like shape or an arcuate shape, and the outer peripheral part is an arcuately curved plate-like part.

(Aspect B24)

The protruding part is between an upper end and a lower end of the cover body in the up-down direction.

The position "between the upper end and the lower end" in this aspect includes the same location as the upper end and the same location as the lower end.

(Aspect B25)

A lower end of the movable member is located in the same location as or above a lower end of the cover body in the up-down direction when the movable member is in the engagement position and in the disengagement position.

Correspondences between the features of the above-described embodiments and the features of the above-described aspects B1 to B25 are as follows. However, the features of the above-described embodiments are merely exemplary and do not limit the features of the present disclosure or invention.

The grinders 1A, 1B, 1E, 1F are examples of a "power tool". The spindle 25 is an example of a "spindle". The housings 10A, 10B, 10E, 10F are examples of a "housing". The cover body 50 is an example of a "cover body". The rails 55A, 55E, 55F are examples of a "movement restricting part" and also a "protruding part".

The upper plate part 51 is an example of an "upper plate part". The outer peripheral part 53 is an example of an "outer peripheral part". The rail engagement grooves 32A, 32F are examples of a "groove". The levers 35A, 35B, 35E, 35F are examples of a "movable member". The manipulation part 351A is an example of a "manipulation part". The engagement parts 353A, 353B are examples of an "engagement part". The connection part 355A is an example of a "connection part". The levers 35A, 35B are examples of a "lever" that is linearly movable. The levers 35E, 35F are examples of the a "lever" that is pivotable. The manipulation part 351E is an example of the "manipulation part" of the lever that is pivotable. The motor 21 is an example of a "motor". The switch 27 is an example of a "switch". The switch knob 271 is an example of a "switch manipulation member". The rails 55A, 55E, 55F are examples of a "rail". The engagement recess 56E is an example of a "recess". The engagement holes 56A, 56F are examples of a "hole".

The above-described embodiments are merely exemplary, and the power tool according to Aspects B1 to B25 of the present disclosure is not limited to the grinders 1A, 1B, 1E, 1F of the above-described embodiments. For example, the following modifications may be made. At least one of these modifications can be employed in combination with at least one of the features of the grinders 1A, 1B, 1E, 1F of the above-described embodiments and the claimed invention.

For example, the present disclosure may be applied to other kinds of power tools (e.g., as a cutter, a circular saw and a multi-tool) configured such that a cover that is configured to partially cover a tool accessory mounted to a spindle is removably mounted thereto. The structure of the housing, elements (mechanisms) disposed within the housing, and/or their arrangement can be appropriately changed according to the kind of the power tool.

The shape of the cover body 50 of the above-described embodiments (e.g., the length of the upper plate part 51 in the circumferential direction or the radial direction) can be appropriately changed. The shapes (e.g., the length in the circumferential direction, the width in the radial direction, and/or the thickness in the up-down direction) of the rails 55A, 55E, 55F and/or the positions of the rails 55A, 55E, 55F relative to the cover body 50 can be appropriately changed. The sectional shapes, sizes and/or arrangement of the engagement holes 56A, 56F and the engagement recesses 56E can be appropriately changed. Further, the cover body of the present disclosure need not have an arcuate rail. For example, a movable member (e.g., a lever)

that is movable between the engagement position and the disengagement position may be provided on or in the housing, and at least one projection, recess or hole may be provided in the outer peripheral part of the cover body so as to engage with the movable member when the movable member is at the engagement position.

The configurations of the rail engagement parts 30A, 30B, 30E, 30F can be appropriately changed. For example, the sectional shapes and/or arrangement of the rail engagement grooves 32A, 32F can be appropriately changed according to the change of the rails 55A, 55E, 55F. The configurations (e.g., the shapes, arrangement, supporting manners) of the levers 35A, 35B, 35E, 35F can be appropriately changed in relation to the configuration of the cover body 50 (such as the recess or the hole of the rails 55A, 55E, 55F).

DESCRIPTION OF THE REFERENCE NUMERALS

1A, 1B, 1C, 1D, 1E, 1F, 1G: grinder, 10A, 10B, 10C, 10D, 10E, 10F, 10G: housing, 101A, 101C: holding groove, 102A, 102C: cover part, 102A, 103C: spring receiving recess. 104: lower surface, 105: cylindrical part, 107: support part, 11: driving-mechanism housing part, 13: motor housing part, 15: handle part, 17: controller housing part, 18: battery mounting part, 21: motor, 211: stator, 215: output shaft, 22: fan, 23: intermediate shaft, 230: drive gear, 25: spindle, 250: driven gear, 253: tool mounting part, 254: lock nut, 27: switch, 271: switch knob, 272: connecting member, 29: controller, 30A, 30B, 30C, 30D, 30E, 30F: rail engagement part, 30G: outer peripheral engagement part, 31A: body engagement part, 311: body engagement groove, 32A, 32F: rail engagement groove, 32E: engagement projection, 33: restriction wall, 35A, 35B, 35C, 35D, 35E, 35F: lever, 351A, 351C, 351D, 351E: manipulation part, 353A, 353B, 353C, 353D, 353E, 353F, 353G: engagement part, 354A, 354B, 354C, 354D, 354F: engagement projection, 354G: hook, 355A, 355C, 355D, 355E: connection part, 355G: arm, 356A, 356D: spring receiving projection, 356E: arm part, 357A, 357C, 357D, 357E: biasing member, 358D: screw, 358E: support pin, 35G: latch, 5A, 5C, 5D, 5E, 5F, 5G, 5H, 5J: cover, 50: cover body, 51: upper plate part, 511: inner edge, 512: inner edge part, 513: upper surface, 515: outer edge, 53: outer peripheral part, 535: projection, 54: lip part, 541: projection, 55A, 55C, 55D, 55E, 55F: rail, 551: upper surface, 552: lower surface, 555: outer edge, 556: outer edge part, 56A, 56F: engagement hole, 56D, 56E: engagement recess, 91: tool accessory, 93: battery

What is claimed is:

1. A power tool, comprising:

a spindle that (i) extends along a drive axis that defines an up-down direction of the power tool and (ii) has a lower end portion that is configured such that a tool accessory is removably mounted thereto;

a housing that houses the spindle with the lower end portion exposed to an outside of the housing;

a cover body that is (i) configured to be removably mounted to the housing to partially cover the tool accessory mounted to the lower end portion of the spindle, and (ii) includes (a) an upper plate part that is configured to be arranged above the tool accessory and (b) an outer peripheral part that extends along an outer edge of the upper plate part and protrudes downward from the outer edge;

a first engagement part that is provided on or in the cover body; and a second engagement part that (i) is provided on or in the housing and (ii) is movable between (a) an engagement position at which the second engagement part engages with the first engagement part and (b) a disengagement position at which the second engagement part is not engageable with the first engagement part, wherein:

the first engagement part and the second engagement part are configured to restrict rotation of the cover body around the drive axis relative to the housing by engaging with each other, the first engagement part is (ii) at a same location as the outer peripheral part or radially outward of the outer peripheral part in a radial direction that is orthogonal to the drive axis, and (ii) between an upper end and a lower end of the cover body in the up-down direction, and the first engagement part is configured as a protruding part that protrudes radially outward from the upper plate part or the outer peripheral part of the cover body.

2. The power tool as defined in claim 1, wherein the second engagement part is a lever that is linearly movable substantially in parallel to the drive axis.

3. The power tool as defined in claim 2, wherein:

the protruding part has at least one recess or hole that extends in the up-down direction, and the second engagement part has a projection that is configured to engage with the at least one recess or the hole when the second engagement part is at the engagement position.

4. The power tool as defined in claim 3, wherein the lever includes (i) a manipulation part that is configured to be externally manipulated by a user above the housing, (ii) the projection, and (iii) a connection part that connects the manipulation part and the projection.

5. The power tool as defined in claim 4, wherein the connection part is at least partially within the housing.

6. The power tool as defined in claim 4, wherein the projection is configured to be engaged with the protruding part of the cover body from below when the lever is at the engagement position.

7. The power tool as defined in claim 1, wherein the second engagement part is a rotary lever that is configured to be externally manipulated by a user.

8. The power tool as defined in claim 7, wherein the second engagement part is movable within a plane that is substantially orthogonal to the drive axis.

9. The power tool as defined in claim 8, wherein:

the protruding part has at least one recess that is recessed radially inward from an outer edge of the protruding part; and the second engagement part has a projection that is configured to be engaged with the recess when the second engagement part is at the engagement position.

10. The power tool as defined in claim 1, wherein the protruding part is configured to restrict movement of the cover body relative to the housing in a first direction that is different from a circumferential direction around the drive axis by engaging with one or both of the second engagement part and the housing.

11. The power tool as defined in claim 10, wherein:

the housing has a groove, and the protruding part is configured to restrict movement of the cover body relative to the housing in the first direction by being fitted in the groove.

12. The power tool as defined in claim 10, wherein the second engagement part is configured to restrict (i) rotation of the cover body relative to the housing and (ii) movement of the cover body relative to the housing in the first direction by pressing the protruding part against the housing when the second engagement part is at the engagement position.

13. The power tool as defined in claim 1, wherein the protruding part is an arcuate rail.

14. The power tool as defined in claim 1, further comprising a biasing member that is configured to bias the second engagement part toward the engagement position.

15. The power tool as defined in claim 1, wherein the first engagement part is formed separately from the cover body and fixed to the cover body.

16. The power tool as defined in claim 1, wherein a lower end of the second engagement part is at a same location as or above a lower end of the cover body in the up-down direction when the second engagement part is at the engagement position and when the second engagement part is at the disengagement position.

17. The power tool as defined in claim 16, wherein an entirety of the second engagement part is between an upper end and the lower end of the cover body in the up-down direction when the second engagement part is at the engagement position and when the second engagement part is at the disengagement position.

18. A power tool, comprising:

a spindle that (i) extends along a drive axis that defines an up-down direction of the power tool, and (ii) has a lower end portion that is configured such that a tool accessory is removably mounted thereto;

a housing that houses the spindle with the lower end portion exposed to an outside of the housing;

a cover body that (i) is configured to be removably mounted to the housing to partially cover the tool accessory mounted to the lower end portion of the spindle, and (ii) includes (a) an upper plate part that is configured to be arranged above the tool accessory and (b) an outer peripheral part that extends along an outer edge of the upper plate part and protrudes downward from the outer edge;

a rail that (i) has an arcuate shape, (ii) protrudes radially outward from the upper plate part or the outer peripheral part of the cover body, and (iii) is entirely located radially outward from the upper plate part or the outer peripheral part of the cover body; and a lever that (i) is configured to be externally manipulated by a user and (ii) is supported by the housing to be movable between (i) an engagement position at which the lever engages with the rail and (b) a disengagement position at which the lever is not engageable with the rail, wherein the rail and the lever are configured to restrict rotation of the cover body around the drive axis relative to the housing by engaging with each other.

19. The power tool as defined in claim 18, wherein the rail is configured to restrict movement of the cover body relative to the housing in a first direction that is different from a circumferential direction around the drive axis by being engaged with one or both of the lever and the housing.

* * * * *